United States Patent
Hasuda et al.

(10) Patent No.: US 8,814,449 B2
(45) Date of Patent: Aug. 26, 2014

(54) ADAPTER, CAMERA SYSTEM, AND ADAPTER CONTROL PROGRAM

(75) Inventors: Masanori Hasuda, Fujisawa (JP);
Masafumi Oikawa, Mitaka (JP);
Noriaki Nakajima, Yokohama (JP);
Shunji Nagaya, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/553,164

(22) Filed: Jul. 19, 2012

(65) Prior Publication Data

US 2013/0028590 A1     Jan. 31, 2013

Related U.S. Application Data

(60) Provisional application No. 61/589,566, filed on Jan. 23, 2012, provisional application No. 61/589,547, filed on Jan. 23, 2012.

(30) Foreign Application Priority Data

Jul. 22, 2011    (JP) ................................ 2011-160844
Jul. 22, 2011    (JP) ................................ 2011-160845

(51) Int. Cl.
*G03B 17/00*      (2006.01)

(52) U.S. Cl.
USPC ........................................................ 396/530

(58) Field of Classification Search
USPC .......................................... 396/71, 529, 530
See application file for complete search history.

(56) References Cited

U.S. PATENT DOCUMENTS

| | | | | |
|---|---|---|---|---|
| 6,407,774 | B1* | 6/2002 | Mabuchi et al. | 348/335 |
| 8,374,499 | B2* | 2/2013 | Sakamoto | 396/532 |
| 2008/0267601 | A1 | 10/2008 | Kobayashi | |

FOREIGN PATENT DOCUMENTS

| | | |
|---|---|---|
| JP | A-02-53037 | 2/1990 |
| JP | A-04-273225 | 9/1992 |
| JP | A-2002-072328 | 3/2002 |
| JP | A-2006-178075 | 7/2006 |
| JP | A-2008-275890 | 11/2008 |
| JP | A-2010-226666 | 10/2010 |

OTHER PUBLICATIONS

May 28, 2013 Office Action issued in Japanese Patent Application No. 2011-160845 (with English Translation).
May 28, 2013 Office Action issued in Japanese Patent Application No. 2011-160844 (with English Translation).

* cited by examiner

*Primary Examiner* — Clayton E LaBalle
*Assistant Examiner* — Minh Phan
(74) *Attorney, Agent, or Firm* — Oliff PLC

(57) ABSTRACT

An adapter includes: a first mount section that is detachably attached to a camera body; a second mount section that is provided separately from the first mount section and is detachably attached to an interchangeable lens; and an adapter control section that is capable of communicating between the camera body mounted on the first mount section and the interchangeable lens mounted on the second mount section. The adapter control section provides body transmission lens information for transmission to the camera body, on the basis of lens information requested from the camera body and lens information received from the interchangeable lens, through mutually different methods according to types of the lens information.

18 Claims, 23 Drawing Sheets

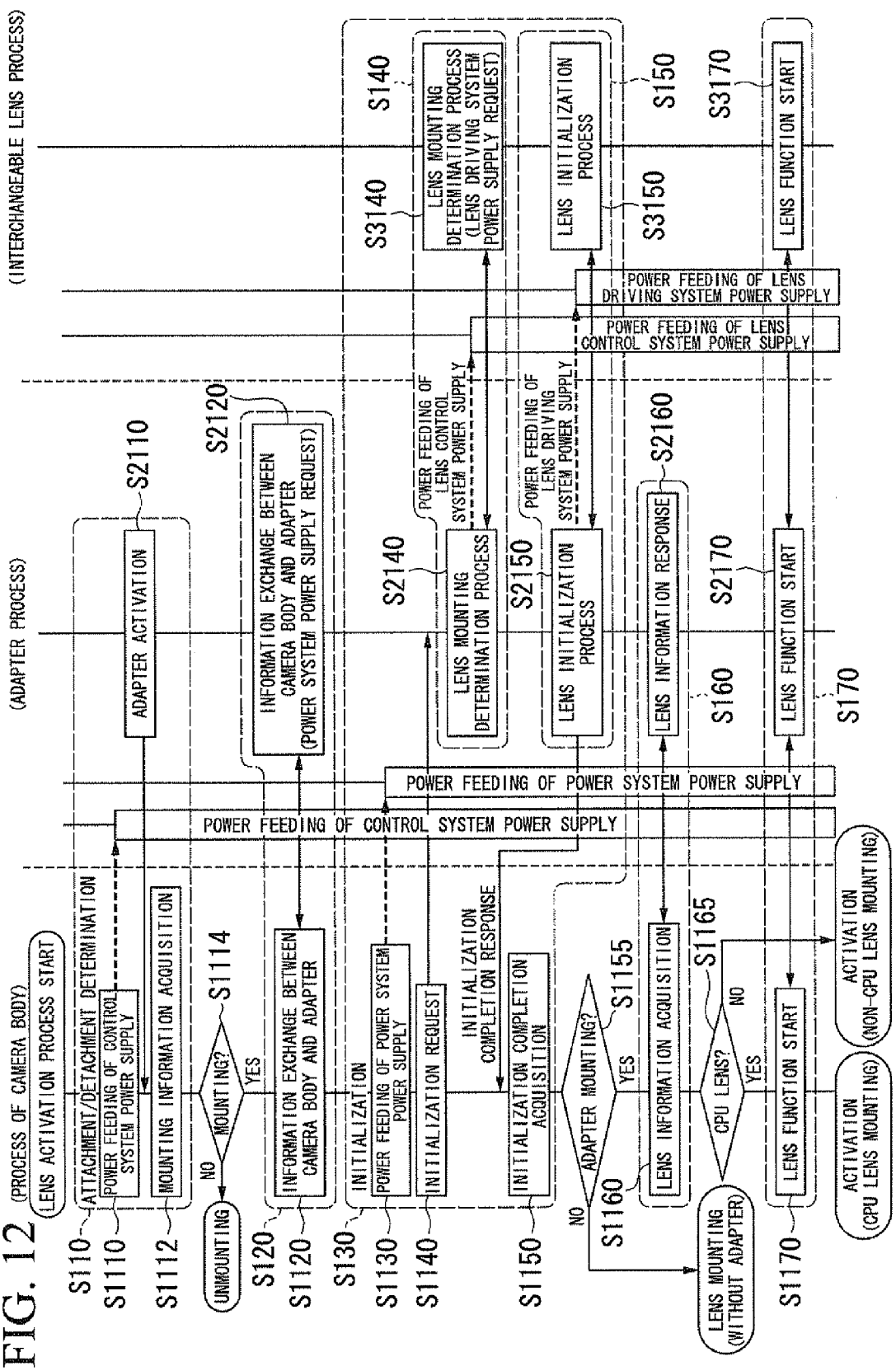

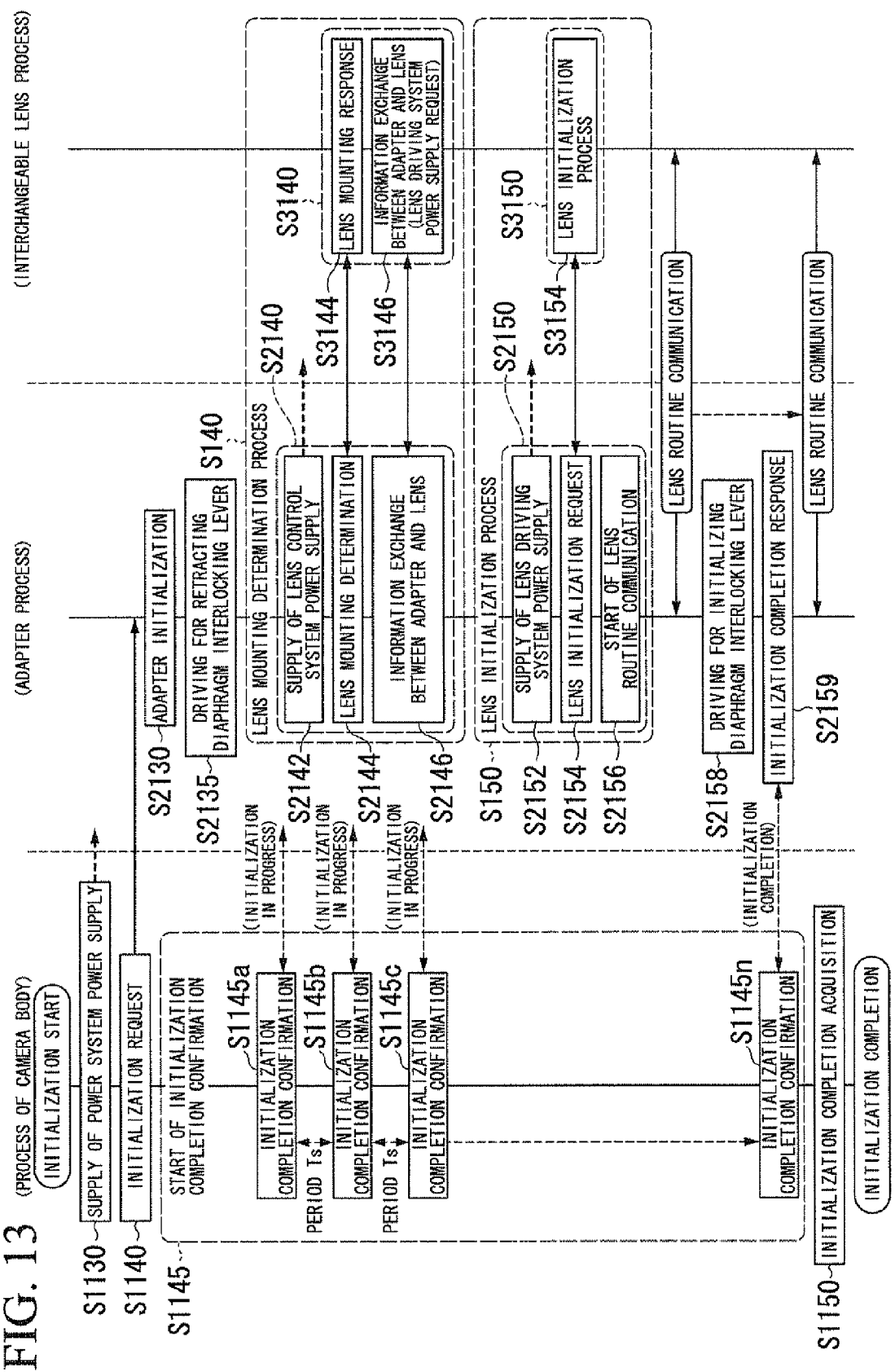

ADAPTER, CAMERA SYSTEM, AND ADAPTER CONTROL PROGRAM

CROSS-REFERENCE TO RELATED APPLICATION

This application is a non-provisional application claiming priority to the benefit of U.S. provisional application No. 61/589,547, filed on Jan. 23, 2012 and U.S. provisional application No. 61/589,566, filed on Jan. 23, 2012. This application also claims priority to Japanese Patent Application No. 2011-160845, filed on Jul. 22, 2011 and Japanese Patent Application No. 2011-160844, filed on Jul. 22, 2011. The entire contents of each of the applications identified above are incorporated herein by reference.

BACKGROUND

1. Field of the Invention

The present invention relates to an adapter, a camera system, and an adapter control program.

2. Description of Related Art

An interchangeable-lens camera system having a camera body and an interchangeable lens which is detachably attached to the camera body is known (for example, refer to Japanese Unexamined Patent Application Publication No. 2008-275890).

The interchangeable-lens camera system is able to capture an image through various types of optical systems by changing the interchangeable lens mounted on the camera body.

SUMMARY

Recently, in digital camera systems, new interchangeable-lens camera systems, of which the camera body has a smaller size than that of the related art, have been developed.

However, in some cases, interchangeable lenses of existing camera systems may not be mounted on and function in camera bodies of the new interchangeable-lens camera systems.

However, generally the existing interchangeable lenses have come into widespread use. Hence, in the new interchangeable-lens camera systems, in order to be able to capture images through various types of optical systems, it is preferable that the existing interchangeable lens be mounted on and function in these systems.

An object of aspects according to the present invention is to provide an adapter, a camera system, and an adapter control program that enable various types of optical systems to appropriately function in the interchangeable-lens camera system.

According to an aspect of the present invention, an adapter is provided including: a first mount section that is detachably attached to a camera body; a second mount section that is provided separately from the first mount section and is detachably attached to an interchangeable lens; and an adapter control section that is capable of communicating between the camera body mounted on the first mount section and the interchangeable lens mounted on the second mount section. The adapter control section provides body transmission lens information for transmission to the camera body, on the basis of lens information requested from the camera body and lens information received from the interchangeable lens, through mutually different methods according to the type of the lens information.

Further, according to an aspect of the present invention, a camera system is provided including: the adapter mentioned above; the camera body mounted on the first mount section; and the interchangeable lens mounted on the second mount section.

Furthermore, according to an aspect of the present invention, an adapter control program is provided for controlling operations of an adapter control section installed in an adapter including a first mount section that is detachably attached to a camera body and a second mount section that is provided separately from the first mount section and is detachably attached to an interchangeable lens. The adapter control program includes a step of providing body transmission lens information for transmission to the camera body, on the basis of lens information requested from the camera body and lens information received from the interchangeable lens, through mutually different methods according to types of the lens information.

Furthermore, according to an aspect of the present invention, an adapter control program for controlling operations of an adapter control section installed in an adapter including a first mount section that is detachably attached to a camera body and a second mount section that is provided separately from the first mount section and is detachably attached to an interchangeable lens, the adapter control program comprising: a first step of performing first regular communication with a lens control section in the interchangeable lens mounted on the second mount section in a first communication period; a second step of performing second regular communication with a camera control section in the camera body mounted on the first mount section in a second communication period; a third step of communicating with the lens control section a plurality of times in the first regular communication, and acquiring first information from the lens control section for each time; and a fourth step of generating second information to be transmitted to the camera control section through the second regular communication, on the basis of a plurality of the first informations, which are acquired through communications different from one another, among the first informations which are acquired through the plurality of communications.

According to the aspects of the present invention, it is possible to cause various types of optical systems to appropriately function in the interchangeable-lens camera system.

BRIEF DESCRIPTION OF THE DRAWINGS

FIG. 12 is a diagram illustrating an example of a process sequence of a lens activation process.

FIG. 13 is a diagram illustrating an example of a process sequence of an initialization process in the lens activation process.

DESCRIPTION OF EMBODIMENTS

Hereinafter, embodiments according to the present invention will be described with reference to the accompanying drawings.

Figure 1:
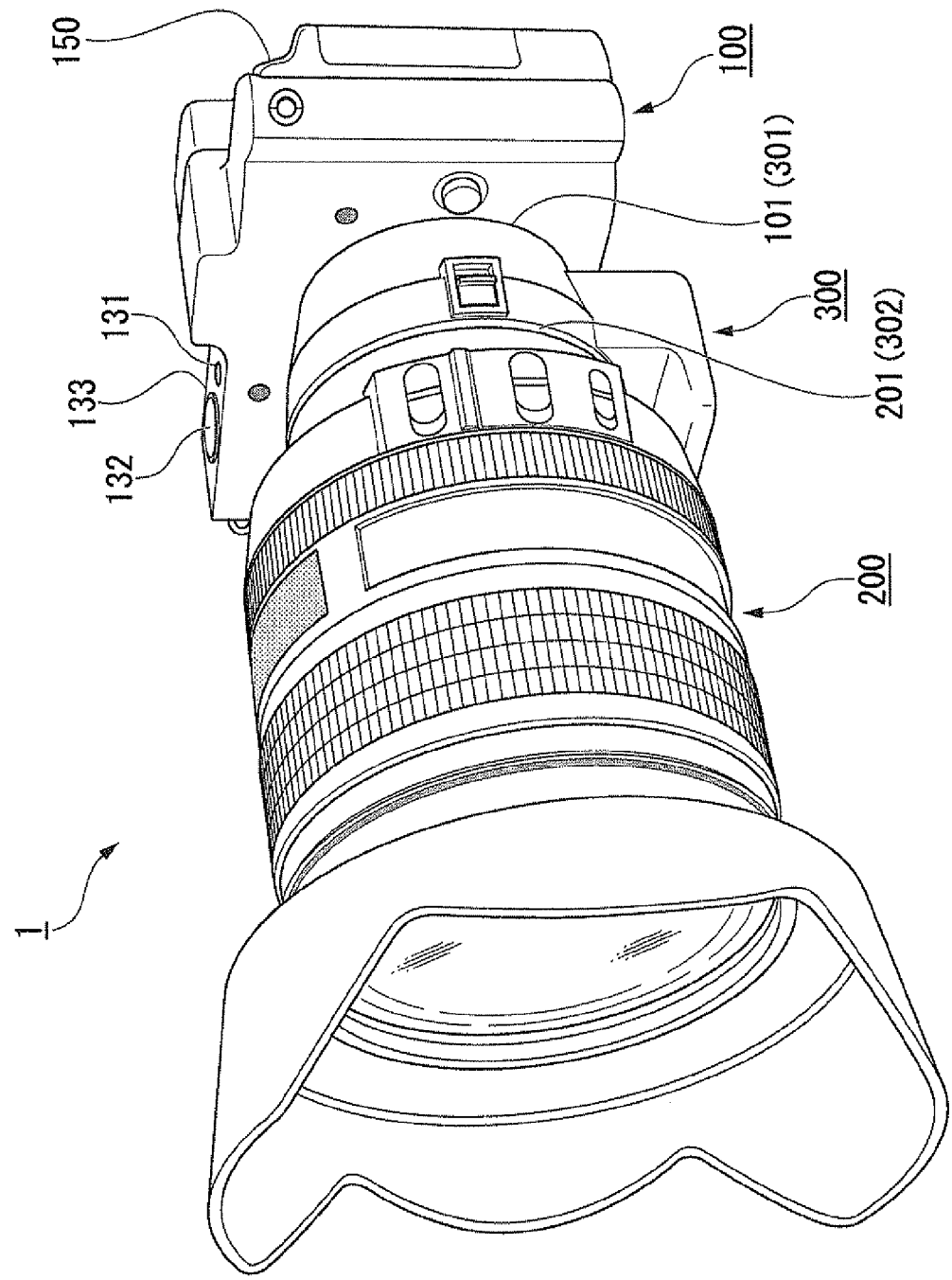
FIG. 1 is a perspective view illustrating a configuration of a camera system according to an embodiment of the present invention.

FIG. 1 is a perspective view illustrating a configuration of a camera system 1 according to an embodiment of the present invention.

The camera system 1 shown in FIG. 1 is an interchangeable-lens camera system, and includes a camera body 100, an interchangeable lens 200, an adapter 300 which is provided between the camera body 100 and the interchangeable lens 200 and is detachably attached to the camera body 100 and the interchangeable lens 200.

In this drawing, the adapter 300 is mounted on the camera body 100. Further, the interchangeable lens 200 is mounted on the camera body 100 with the adapter 300 interposed therebetween.

In the camera system 1, the specification of a camera body-side mount 101, which is a lens mount provided in the camera body 100, is different from the specification of a lens-side mount 201 which is a lens mount provided in the interchangeable lens 200. For example, mount shapes and connection terminals for electrical connection of the specification of the camera body-side mount 101 and the specification of the lens-side mount 201 are different from each other. Further, communication standards of communication through the corresponding connection terminal and communication data types thereof are different from each other. Hence, it is difficult to directly mount the interchangeable lens 200 on the camera body 100.

Therefore, the adapter 300 is formed as a mount adapter that enables the interchangeable lens 200 to be indirectly mounted on the camera body 100. Furthermore, the adapter 300 is formed between the camera body 100 and the interchangeable lens 200 having communication standards and communication data types different from each other so as to enable them to communicate with each other without changing their communication standards and the like.

Further, the camera body 100 includes a power button 131, a release button 132, a rear-side operation section 133, and a display section 150.

The power button 131 is an operation member used to switch on and off a main power supply in the camera body 100.

The release button 132 is an operation member used to accept instructions to start a photography process. For example, the release button 132 accepts two kinds of instructions to start the photography process based on a state where the button is pressed halfway (a half-pressed state, for example, a state for receiving focus adjustment, exposure adjustment, and the like) and a state where the button is pressed fully (a full-pressed state, for example, a state for receiving the instruction to start exposure).

The rear-side operation section 133 is provided on the rear side opposite to the side, on which the camera body-side mount 101 is provided, among the sides of the casing of the camera body 100. The rear-side operation section 133 is configured to include an operation member such as a selection button of operation modes (for example, a mode dial) or a selection button of various setting conditions (for example, a menu button or an up-down-right-left selection button).

The display section 150 is provided on the rear side similarly to the rear-side operation section 133, and thus displays photographed images or a menu screen for selecting various setting conditions. The display section 150 is configured to include, for example, a liquid crystal display, an organic EL (Electro-Luminescence) display, or the like.

Figure 2:
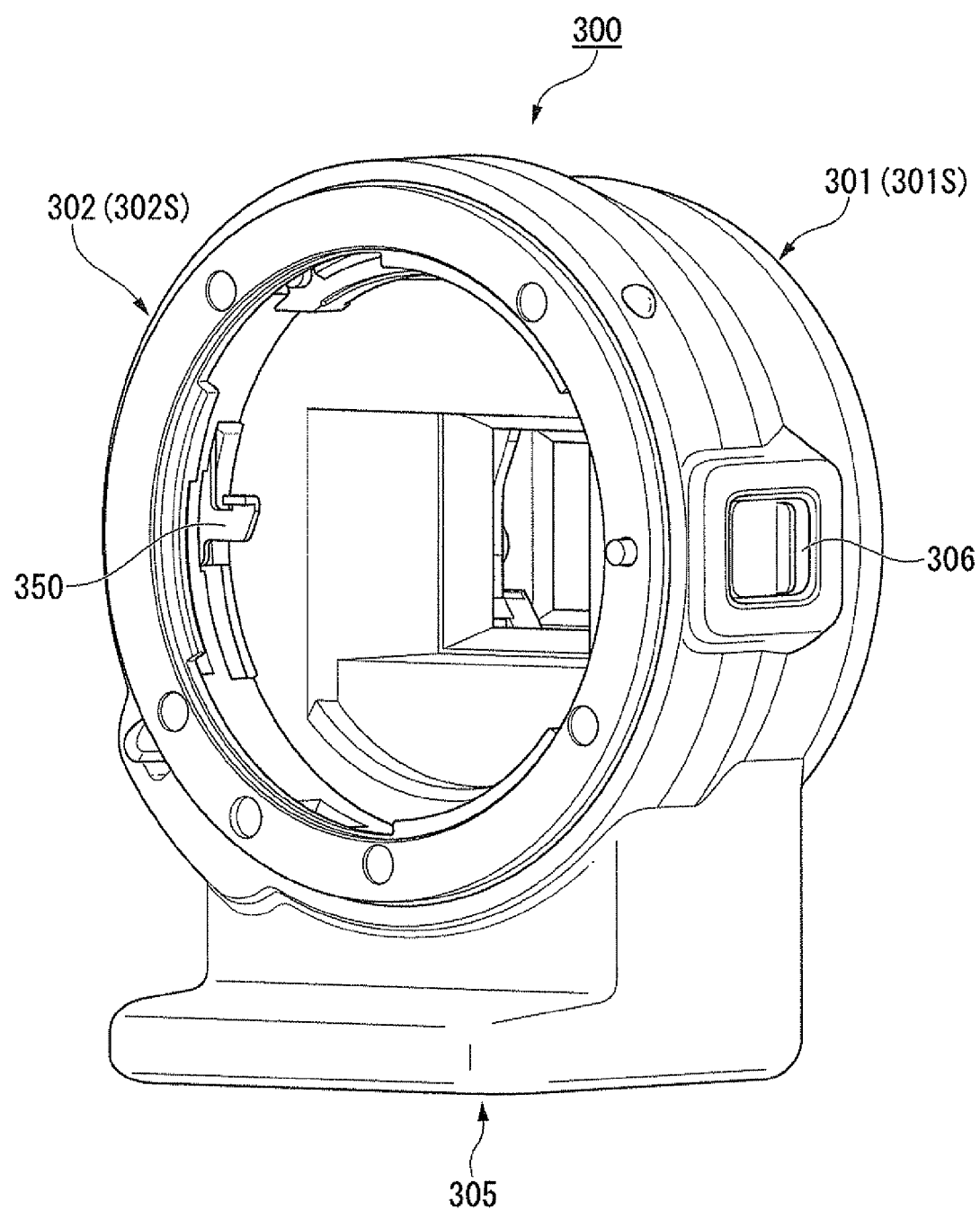
FIG. 2 is a perspective view illustrating an example of a configuration of an adapter according to the present embodiment.

FIG. 2 is a perspective view illustrating an example of a configuration of the adapter 300 according to the present embodiment.

The adapter 300 includes: a first mount section that is detachably attached to the camera body 100; and a second mount section that is provided separately from the first mount section and is detachably attached to the interchangeable lens 200.

For example, as shown in FIG. 2, the adapter 300 includes: a first mount 301 (the first mount section) that is detachably attached to the camera body-side mount 101 provided in the camera body 100; and a second mount 302 (the second mount section) that is detachably attached to the lens-side mount 201 provided in the interchangeable lens 200.

In addition, in the vicinity of the first mount 301, a plurality of electric connection terminals (mount contact points), which respectively correspond to a plurality of electric connection terminals provided in the vicinity of the camera body-side mount 101, is provided. Thereby, when mounted on the camera body 100, the adapter 300 is electrically connected to the camera body 100 through the plurality of connection terminals.

Further, in the vicinity of the second mount 302, a plurality of electric connection terminals, which respectively correspond to a plurality of electric connection terminals provided in the vicinity of the lens-side mount 201, is provided.

Thereby, when mounted on the interchangeable lens 200, the adapter 300 is electrically connected to the interchangeable lens 200 through the plurality of connection terminals.

Further, the adapter 300 includes: a tripod mount 305 to mount the adapter 300 on a tripod; a lens attachment/detachment button 306; and a diaphragm interlocking lever 350.

The lens attachment/detachment button 306 is a button to release the lock of the locking mechanism which mechanically locks the adapter 300 into the interchangeable lens 200 when the lens is mounted. That is, the lens attachment/detachment button 306 is an operation member that is operated by a user when the interchangeable lens 200 mounted on the adapter 300 is detached.

A diaphragm interlocking lever 350 (the diaphragm interlocking mechanism portion) is a lever that displaces a diaphragm mechanism 251 (refer to FIG. 3) including a plurality of diaphragm blades which change the diaphragm aperture diameter (the stopping amount of the diaphragm, the aperture size, the aperture ratio, the aperture value) by using the diaphragm of the interchangeable lens 200, and the lever is provided in the adapter 300. By moving the position of the diaphragm interlocking lever 350 in a direction along the inner circumference of the adapter 300, the aperture diameter of the diaphragm of the interchangeable lens 200 is changed.

For example, the interchangeable lens 200 includes a diaphragm lever 252 (refer to FIG. 3) that displaces the diaphragm mechanism 251. Accordingly, the diaphragm aperture diameter of the interchangeable lens 200 is displaced by moving the position of the diaphragm lever 252. Then, the diaphragm lever 252 is fitted to the diaphragm interlocking lever 350, and is configured to move in conjunction with the diaphragm interlocking lever 350. Hence, the diaphragm aperture diameter of the interchangeable lens 200 is changed by moving the position of the diaphragm interlocking lever 350.

That is, the diaphragm interlocking lever 350 is moved to a position according to the aperture value of the diaphragm mechanism 251 (diaphragm) provided in the interchangeable lens 200.

Description of Block Configuration of Camera System

Next, referring to FIG. 3, the block configuration of the camera system 1 will be described.

Figure 3:
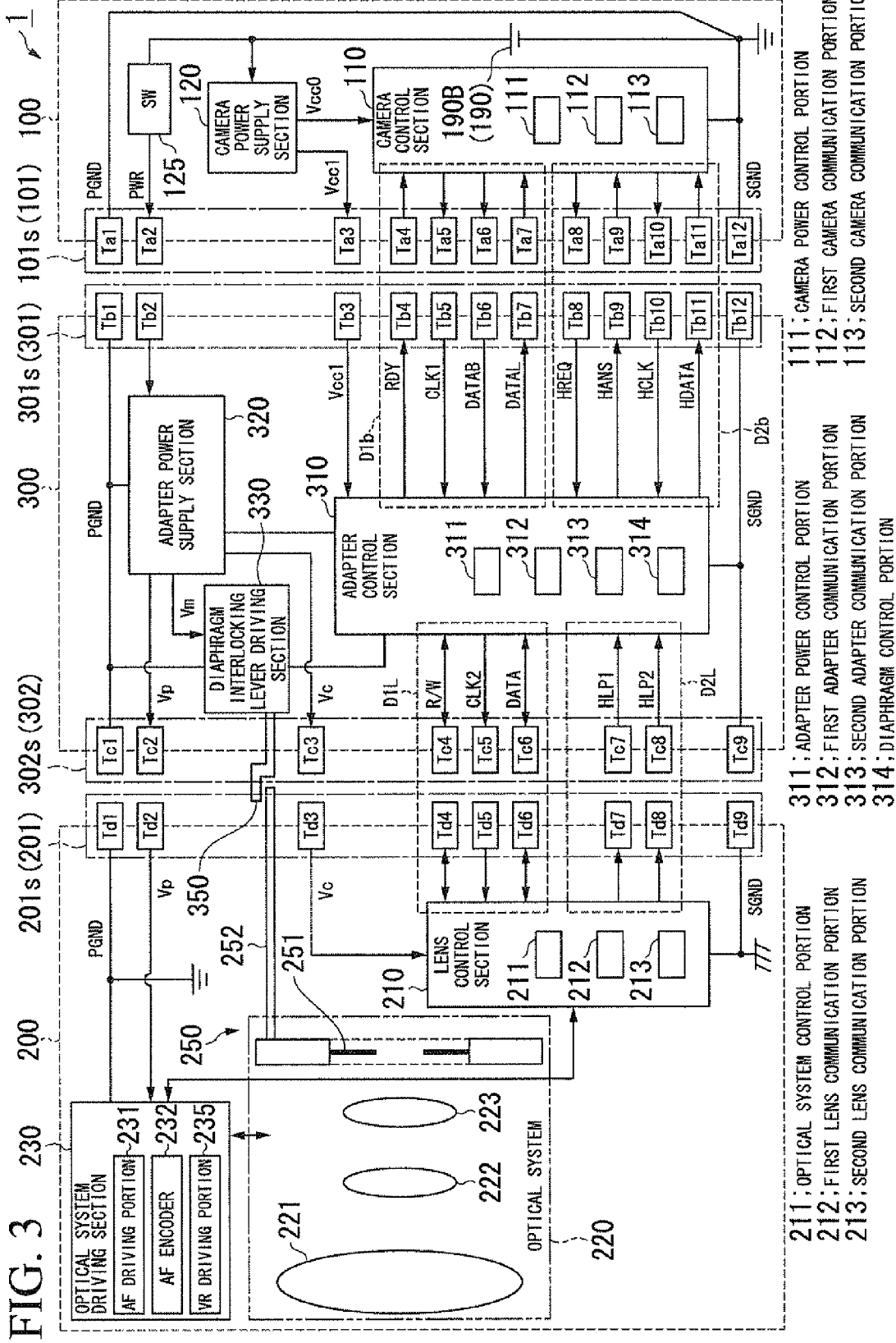
FIG. 3 is a schematic block diagram illustrating a first example of a configuration of the camera system according to the present embodiment.

FIG. 3 is a schematic block diagram illustrating an example of the configuration of the camera system 1 according to the present embodiment. In the drawing, the interchangeable lens 200 is mounted on the camera body 100 with the adapter 300 interposed therebetween. Further, the camera body 100, the interchangeable lens 200, and the adapter 300 are electrically connected to each other through the connection terminals which are respectively provided therein.

First, a brief overview of the configuration of the camera system 1 will be described.

The camera body 100 has the camera body-side mount 101 including a connection section 101s. The adapter 300 has the first mount 301 including a connection section 301s and the second mount 302 including a connection section 302s. The interchangeable lens 200 has the lens-side mount 201 including a connection section 201s.

The adapter 300 is mounted on (physically connected to) the camera body 100 through the camera body-side mount 101 and the first mount 301, and both are electrically connected to each other through the connection section 101s and the connection section 301s. The connection section 101s and the connection section 301s are respectively provided with twelve connection terminals (terminals Ta1 to Ta12 and terminals Tb1 to Tb12) which are electrically connected to each other, thereby feeding a voltage (supplying a voltage) and exchanging (communicating) signals between the camera body 100 and the adapter 300 through the connection terminals.

In addition, the exchange (communication) of signals is performed between a camera control section 110, which is provided in the camera body 100, and an adapter control section 310 which is provided in the adapter 300.

The adapter 300 is mounted on (physically connected to) the interchangeable lens 200 through the lens-side mount 201 and the second mount 302, and both are electrically connected to each other through the connection section 201s and the connection section 302s. The connection section 201s and the connection section 302s are respectively provided with nine connection terminals (terminals Tc1 to Tc9 and terminals Td1 to Td9) which are electrically connected to each other, thereby feeding a voltage (supplying a voltage) and exchanging (communicating) signals between the interchangeable lens 200 and the adapter 300 through the connection terminals.

In addition, the exchange (communication) of signals is performed between a lens control section 210, which is provided in the interchangeable lens 200, and the adapter control section 310 which is provided in the adapter 300.

Configuration of Camera Body

Next, a configuration of the camera body 100 will be described.

The camera body 100 includes the camera control section 110, a camera power supply section 120, a switch 125, a battery section 190B, and the connection section 101s (terminals Ta1 to Ta12).

The connection section 101s has twelve connection terminals of the terminals Ta1 to Ta12 as connection terminals which are connected to the twelve connection terminals (terminals Tb1 to Tb12) of the connection section 301s provided in the adapter 300.

In addition, a configuration of the adapter 300 will be described in detail later.

A battery section 190B houses a battery 190.

The battery 190 supplies a voltage to the camera body 100, the interchangeable lens 200, and the adapter 300. For example, the battery 190 is a lithium-ion secondary battery, a nickel hydride secondary battery, or the like. The battery 190 may be a primary battery such as an alkaline battery. Further, the camera body 100 is not limited to the configuration in which a voltage is supplied from the battery 190, and the voltage may be supplied from an external direct-current power supply (such as an AC adapter that supplies a voltage by transforming an alternating-current power supply into a direct-current power supply).

The camera power supply section 120 converts the voltage, which is supplied from the battery 190, so as to be able to supply the battery voltage to the camera body 100 or the camera accessory which is connected to the camera body 100. For example, by converting the battery voltage, the camera power supply section 120 is divided into: a power supply Vcc0 that supplies a voltage to control system circuits (mainly the camera control section 110) provided in the camera body 100; and a power supply Vcc1 that is a first power supply system which supplies a voltage to the adapter 300 connected to the connection section 101s. The voltage of the power supply Vcc1 is supplied to the control system circuits (mainly adapter control section 310) provided in the adapter 300. Hereinafter, the power supply Vcc1 is referred to as a control system power supply Vcc1.

Further, the camera power supply section 120 switches a supply state and a supply stop state of the voltage supplied by the control system power supply Vcc1 through the control of the camera control section 110. Furthermore, the camera power supply section 120 controls the supply of electric power (an amount of electricity, an amount of power feeding) through the control of the camera control section 110. For example, the camera power supply section 120 switches a state (normal power feeding state), in which the electric power (the amount of electricity, the amount of power feeding) which can be supplied is large to the extent that it is possible to execute the photography process in the camera system 1, and a state (state for feeding a small voltage) in which the electric power (the amount of electricity, the amount of power feeding) which can be supplied is small to the extent that it is difficult to execute the photography process in the camera system 1.

In addition, the voltage of the control system power supply Vcc1 is supplied to the adapter control section 310 through the terminal Ta3 and the terminal Tb3.

Further, the terminal Ta2 and the positive terminal of the battery 190 are connected to the battery section 190B through the switch 125. Thereby, separately from the power supply Vcc1 as the above-mentioned first power supply system, a power supply PWR as a second power supply system is generated from the battery 190, and the voltage is supplied from the power supply PWR to the adapter power supply section 320. The voltage of the power supply PWR is supplied to the adapter power supply section 320 through the terminal Ta2 and the terminal Tb2. Instead of the battery 190, the external direct-current power supply may supply the voltage of the power supply PWR. Further, the power supply PWR is a power supply system which is able to supply a larger electric power than the control system power supply Vcc1. Hereinafter, the power supply PWR is referred to as a power-system power supply PWR.

Further, a power system ground PGND, which is a ground (GND) corresponding to the power-system power supply PWR, is connected to the terminal Ta1 and the respective sections to which the voltage of the power-system power supply PWR is supplied. On the other hand, a control system ground SGND, which is a ground corresponding to the control system power supply Vcc1, is connected to the terminal Ta12. Further, the power system ground PGND and the control system ground SGND are respectively grounded at an electric potential equal to the negative terminal of the battery 190 through the battery section 190B.

In addition, the control system ground SGND is also a ground corresponding to the power supply Vcc0, and the control system ground SGND is connected to the ground terminal of the camera control section 110.

The switch 125 switches the conducting state and the cut-off state (non-conducting state) through the control of the camera control section 110. That is, the switch 125 switches whether or not to supply the voltage of the power-system power supply PWR to the terminal Ta2 through the control of the camera control section 110.

The camera control section 110 includes a camera power control portion 111, a first camera communication portion 112, and a second camera communication portion 113. The camera control section 110 controls the respective sections which are provided in the camera body 100, and performs two communication systems, namely, a first data communication system D1b and a second data communication system D2b, with the adapter control section 310 of the adapter 300 connected through the connection section 101s.

The camera power control portion 111 controls the camera power supply section 120 and the switch 125, on the basis of the state of the camera body 100 or the communication state of the first camera communication portion 112 or the second camera communication portion 113.

In addition, the first camera communication portion 112 and the second camera communication portion 113 independently perform two communication systems, namely, the first data communication system D1b and the second data communication system D2b, respectively.

The first data communication system D1b is a communication system using full-duplex communication of the serial interface system. The first camera communication portion 112 exchanges (communicates) four types of signals, namely, RDY, CLK1, DATAB, and DATAL through the first data communication system D1b.

The signal RDY is a signal for notifying whether or not to perform communication to the first camera communication portion 112. The signal RDY is transmitted (output) from a first adapter communication portion 312 to be described later to the first camera communication portion 112 through the terminal Ta4. The signal CLK1 is a clock signal for serial communication. The clock signal CLK1 is transmitted (output) from the first camera communication portion 112 to the first adapter communication portion 312 through the terminal Ta5. The signal DATAB is output from the first camera communication portion 112 to the first adapter communication portion 312 through the terminal Ta6, and is a signal of data on the camera body 100. The signal DATAL is output from the first adapter communication portion 312 to the first camera communication portion 112, and is a signal of data on the interchangeable lens 200. The first camera communication portion 112 receives the signal DATAL through the terminal Ta7.

The second data communication system D2b is a serial interface system, and is a communication system using simplex communication by which the data is transmitted to the camera body 100. The second camera communication portion 113 exchanges (communicates) four types of signals, namely, HREQ, HANS, HCLK, and HDATA.

The signal HREQ is a signal indicating a communication request from the second camera communication portion 113, and the second camera communication portion 113 transmits (outputs) the signal to the second adapter communication portion 313 to be described later through the terminal Tb8. The signal HANS is a signal indicating a communication response to the second camera communication portion 113, and is transmitted from the second adapter communication portion 313 to the second camera communication portion 113 through the terminal Tb9. The signal HCLK is a clock signal for serial communication. The clock signal HCLK is transmitted (output) from the second camera communication portion 113 to the second adapter communication portion 313 through the terminal Tb10. The signal HDATA is a lens data signal which is transmitted from the second adapter communication portion 313 to the second camera communication portion 113 through the terminal Tb11.

In addition, communication contents of the first data communication system D1b and the second data communication system D2b will be described in detail later.

Configuration of Interchangeable Lens

Next, a configuration of the interchangeable lens 200 will be described.

The interchangeable lens 200 includes the connection section 201s (terminals Td1 to Td9), the lens control section 210, an optical system 220, and an optical system driving section 230.

The subject light (optical image), which is incident through the optical system 220, is guided onto a light receiving surface of a well-known photography element (not shown in the drawing), which is provided in the camera body 100, through the adapter 300.

The optical system 220 includes a lens 221, a lens for focus adjustment (hereinafter referred to as a focus lens) 222, a lens for image blur correction of optical images (for vibration-proof) (hereinafter referred to as a VR (Vibration Reduction) lens) 223, and a diaphragm section 250.

The diaphragm section 250 includes the diaphragm mechanism 251 that includes the plurality of diaphragm blades, and the diaphragm lever 252 that mechanically operates the diaphragm mechanism 251. Accordingly, the diaphragm aperture diameter of the interchangeable lens 200 is changed in a way that the diaphragm lever 252 mechanically operates the diaphragm mechanism 251. Further, the interchangeable lens 200 in the camera system 1 shown in FIG. 3 is a lens in which a power supply such as an actuator which drives the diaphragm mechanism 251 is not built in, and is also a lens in which the diaphragm mechanism 251 is driven through the diaphragm lever 252 by the diaphragm interlocking lever 350 of the adapter 300.

The optical system driving section 230 include an AF (Auto Focus) driving portion 231, an AF encoder 232, and a VR driving portion 235.

The AF driving portion 231 drives the focus lens 222 through the control of the lens control section 210. Further, the AF encoder 232 detects the position of the focus lens 222, and supplies the detection result to the lens control section 210.

The VR driving portion 235 drives the VR lens 223 through the control of the lens control section 210.

The interchangeable lens 200 may include a focus ring that is manually operated by a user so as to thereby move the position of the focus lens 222.

The connection section 201s includes nine connection terminals Td1 to Td9 which are connected to nine connection terminals (terminals Tc1 to Tc9) of the connection section 302s provided in the adapter 300.

The power supply Vp, which supplies the voltage of the optical system driving section 230, is supplied through the terminal Td2.

Hereinafter, the power supply Vp is referred to as a lens driving system power supply Vp. The lens driving system power supply Vp is supplied from the power-system power supply PWR through the adapter 300.

For example, the voltage of the lens driving system power supply Vp is supplied from the terminal Td2 to the optical system driving section 230, of which power consumption is large, like an actuator driving the focus lens 222 provided in the AF driving portion 231, an actuator driving the VR lens 223, or the like. Further, the power system ground PGND which is a ground corresponding to the lens driving system power supply Vp is connected to the terminal Td1 and the ground terminal of the optical system driving section 230.

The power supply Vc, which supplies the voltage of the lens control section 210, is connected to the terminal Td3. Hereinafter, the power supply Vc is referred to as a lens control system power supply Vc. The lens control system power supply Vc is supplied from the power-system power supply PWR through the adapter 300.

The voltage of the lens control system power supply Vc is supplied through the terminal Td3 to the control system circuits and the like including the lens control section 210 of which the power consumption is smaller than that of the optical system driving section 230. Further, the control system ground SGND, which is a ground corresponding to the lens control system power supply Vc, is connected to the terminal Td9 and the ground terminal of the lens control section 210.

That is, the power system ground PGND and the control system ground SGND are not connected to each other in the interchangeable lens 200, and are divided into grounds of two systems.

The lens control section 210 includes an optical system control portion 211, a first lens communication portion 212, and a second lens communication portion 213. The lens control section 210 controls the optical system driving section 230, and controls two communication systems, namely, the first data communication system D1L and the second data communication system D2L, with the adapter control section 310 of the adapter 300 connected through the connection section 201s.

The optical system control portion 211 controls the optical system driving section 230. For example, the optical system control portion 211 initializes the optical system driving section 230 in accordance with the state of communication with the adapter 300. Further, the optical system control portion 211 controls the optical system driving section 230 so as to drive a driving element such as the focus lens 222 or the VR lens 223 in accordance with the control of the camera control section 110 which is performed through the adapter 300. Further, the optical system control portion 211 acquires information (for example, information on the position of the focus lens 222 detected by the AF encoder 232 and the like) on the optical system (driving element) 220 supplied from the optical system driving section 230.

The first lens communication portion 212 and the second lens communication portion 213 respectively perform two communication systems, namely, the first data communication system D1L and the second data communication system D2L at independent timings.

The first data communication system D1L is a communication system using half-duplex communication of the serial interface system. The first lens communication portion 212 communicates three types of signals, namely, R/W, CLK2, and DATA through the first data communication system D1L.

The signal R/W is a read/write signal indicating the communication direction of the data signal to be described later, is also a signal used for performing a handshake between a lens-side and an adapter, and is transmitted and received between the first lens communication portion 212 and the first adapter communication portion 312 to be described later through the terminal Td4. The signal CLK2 is a clock signal for serial communication, and is transmitted (output) from the first adapter communication portion 312 to the first lens communication portion 212 through the terminal Td5. The signal DATA is a data signal which is transmitted and received between the first adapter communication portion 312 and the first lens communication portion 212 through the terminal Td6.

The second data communication system D2L is a pulse communication system, and a communication system using simplex communication by which the pulse signal is output from the interchangeable lens 200. The second lens communication portion 213 transmits two types of pulse signals, namely, HLP1, HLP2 through the second data communication system D2L.

The signal HLP1 is a pulse signal which is transmitted to the second adapter communication portion 313 to be described later through the terminal Td7. The signal HLP2 is a pulse signal which is output from the second lens communication portion 213 to the second adapter communication portion 313 through the terminal Td8. Such pulse signals HLP1 and HLP2 are pulse signals responsive to the signal output from the AF encoder 232.

The communication contents communicated in the first data communication system D1L and the second data communication system D2L will be described later.

Configuration of Adapter

Next, a configuration of the adapter 300 will be described. The adapter 300 includes the adapter control section 310, the adapter power supply section 320, the diaphragm interlocking lever driving section 330 (diaphragm interlocking mechanism driving portion), the connection section 301s (terminals Tb1 to Tb12), the connection section 302s (terminals Tc1 to Tc9), and the diaphragm interlocking lever 350.

The connection section 301s includes twelve connection terminals Tb1 to Tb12 connected to the above-described twelve connection terminals Ta1 to Ta12 on the camera body 100 side. The adapter 300 and the camera body 100 are connected through the connection section 301s and connection section 101s. Thereby, the respective terminals of the terminals Tb1 to Tb12 of the connection section 301s are electrically connected to the connection terminals respectively corresponding to the terminals Ta1 to Ta12 of the connection section 101s.

Further, the connection section 302s includes nine connection terminals Tc1 to Tc9 connected to the above-described nine connection terminals (terminals Td1 to Td9) on the interchangeable lens 200 side. The adapter 300 and the interchangeable lens 200 are connected through the connection section 302s and the connection section 201s. The respective terminals of the terminals Tc1 to Tc9 of the connection section 302s are connected to the connection terminals respectively corresponding to the terminals Td1 to Td9 of the connection section 201s.

The terminal Tb2 is connected to the terminal Ta2, and the terminal Tb3 is connected to the terminal Ta3. Thereby, the voltage of the power-system power supply PWR is supplied from the camera body 100 to the terminal Tb2 through the terminal Ta2, and the voltage of the control system power supply Vcc1 is supplied to the terminal Tb3 through the terminal Ta3. Thereby, the adapter power supply section 320 is supplied with the voltage of the power-system power supply PWR from the camera body 100 through the terminal Ta2 and the terminal Tb2.

On the other hand, the adapter control section 310 is supplied with the voltage of the control system power supply Vcc1 from the camera body 100 through the terminal Ta3 and the terminal Tb3.

As described above, the adapter 300 is supplied with both of the voltage of the control system power supply Vcc1 (the voltage of the first power supply system) from the camera body 100 and the voltage of the power-system power supply PWR (the voltage of the second power supply system) which is able to supply a larger electric power than the control system power supply Vcc1. The voltage of the power-system power supply PWR, which is supplied to the adapter power supply section 320, can be divided (converted) into the lens driving system power supply Vp (third power supply system) and the lens control system power supply Vc (fourth power supply system) as the lens system power supply systems which supply the voltage to the interchangeable lens 200. For example, the adapter power supply section 320 generates the supply voltages of the lens driving system power supply Vp and the lens control system power supply Vc, which feed voltages to the interchangeable lens 200, from the power-system power supply PWR which is supplied from the camera body 100.

The voltage, which is supplied from the lens driving system power supply Vp, is larger than the voltage which is supplied from the lens control system power supply Vc. Further, the power consumption in the load supplied from the lens driving system power supply Vp may be larger than the power consumption in the load supplied from the lens control system power supply Vc.

Furthermore, from the power-system power supply PWR supplied to the adapter power supply section 320, separately from the above-mentioned lens driving system power supply Vp and the lens control system power supply Vc, the power supply Vm (fifth power supply system), which supplies a voltage to the diaphragm interlocking lever driving section 330, is also generated (can be divided). Hereinafter, the power supply Vm is referred to as a diaphragm driving power supply Vm.

For example, the adapter power supply section 320 includes a voltage conversion section that converts the voltage of the power-system power supply PWR into a predetermined voltage of the diaphragm driving power supply Vm. The voltage conversion section includes, for example, a DC-DC converter. Further, the voltage conversion section converts the voltage into a voltage which is stepped up to, for example, a predetermined voltage (the predetermined voltage of the diaphragm driving power supply Vm). Then, the adapter power supply section 320 supplies the generated voltage of the diaphragm driving power supply Vm to the diaphragm interlocking lever driving section 330.

The adapter power supply section 320 may include a first regulator portion that converts (generates) the voltage of the lens control system power supply Vc on the basis of the voltage of the diaphragm driving power supply Vm.

For example, the first regulator portion converts the voltage of the diaphragm driving power supply Vm into a voltage which is stepped down to a predetermined voltage (a predetermined voltage of the lens control system power supply Vc). Further, for example, the first regulator portion may include a first linear regulator. The voltage of the diaphragm driving power supply Vm is set to be higher than the voltage of the lens control system power supply Vc.

Further, the adapter power supply section 320 may include a second regulator portion that converts (generates) the voltage of the lens driving system power supply Vp on the basis of the voltage of the power-system power supply PWR. For example, the second regulator portion converts the voltage of the power-system power supply PWR into a voltage which is stepped down to a predetermined voltage (a predetermined voltage of the lens driving system power supply Vp). Further, for example, the second regulator portion may include a second linear regulator. In this case, the second regulator portion is configured to supply a larger electric power (the amount of power feeding is larger) than that of the first regulator portion.

Further, the adapter power supply section 320 has a voltage detection portion that detects the power supply voltage, and supplies the detection result to the adapter control section 310.

An internal configuration of the adapter power supply section 320 will be described later with reference to FIG. 4.

The respective connections of the power supply systems converted by the adapter power supply section 320 are as follows.

The terminal Tc2 is connected to the output terminal of the lens driving system power supply Vp (the terminal that outputs the voltage of the lens driving system power supply Vp) of the adapter power supply section 320. Further, the terminal Tc3 is connected to the output terminal of the lens control system power supply Vc (the terminal that outputs the voltage of the lens control system power supply Vc) of the adapter power supply section 320. Thereby, the adapter power supply section 320 supplies the voltage of the lens driving system power supply Vp to the terminal Tc2, and supplies the voltage of the lens control system power supply Vc to the terminal Tc3.

Further, the adapter power supply section 320 supplies the voltage of the lens driving system power supply Vp to the optical system driving section 230 of the interchangeable lens 200 through the terminal Tc2 and the terminal Td2.

Further, the adapter power supply section 320 supplies the voltage of the lens control system power supply Vc to the lens control section 210 of the interchangeable lens 200 through the terminal Tc3 and the terminal Td3.

As described above, the adapter power supply section 320 is able to generate a voltage, which is supplied to the lens control section 210 and the optical system driving section 230 of the interchangeable lens 200, from the voltage of the power-system power supply PWR.

Thereby, the adapter 300 does not set the voltage of the control system power supply Vcc1, which is supplied from the camera body 100, as the voltage, which is supplied to the interchangeable lens 200, but is able to set it as the voltage which is supplied to the adapter control section 310. The camera power supply section 120 in the camera body 100 is configured to constantly supply the control system power supply Vcc1 to the connection point at which connection is made through the terminal Ta3 (as long as there is a "supply request" from the connection point). Hence, the adapter control section 310, which is connected to the terminal Ta3 through the terminal Tb3, can be constantly activated for example even if the power supply switch on the camera body 100 side is turned off. By constantly activating the adapter control section 310, it is possible to store the setting state (for example, whether or not the initialization process of the diaphragm interlocking lever 350 is complete) on the adapter 300 side. Therefore, there is an advantage in that, when the power supply switch on the camera body 100 side is turned on, the unnecessary initialization process is not performed and is terminated in the adapter 300. Further, although not described in the present embodiment, when the camera body activation switch (a switch which switches ON/OFF of the power supply on the adapter 300 side) which can be operated by a user is provided on the adapter 300 side, it is possible to constantly monitor the ON operation of the activation switch. Therefore, it is possible to configure a system which activates the camera body 100 through the operation on the adapter 300 side. (It may also be possible to adopt a system configuration which transfers the control system power supply Vcc1 to the lens control section 210 so as to constantly activate the lens control section 210. In this case, even when the operation switch to activate the camera body 100 is provided on the interchangeable lens 200 side, the adapter 300, which is not in the activation state (since the power is not supplied thereto), is interposed between both of the interchangeable lens 200 and the camera body 100, and thus it is difficult to transfer the operation of the operation switch on the interchangeable lens 200 side to the camera body 100 side. As a result, it is difficult to activate the camera body 100.)

Furthermore, the adapter power supply section 320 supplies the voltage of the diaphragm driving power supply Vm in the adapter 300 to the diaphragm interlocking lever driving section 330. In other words, the adapter 300 generates a voltage, which is supplied to the diaphragm interlocking lever driving section 330, from the voltage of the power-system power supply PWR which is supplied from the camera body 100. Since the power-system power supply PWR has a sufficiently large power feeding ability as compared with the control system power supply Vcc1, the power-system power supply PWR can be used in power feeding to various circuits. In addition, similarly to the present embodiment, even when a voltage for power feeding to the diaphragm interlocking lever driving section 330 is generated from the power-system power supply PWR (even when the power-system power supply PWR is used in combination), there is no adverse effect on operations of other circuits of the sections used in combination (for example, the operation of the above-mentioned lens control section 210).

Further, the terminal Tb1 is connected to the terminal Ta1 of the camera body 100. Thereby, the power system ground PGND is connected to the terminal Tb1 through the terminal Ta1. Further, the terminal Tb1 and the terminal Tc1 are connected through the power system ground PGND in the adapter 300. Furthermore, the terminal Tc1 is connected to the terminal Td1 of the interchangeable lens 200. Thereby, the power system ground PGND is a ground corresponding to the lens driving system power supply Vp, and is connected to the terminal Td1 through the terminal Tc1. In addition, the power system ground PGND is a ground corresponding to the ground of the adapter power supply section 320, the diaphragm interlocking lever driving section 330, and the like.

Further, the terminal Tb12 is connected to the terminal Ta12 of the camera body 100. Thereby, the control system ground SGND is connected to the terminal Tb12 through the terminal Ta12. Further, the terminal Tb12 and the terminal Tc9 are connected through the control system ground SGND in the adapter 300. Furthermore, the terminal Tc9 is connected to the terminal Td9 of the interchangeable lens 200. Thereby, the control system ground SGND is a ground corresponding to the lens control system power supply Vc, and is connected to the terminal Td9 through the terminal Tc9. In addition, the control system ground SGND is a ground corresponding to the ground of the adapter control section 310.

As described above, the power system ground PGND and the control system ground SGND are not connected to each other in the adapter 300, but are divided into the grounds of two systems.

That is, in the interchangeable lens 200 and adapter 300, the power system ground PGND and the control system ground SGND are not connected to each other, but are divided into the grounds of two systems. However, the power system ground PGND and the control system ground SGND, which are divided into two systems, are connected in the camera body 100, and are thus set to a ground at the same electric potential as that of the negative terminal of the battery 190. Accordingly, the ground of the camera control section 110, the lens control section 210, and the adapter control section 310 is connected to the control system ground SGND, and is set to an equivalent electric potential.

Accordingly, it is possible to reduce the effect of noise, which occurs in the power system ground PGND, on the control system ground SGND.

In the interchangeable lens 200, the control system ground SGND may be connected to the conductive portion (interchangeable lens casing) of the lens-side mount 201. Further, the terminal Td9, which is connected to the control system ground SGND in the interchangeable lens 200, may be configured to be included in the conductive portion of the lens-side mount 201. Likewise, in the adapter 300, the control system ground SGND may be connected to the conductive portion of the second mount 302. Further, the terminal Tc9, which is connected to the control system ground SGND in the adapter 300, may be configured to be included in the conductive portion of the second mount 302.

Furthermore, likewise, the terminal Tb12 may be connected to the conductive portion of the first mount 301, and the terminal Tb12 may be configured to be included in the conductive portion of the first mount 301. Likewise, the terminal Ta12 may be connected to the conductive portion of the camera body-side mount 101, and the terminal Ta12 may be configured to be included in the conductive portion of the camera body-side mount 101.

The diaphragm interlocking lever driving section 330 moves the position of the diaphragm interlocking lever 350 through the control of the adapter control section 310. By moving the diaphragm interlocking lever 350, the diaphragm interlocking lever driving section 330 displaces the diaphragm mechanism 251 of the interchangeable lens 200 through the diaphragm lever 252. Further, the diaphragm interlocking lever driving section 330 detects the position of the diaphragm interlocking lever 350, and outputs the corresponding detection result to the adapter control section 310.

For example, the diaphragm interlocking lever driving section 330 includes: a diaphragm driving actuator (for example, a stepping motor) that drives the diaphragm interlocking lever 350; a motor driving portion that controls driving of the diaphragm driving actuator; a diaphragm interlocking lever position detection portion that detects the position of the diaphragm interlocking lever 350; and the like. Thereby, in the diaphragm interlocking lever driving section 330, the motor driving portion drives the diaphragm driving actuator, whereby the diaphragm driving actuator drives the diaphragm interlocking lever 350. Further, in the diaphragm interlocking lever driving section 330, the diaphragm interlocking lever position detection portion (for example, a photo-interrupter) detects the position of the diaphragm interlocking lever 350, and supplies the detection result to the adapter control section 310.

The adapter control section 310 includes an adapter power control portion 311, the first adapter communication portion 312, a second adapter communication portion 313, and a diaphragm control portion 314. Further, the adapter control section 310 is controlled by periodic communication with the camera control section 110, controls the processes performed in the respective sections provided in the adapter 300, and periodically communicates with the lens control section 210. For example, the adapter control section 310 performs periodic routine communication with the camera control section 110. Further, the adapter control section 310 also performs periodic routine communication with the lens control section 210.

Furthermore, the adapter control section 310 controls the diaphragm interlocking lever driving section 330 on the basis of the communication for controlling the photography process from the camera control section 110, and communicates with the lens control section 210 in order to control the optical system driving section 230 of the interchangeable lens 200.

The adapter power control portion 311 controls the adapter power supply section 320 in accordance with the result of the communication with the camera control section 110 or the lens control section 210 or the state of the adapter 300. For example, the adapter power control portion 311 controls the adapter power supply section 320 in accordance with the result of the communication of the camera control section 110 or the lens control section 210, and controls whether or not to supply the voltage of the lens control system power supply Vc, the lens driving system power supply Vp, or the diaphragm driving power supply Vm.

Further, the adapter power control portion 311 monitors: the voltage (in other words, a state of the voltage supplied from the camera body 100 side to the adapter 300) of the power supply system to which a voltage is supplied from the camera body 100; and the voltage (in other words, a state of the voltage supplied from the adapter 300 side to the interchangeable lens 200) of the power supply system to which a voltage is generated from the adapter 300 and supplied. The adapter power control portion 311 has a voltage detection portion that detects the voltages of the respective power supply systems, and thus monitors the voltages of the respective power supply system on the basis of the detection result obtained from the voltage detection portion, and notifies the corresponding monitoring result to the camera control section 110 as necessary. This operation will be described in detail in the "process at the time of temporary blackout of power supply" (FIG. 16) to be described later.

The diaphragm control portion 314 controls the diaphragm interlocking lever driving section 330 in accordance with the result of communication with the camera control section 110 or the lens control section 210.

For example, the diaphragm control portion 314 controls the diaphragm interlocking lever driving section 330, in accordance with the result of communication with the camera control section 110, so as to make the diaphragm aperture diameter of the diaphragm mechanism 251 equal to the diaphragm aperture diameter corresponding to the instruction of the control issued from the camera control section 110.

Further, the diaphragm control portion 314 performs control, which moves the position of the diaphragm interlocking lever 350 to the initial position in accordance with the process, on the diaphragm interlocking lever driving section 330. For example, the diaphragm control portion 314 controls the diaphragm interlocking lever driving section 330 so as to move the diaphragm interlocking lever 350 to the position, at which the diaphragm mechanism 251 is open, as the initial position, and the retractable position at which it does not interfere with the diaphragm lever 252 moved in accordance with the setting aperture value of the diaphragm mechanism 251.

Further, the diaphragm control portion 314 acquires the position of the diaphragm interlocking lever 350 detected in the diaphragm interlocking lever driving section 330.

The first adapter communication portion 312 performs communication of the first data communication system D1b with the first camera communication portion 112, and performs communication of the first data communication system D1L with the first lens communication portion 212.

Specifically, the first adapter communication portion 312 relays communication between the first data communication system D1b and the first data communication system D1L, which are communication standards different from each other. For example, the first adapter communication portion 312 converts data, which is received from the first camera communication portion 112 in conformity with the communication standard of the first data communication system D1*b* as the full-duplex communication of the serial interface system, into data of the communication standard of the first data communication system D1L as the half-duplex communication of the serial interface system, and transmits the data to the first lens communication portion 212. On the other hand, the first adapter communication portion 312 converts data, which is received from the first lens communication portion 212 on the basis of the communication standard of the first data communication system D1L as the half-duplex communication of the serial interface system, into data of the communication standard of the first data communication system D1*b* as the full-duplex communication of the serial interface system, and transmits the data to the first camera communication portion 112.

Further, the first adapter communication portion 312 relays communication between the first data communication system D1*b* and first data communication system D1L communicated with periods different from each other.

Furthermore, the first adapter communication portion 312 performs a conversion process to obtain consistency between the formats of the data exchanged between the first data communication system D1*b* and the first data communication system D1L.

In addition, the adapter control section 310 includes, for example, a storage portion (not shown in the drawing). The first adapter communication portion 312 temporarily stores the data, which is generated on the basis of the received data, the converted data, and the like, in the corresponding storage portion. In addition, the first adapter communication portion 312 reads out the generated data from the corresponding portion, and transmits the data.

The first adapter communication portion 312 and the first camera communication portion 112 perform communication of the first data communication system D1*b* through the signal lines for the four types of signals RDY, CLK1, DATAB, and DATAL. The terminal Tb4 is connected to the first adapter communication portion 312 through the signal line of the signal RDY. Further, the terminal Tb5 is connected to the first adapter communication portion 312 through the signal line of the signal CLK1, the terminal Tb6 is connected thereto through the signal line of the signal DATAB, and the terminal Tb7 is connected thereto through the signal line of the signal DATAL. In addition, the terminal Tb4 is connected to the terminal Ta4 of the camera body 100, the terminal Tb5 is connected to the terminal Ta5, the terminal Tb6 is connected to the terminal Ta6, and the terminal Tb7 is connected to the terminal Ta1.

That is, the signal lines for the four types of the signals RDY, CLK1, DATAB, and DATAL for performing communication of the first data communication system D1*b* are connected between the first adapter communication portion 312 and the first camera communication portion 112 through the terminals Tb4 to Tb7 and the terminals Ta4 to Ta7.

On the other hand, the first adapter communication portion 312 and the first lens communication portion 212 perform communication of the first data communication system D1L through the signal lines for the three types of the signals R/W, CLK2, and DATA. The terminal Tc4 is connected to the first adapter communication portion 312 through the signal line of the signal R/W. Further, the terminal Tc5 is connected to the first adapter communication portion 312 through the signal line of the signal CLK2, and the terminal Tc6 is connected thereto through the signal line of the signal DATA. In addition, the terminal Tc4 is connected to the terminal Td4 of the interchangeable lens 200, the terminal Tc5 is connected to the terminal Td5, and the terminal Tc6 is connected to the terminal Td6.

That is, the signal lines for the three types of the signals R/W, CLK2, and DATA for performing communication of the first data communication system D1L are connected between the first adapter communication portion 312 and the first lens communication portion 212 through the terminals Tc4 to Tc6 and the terminals Td4 to Td6.

As described above, the communication of the first data communication system D1*b* and the communication of the first data communication system D1L are performed between the first camera communication portion 112 and the first lens communication portion 212 through the first adapter communication portion 312. In the communication of the first data communication system D1*b* and the communication of the first data communication system D1L, for example, information of the optical system 220, a request command such as a control instruction, and data of response to the request command are communicated between the first camera communication portion 112 and the first lens communication portion 212 through the first adapter communication portion 312. Here, communication in the first data communication system D1*b* and the first data communication system D1L is referred to as "command data communication".

In addition, the information of the optical system 220 is information indicating the type of the optical system 220 (information indicating a specification, a function, an optical characteristic of the optical system 220, and the like), information indicating the driving status of the optical system 220, or the like.

As described above, the first adapter communication portion 312 in the adapter control section 310 has: a function of receiving a camera control command, which is output from the first camera communication portion 112 of the camera control section 110 (in other words, the first reception section); a function of transmitting a lens control command, which is for controlling driving of the driving elements of the interchangeable lens 200, to the first lens communication portion 212 of the interchangeable lens 200 in accordance with contents received by the first reception section (in other words, the first transmission section); a function of receiving status information, which indicates the driving statuses of the driving elements, from the first lens communication portion 212 of the interchangeable lens 200 (in other words, the second reception section); and a function of transmitting the status information, which indicates the driving statuses of the driving elements, to the first camera communication portion 112 of the camera body 100 on the basis of contents received by the second reception section (in other words, the second transmission section).

The second adapter communication portion 313 receives a pulse signal of the second data communication system D2L from the second lens communication portion 213, and performs communication of the second data communication system D2*b* with the second camera communication portion 113.

Specifically, the second adapter communication portion 313 detects information which is included in the pulse signal of the second data communication system D2L, and converts the detected information in conformity with the communication standard of the second data communication system D2*b*. For example, the second adapter communication portion 313 converts data, which is received from the second lens communication portion 213 on the basis of the communication standard of the second data communication system D2L as the simplex communication of the pulse communication system, into data of the communication standard of the second data communication system D2b as the simplex communication of the serial interface system, and transmits the data to the second camera communication portion 113. Further, the second adapter communication portion 313 converts, through the control of the first adapter communication portion 312, information which is included in the pulse signal received by communication of the second data communication system D2L, on the basis of the communication standard of the second data communication system D2b, and transmits the information to the second camera communication portion 113.

The second adapter communication portion 313 and the second camera communication portion 113 performs communication of the second data communication system D2b through signal lines for four types of signals HREQ, HANS, HCLK, and HDATA. The terminal Tb8 is connected to the second adapter communication portion 313 through the signal line of the signal HREQ. Further, the terminal Tb9 is connected to the second adapter communication portion 313 through the signal line of the signal HANS, the terminal Tb10 is connected thereto through the signal line of the signal HCLK, and the terminal Tb11 is connected thereto through the signal line of the signal HDATA. In addition, the terminal Tb8 is connected to the terminal Ta8 of the camera body 100, the terminal Tb9 is connected to the terminal Ta9, the terminal Tb10 is connected to the terminal Ta10, and the terminal Tb11 is connected to the terminal Ta11.

That is, the signal lines for the four types of the signals HREQ, HANS, HCLK, and HDATA for performing communication of the second data communication system D2b are connected between the second adapter communication portion 313 and the second camera communication portion 113 through the terminals Tb8 to Tb11 and the terminals Ta8 to Ta11.

On the other hand, the second adapter communication portion 313 and the second lens communication portion 213 perform communication of the second data communication system D2L through the signal lines for the two types of the signals HLP1 and HLP2. The terminal Tc7 is connected to the second adapter communication portion 313 through the signal line of the signal HLP1. Further, the terminal Tc8 is connected to the second adapter communication portion 313 through the signal line of the signal HLP2. In addition, the terminal Tc7 is connected to the terminal Td7 of the interchangeable lens 200, and the terminal Tc8 is connected to the terminal Td8.

That is, the signal lines for the two types of the signals HLP1 and HLP2 for performing communication of the second data communication system D2L are connected between the second adapter communication portion 313 and the second lens communication portion 213 through the terminals Tc7 and Tc8 and the terminals Td7 and Td8.

As described above, the communication of the second data communication system D2b and the communication of the second data communication system D2L are performed between the second camera communication portion 113 and the second lens communication portion 213 through the second adapter communication portion 313. In the communication of the second data communication system D2b and the communication of the second data communication system D2L, on the basis of the communication request signal of the second camera communication portion 113, for example, data indicating the position of the focus lens 222 and the like are communicated from the second lens communication portion 213 through the second adapter communication portion 313. Here, communication in the second data communication system D2b and the second data communication system D2L is referred to as "hotline communication".

Details of Configuration of Power Supply Section and Power Supply System of Adapter Next, referring to FIG. 4, details of the configuration of the adapter power supply section 320 and the power supply system in the adapter 300 will be described.

Figure 4:
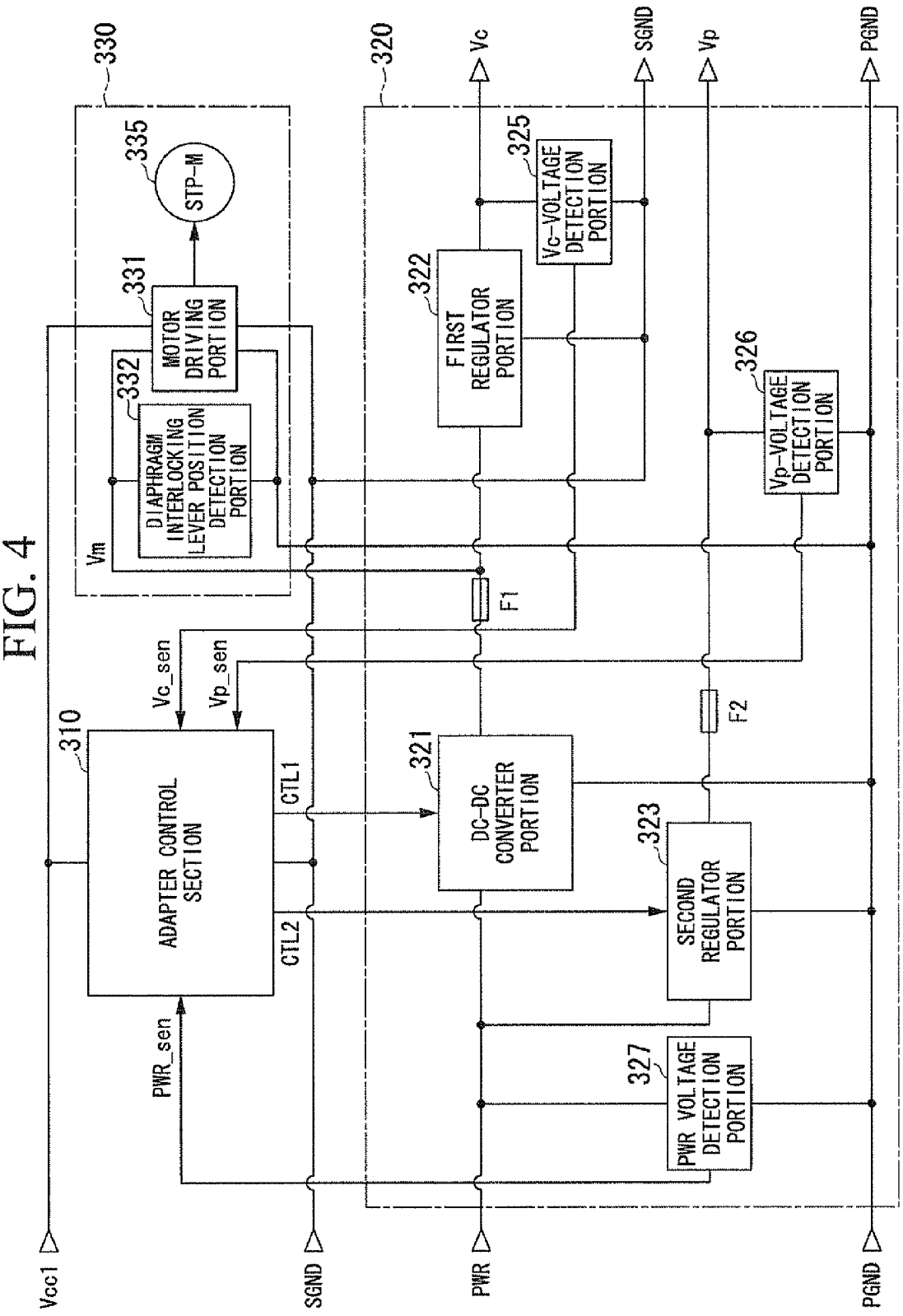
FIG. 4 is a schematic block diagram illustrating an example of a configuration of an adapter power supply section and a power supply system.

FIG. 4 is a schematic block diagram illustrating an example of the configuration of the adapter power supply section 320 and the power supply system. In the drawing, the elements corresponding to the respective sections of FIG. 3 are represented by the same reference numerals and signs, and description thereof will be omitted. Further, the adapter control section 310 shown in the drawing represents a configuration relating to the adapter power control portion 311.

The adapter power supply section 320 includes a DC-DC converter portion 321 (voltage conversion section), a first regulator portion 322, a second regulator portion 323, a Vc-voltage detection portion 325 (the voltage detection portion of the fourth power supply system), a Vp-voltage detection portion 326 (the voltage detection portion of the third power supply system), a PWR voltage detection portion 327 (the voltage detection portion of the second power supply system), a fuse F1, and a fuse F2.

The DC-DC converter portion 321 is connected to the power supply line of the power-system power supply PWR, and is thus supplied with the voltage of the power-system power supply PWR. The DC-DC converter portion 321 generates the diaphragm driving power supply Vm which is converted into the voltage stepped up to a predetermined voltage from the voltage of the power-system power supply PWR. The power supply line of the diaphragm driving power supply Vm, which is generated by the DC-DC converter portion 321, is connected to the input terminal of the first regulator portion 322 and the diaphragm interlocking lever driving section 330 through the fuse F1, thereby supplying the voltage of the diaphragm driving power supply Vm.

The first regulator portion 322 has, for example, the first linear regulator, and thus generates the lens control system power supply Vc of which the voltage is stabilized by stepping down the voltage of the diaphragm driving power supply Vm. In addition, the power supply line of the lens control system power supply Vc is connected to the terminal Tc3 described in FIG. 3.

Further, the input terminal of the second regulator portion 323 is connected to the power supply line of the power-system power supply PWR, and is thus supplied with the voltage of the power-system power supply PWR. The second regulator portion 323 has, for example, the second linear regulator, and thus generates the lens driving system power supply Vp of which the voltage is stabilized by stepping down the voltage of the power-system power supply PWR. The second regulator portion 323 is a regulator which is able to supply a larger amount of power feeding than the first regulator portion 322. In addition, the power supply line of the lens driving system power supply Vp is connected to the terminal Tc2 described in FIG. 3 through the fuse F2.

The connection positions of the fuses are not limited to the connection positions of the fuse F1 and the fuse F2 shown in the drawing. For example, a fuse, which is connected in series to the power supply line of the diaphragm driving power supply Vm, may be configured to be connected in series to each of the power supply lines divided into the power supply line, which is connected to the diaphragm interlocking lever driving section 330, and the power supply line, which is connected to the first regulator portion 322. Further, a fuse may be configured to be connected in series to the power supply line of the lens control system power supply Vc. Furthermore, the fuse F2, which is connected in series to the power supply line of the lens driving system power supply Vp is connected in series to the second regulator portion 323 side relative to the connection point between the power supply line of the lens driving system power supply Vp and the Vp-voltage detection portion 326. However, the fuse F2 may be configured to be connected in series to the side of the terminal Tc2 relative to the corresponding connection point. Further, likewise, when a fuse is connected in series to the power supply line of the lens control system power supply Vc, the fuse may also be configured to be connected in series to either one of the first regulator portion 322 side and the terminal Tc3 side relative to the connection point between the power supply line of the lens control system power supply Vc and the Vc-voltage detection portion 325.

The fuses protect electric circuits by cutting off current when an undesirable large current greater than or equal to the rated current flows into each power supply line.

Further, the signal line of the control signal CTL1 is connected to the control signal output terminal of the adapter control section 310 and the DC-DC converter portion 321 (for example, the control terminal for output control provided in the DC-DC converter portion 321). The DC-DC converter portion 321 controls the supply state of the voltage of the diaphragm driving power supply Vm on the basis of the control signal CTL1, which is supplied from the adapter control section 310, so as to change the state into a power feeding state (a state in which the voltage is supplied) or a cut-off state (a state in which the voltage supply is stopped). For example, when the control signal CTL1 is in an H (high) state, the DC-DC converter portion 321 controls the voltage of the diaphragm driving power supply Vm such that it attains the power feeding state. Further, when the control signal CTL1 is in an L (low) state, the DC-DC converter portion 321 controls the voltage of the diaphragm driving power supply Vm such that it attains the cut-off state.

In addition, in the first regulator portion 322, in response to the supply of the voltage of the diaphragm driving power supply Vm, the voltage of the lens control system power supply Vc is fed, and in response to the supply stop of the voltage of the diaphragm driving power supply Vm, the voltage of the lens control system power supply Vc is cut off. That is, the supply state of the voltage of the lens control system power supply Vc generated in the first regulator portion 322 is controlled on the basis of the control signal CTL1 similarly to the supply state of the voltage of the diaphragm driving power supply Vm.

Further, the signal line of the control signal CTL2 is connected to the control signal output terminal of the adapter control section 310, and the second regulator portion 323 (for example, the control terminal for output control provided in the second regulator portion 323). The second regulator portion 323 controls the supply state of the voltage of the lens driving system power supply Vp on the basis of the control signal CTL2, which is supplied from the adapter control section 310, so as to change the state into a power feeding state (a state in which the voltage is supplied) or a cut-off state (a state in which the voltage supply is stopped). For example, when the control signal CTL2 is in an H (high) state, the second regulator portion 323 controls the voltage of the lens driving system power supply Vp such that it attains the power feeding state. Further, when the control signal CTL2 is in an L (low) state, the second regulator portion 323 controls the voltage of the lens driving system power supply Vp such that it attains the cut-off state.

The voltage detection terminal of the Vc-voltage detection portion 325 is connected to the power supply line of the lens control system power supply Vc. Thereby, the Vc-voltage detection portion 325 detects the voltage of the lens control system power supply Vc, and supplies the detection signal Vc_sen to the adapter control section 310. For example, the signal line of the detection signal Vc_sen, which is supplied from the Vc-voltage detection portion 325 to the adapter control section 310, is connected to the A/D conversion (analog/digital conversion) input terminal of the adapter control section 310.

Further, the voltage detection terminal of the Vp-voltage detection portion 326 is connected to the power supply line of the lens driving system power supply Vp. Thereby, the Vp-voltage detection portion 326 detects the voltage of the lens driving system power supply Vp, and supplies the detection signal Vp_sen to the adapter control section 310. For example, the signal line of the detection signal Vp_sen, which is supplied from the Vp-voltage detection portion 326 to the adapter control section 310, is connected to the A/D conversion input terminal of the adapter control section 310.

Further, the voltage detection terminal of the PWR voltage detection portion 327 is connected to the power supply line of the power-system power supply PWR. Thereby, the PWR voltage detection portion 327 detects the voltage of the power-system power supply PWR, and supplies the detection signal PWR_sen to the adapter control section 310. For example, the signal line of the detection signal PWR_sen, which is supplied from the PWR voltage detection portion 327 to the adapter control section 310, is connected to the A/D conversion input terminal of the adapter control section 310.

The diaphragm interlocking lever driving section 330 includes a stepping motor 335 as the diaphragm driving actuator, a motor driving portion 331, and a diaphragm interlocking lever position detection portion 332.

The stepping motor 335 is a power source that drives the diaphragm interlocking lever 350, and is driven by the motor driving portion 331.

The motor driving portion 331 generates the pulse voltage and drives the stepping motor 335, through the control of the adapter control section 310. Further, the diaphragm interlocking lever position detection portion 332 includes, for example, a photo-interrupter, and detects the position of the diaphragm interlocking lever 350.

The power supply line of the diaphragm driving power supply Vm, which is generated by the DC-DC converter portion 321, is connected to the motor driving portion 331 and the diaphragm interlocking lever position detection portion 332, and thus supplies the voltage of the diaphragm driving power supply Vm to them.

Further, the power supply line of the control system power supply Vcc1 is connected to the adapter control section 310 and the motor driving portion 331, and thus supplies the voltage of the control system power supply Vcc1 to them.

The control system ground SGND is connected as a ground, which corresponds to the control system power supply Vcc1, to the adapter control section 310, the motor driving portion 331, the first regulator portion 322, and the Vc-voltage detection portion 325.

Further, the power system ground PGND is connected as a ground, which corresponds to the power-system power supply PWR, to the DC-DC converter portion 321, the second regulator portion 323, the Vp-voltage detection portion 326, the PWR voltage detection portion 327, the motor driving portion 331, and the diaphragm interlocking lever position detection portion 332.

As described above, the adapter 300 generates the voltage of the lens driving system power supply Vp and the voltage of the lens control system power supply Vc, which are supplied to the interchangeable lens 200, from the voltage of the power-system power supply PWR, between the voltage of the control system power supply Vcc1 and the voltage of the power-system power supply PWR which are supplied from the camera body 100. That is, the adapter control section 310 is supplied with the voltage of the control system power supply Vcc1 from the camera body 100, and the lens control section 210 of the interchangeable lens 200 is supplied with the voltage of the lens control system power supply Vc which is generated from the power-system power supply PWR in the adapter 300. Further, the optical system driving section 230 of the interchangeable lens 200 is supplied with the voltage of the lens driving system power supply Vp which is generated from the power-system power supply PWR in the adapter 300.

Thereby, the adapter 300 is able to generate and supply a voltage for driving the interchangeable lens 200 from the power-system power supply PWR supplied from the camera body 100. For example, in contrast with the amount of power feeding supplied to both the adapter control section 310 and the lens control section 210, the amount of power feeding of the control system power supply Vcc1 supplied from the camera body 100 may be insufficient. Even in this case, the adapter 300 is able to feed a voltage to both the adapter control section 310 and the lens control section 210 without a shortage of an amount of power feeding, and is able to feed a voltage to the optical system driving section 230. Accordingly, by connecting the camera body 100 and the interchangeable lens 200 through the adapter 300, the interchangeable lens 200 can be caused to function by driving it through the camera body 100.

Further, the adapter 300 supplies the voltage of the lens driving system power supply Vp to the load with large power consumption in contrast with the power consumption of the load to which the voltage of the lens control system power supply Vc is supplied. That is, the adapter 300 generates the lens control system power supply Vc as a power supply system that supplies a voltage to the lens control section 210, and generates the lens driving system power supply Vp, which is able to supply a larger amount of power feeding than the lens control system power supply Vc, as a power supply system that supplies a voltage to the optical system driving section 230. Thereby, the adapter 300 is able to appropriately supply a voltage to the lens control section 210 and the optical system driving section 230. Accordingly, the adapter 300 is able to appropriately supply a voltage for driving the interchangeable lens 200.

Further, the adapter 300 generates the voltage of the diaphragm driving power supply Vm by converting the voltage of the power-system power supply PWR into a voltage which is stepped up to a predetermined voltage through the DC-DC converter portion 321, and is thus able to supply a stabilized voltage to the diaphragm interlocking lever driving section 330. Furthermore, the adapter 300 generates the lens control system power supply Vc of which voltage is stabilized by stepping down the voltage of the diaphragm driving power supply Vm to a predetermined voltage through the first regulator portion 322, and is thus able to supply a voltage, which is less affected by voltage noise of the driving system, to the lens control section 210. Further, the adapter 300 generates the voltage of the lens driving system power supply Vp by converting the voltage of the power-system power supply PWR into a voltage which is stepped down to a predetermined voltage through the second regulator portion 323, and is thus able to supply a stabilized voltage to the optical system driving section 230.

Other Forms of Interchangeable Lens

Next, other forms of the interchangeable lens will be described.

The lens, which can be caused to function by connecting it to the camera body 100 through the adapter 300, is not limited to the interchangeable lens 200 described with reference to FIG. 3. Not only the interchangeable lens 200 but also various interchangeable lenses can be caused to function by connecting them to the camera body 100 through the adapter 300.

In addition, the interchangeable lens 200 described with reference to FIG. 3 has a lens control section 210 capable of communication. Thus, in the interchangeable lens, on the basis of the communication result, the lens control section 210 controls the optical system driving section 230. The interchangeable lens 200 is also referred to as a CPU (Central Processing Unit) lens in the following technique.

Non-CPU Lens

Figure 5:
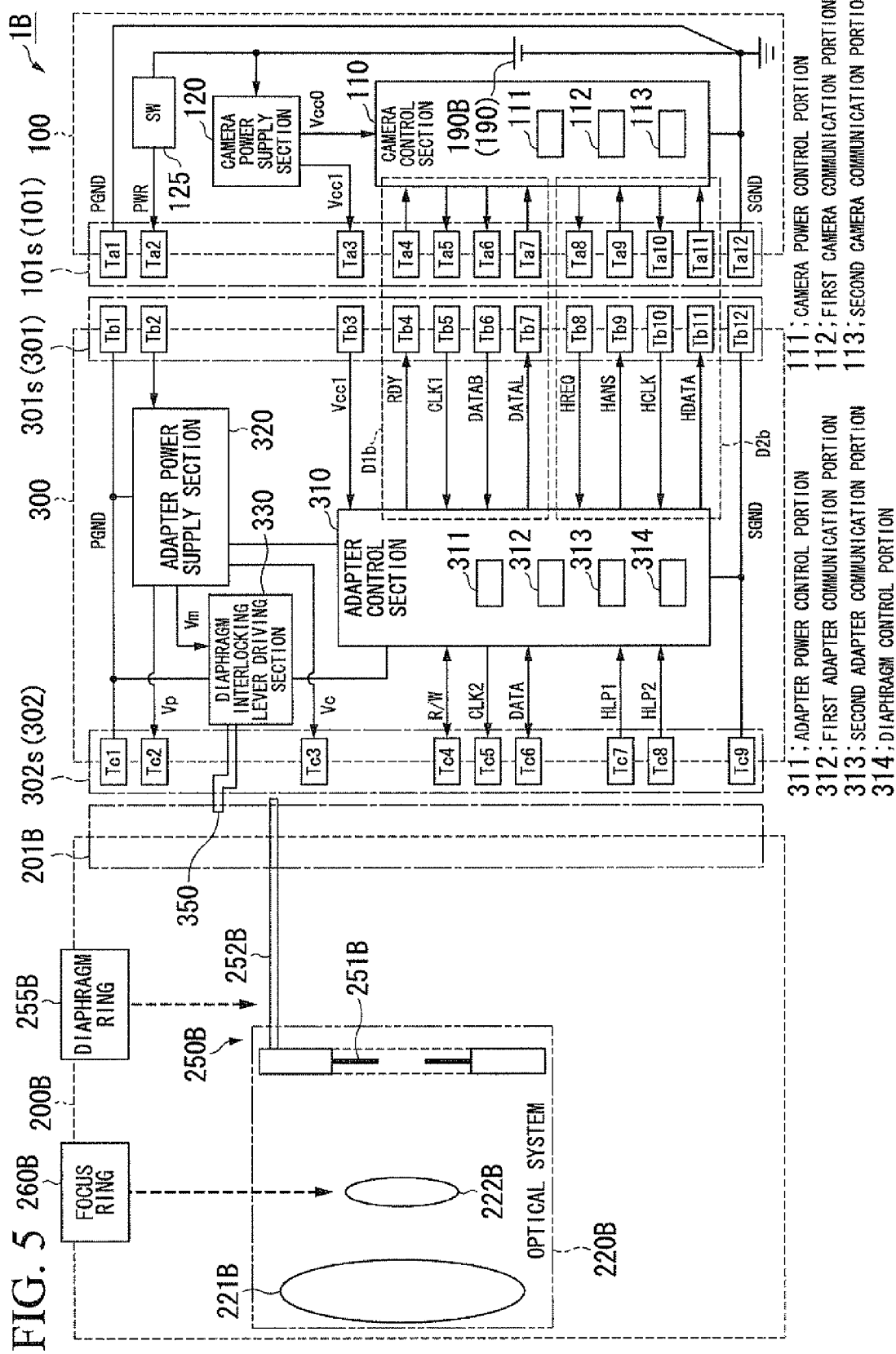
FIG. 5 is a schematic block diagram illustrating a second example of the configuration of the camera system according to the present embodiment.

On the other hand, as shown in FIG. 5, an interchangeable lens 200B, which does not have a lens control section capable of communication, may be caused to function by connecting it to the camera body 100 through the adapter 300.

FIG. 5 is a schematic block diagram illustrating an example of a configuration of a camera system 1B including the interchangeable lens 200B which does not have the lens control section capable of communication. In the drawing, the elements corresponding to the respective sections of FIG. 3 are represented by the same reference numerals and signs, and description thereof will be omitted.

In the drawing, the interchangeable lens 200B is mounted on the camera body 100 with the adapter 300 interposed therebetween.

For example, the interchangeable lens 200B is a lens with specification in which the optical system is not electrically driven, and the lens includes a focus ring 260B by which the position of the focus lens 222B can be adjusted through user's operation, and a diaphragm ring 255B by which the aperture degree of the diaphragm mechanism 251B can be changed through user's operation. Further, the interchangeable lens 200B shown in FIG. 5 is different from the interchangeable lens 200 shown in FIG. 3 in that the interchangeable lens 200B does not include the lens control section, the optical system driving section, and the electric connection terminal.

In addition, in the interchangeable lens 200B, a user operates the diaphragm ring 255B, thereby changing the diaphragm aperture diameter (aperture degree, aperture value) of the diaphragm mechanism 251B. Hence, the adapter control section 310 controls the diaphragm interlocking lever 350 so as to move it to the retractable position (a position at which the lever does not interfere with movement) as a position which does not interfere with the position of the diaphragm lever 252B of which the position is moved by changing the diaphragm aperture diameter (aperture degree, aperture value) of the diaphragm mechanism 251B.

Thereby, the interchangeable lens 200B can be connected to the camera body 100 through the adapter 300, and can be caused to function by a manual operation in accordance with the specification of the interchangeable lens 200B.

The interchangeable lens 200B is referred to as a Non-CPU lens in the following description.

Electromagnetic-Diaphragm-Type CPU Lens

Figure 6:
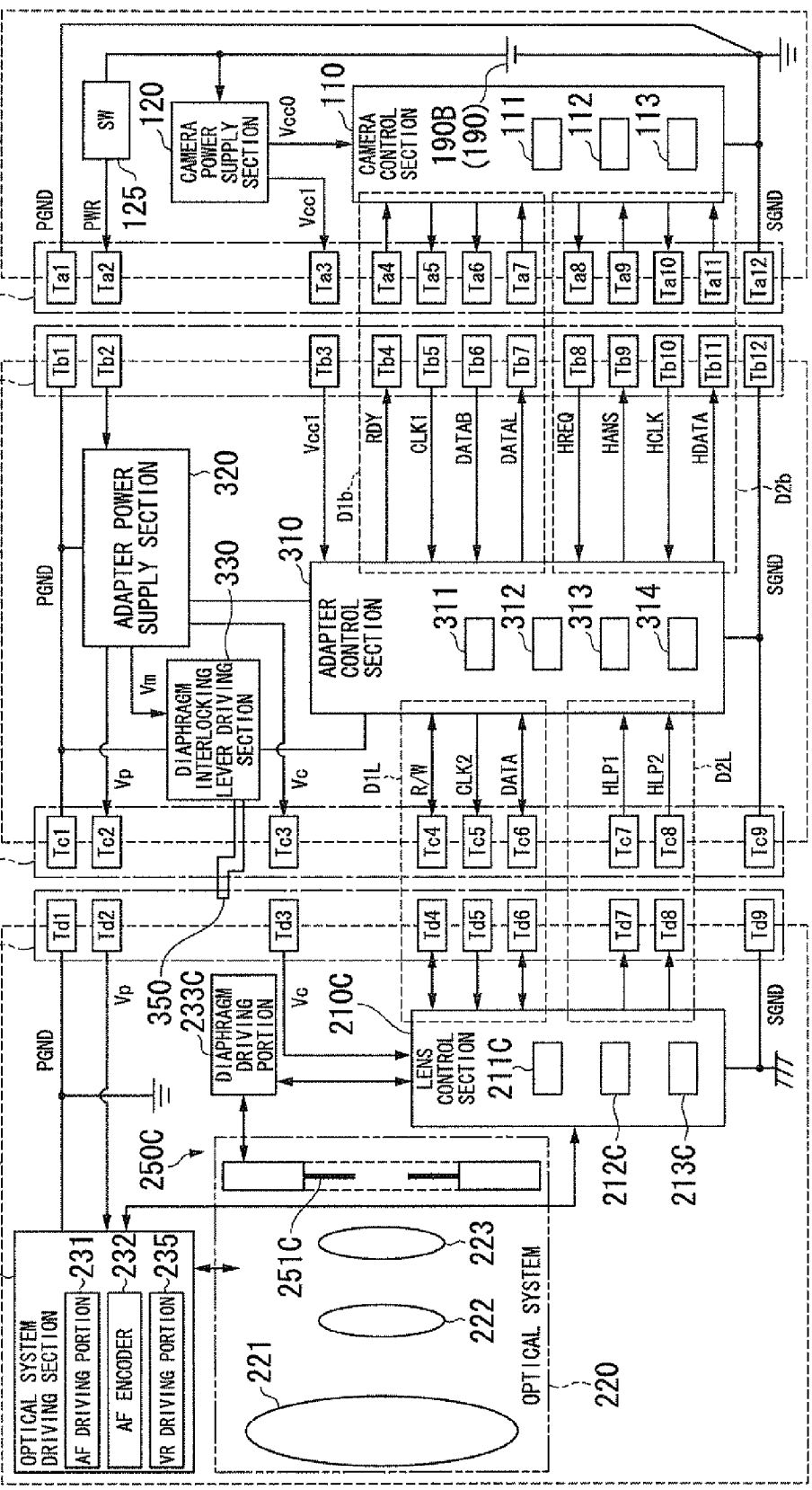
FIG. 6 is a schematic block diagram illustrating a third example of the configuration of the camera system according to the present embodiment.

Further, as shown in FIG. 6, an electromagnetic-diaphragm-type interchangeable lens 200C, which electrically drives a diaphragm mechanism 251C, can be connected to the camera body 100 through the adapter 300.

FIG. 6 is a schematic block diagram illustrating an example of a configuration of a camera system 1C including the electromagnetic-diaphragm-type interchangeable lens 200C. In the drawing, the elements corresponding to the respective sections of FIG. 3 are represented by the same reference numerals and signs, and description thereof will be omitted.

In the drawing, the interchangeable lens 200C is mounted on the camera body 100 with the adapter 300 interposed therebetween.

The interchangeable lens 200C shown in FIG. 6 is different from the interchangeable lens 200 shown in FIG. 3 in that the interchangeable lens 200 includes the diaphragm section 250 having the diaphragm lever 252 but the interchangeable lens 200C includes an electromagnetic diaphragm section 250C having a diaphragm driving portion 233C.

For example, the interchangeable lens 200C is a lens that includes the electromagnetic diaphragm section 250C (EMD (Electra-magnetic Diaphragm). The electromagnetic diaphragm section 250C has the diaphragm mechanism 251C and the diaphragm driving portion 233C.

The diaphragm driving portion 233C performs electrical driving to change the aperture diameter (aperture size, size, aperture degree, aperture value) of the diaphragm of the diaphragm mechanism 251C through the control of the optical system control portion 211C provided in the lens control section 210C. Further, the diaphragm driving portion 233C is configured to include, for example, a diaphragm driving actuator.

In addition, in the configuration shown in the drawing, when the adapter 300 controls the diaphragm mechanism 251C, the adapter control section 310 communicates with the lens control section 210C instead of controlling the diaphragm interlocking lever driving section 330, thereby controlling the diaphragm mechanism 251C through the diaphragm driving portion 233C.

Thereby, the interchangeable lens 200C can be connected to the camera body 100 through the adapter 300, and the camera control section 110 communicates with the lens control section 210C through the adapter control section 310, whereby it is possible to cause the interchangeable lens 200C to function.

The interchangeable lens 200C is referred to as an electromagnetic-diaphragm-type CPU lens in the following description.

Standard Compatible Lens

Figure 7:
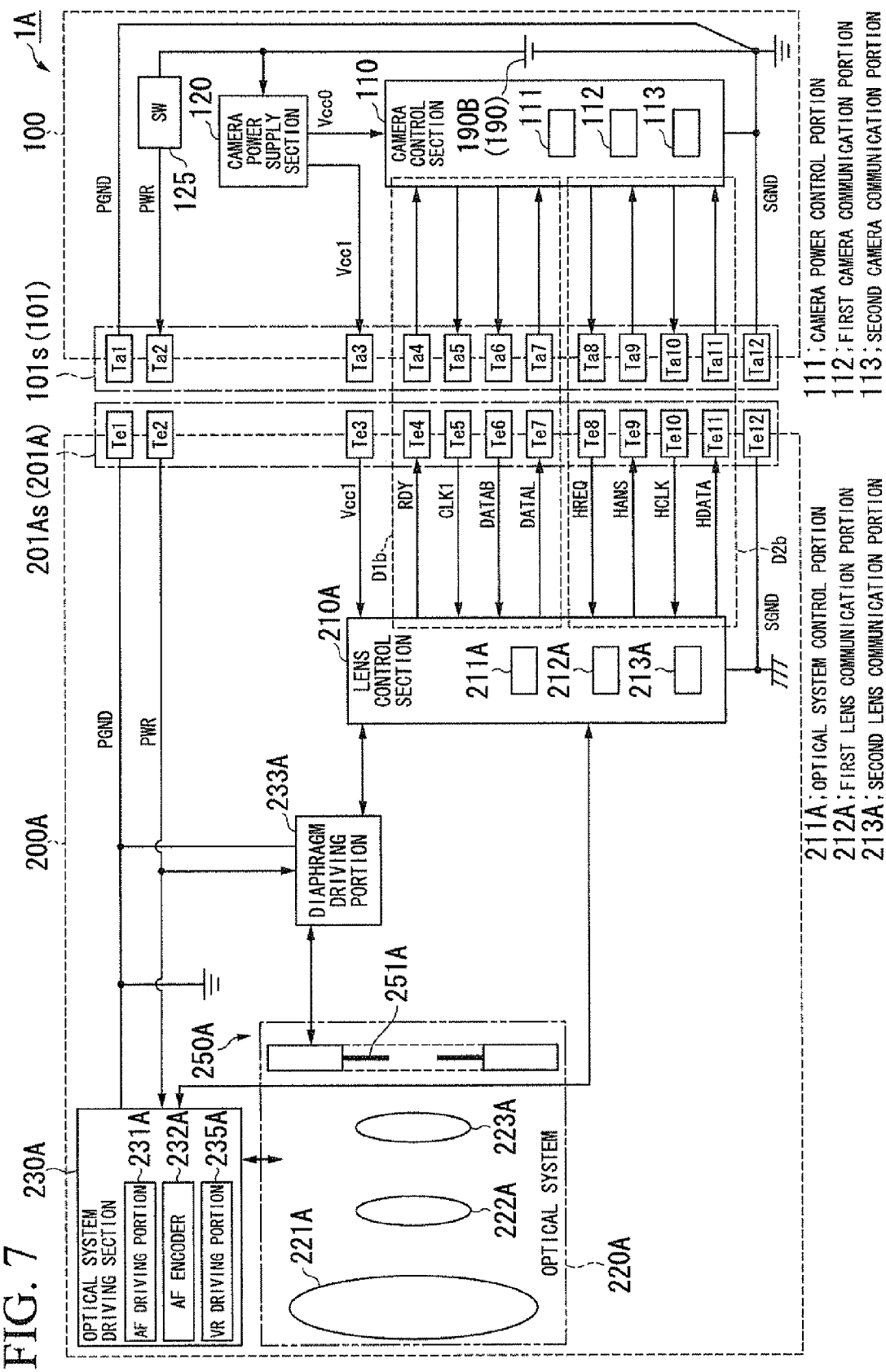
FIG. 7 is a schematic block diagram illustrating a fourth example of the configuration of the camera system according to the present embodiment.

In addition, FIG. 7 is a schematic block diagram illustrating an example of a configuration of a camera system 1A in the case where a lens-side mount 201A of an interchangeable lens 200A and the camera body-side mount 101 of the camera body 100 are lens mounts having the same specification.

That is, the interchangeable lens 200A is a lens appropriate for the lens mount specification and the communication standard of the camera body 100, and is a lens which can be caused to function by directly connecting it to the camera body 100 without the adapter 300.

In the drawing, the elements corresponding to the respective sections of FIG. 3 or 6 are represented by the same reference numerals and signs, and description thereof will be omitted.

The respective sections of an optical system 220A and an optical system driving section 230A of FIG. 7 have the same configuration as the respective sections of the optical system 220 and the optical system driving section 230 of FIG. 3 or 6. Further, the respective sections of a diaphragm section 250A have the same configuration as the respective sections of the electromagnetic diaphragm section 250C of FIG. 6.

The specification of the lens-side mount 201A of the interchangeable lens 200A is a specification which is compatible with the camera body-side mount 101 of the camera body 100 and in which the lens can be mounted on the camera body.

A connection section 201As of the lens-side mount 201A is connection terminals which are connected to the connection terminals of the connection section 101s provided in the camera body 100, and has twelve connection terminals of terminals Te1 to Te12. The interchangeable lens 200A and the camera body 100 are connected through the connection section 201As and the connection section 101s. Thereby, the respective terminals of the terminal Te1 to Te12 of the connection section 201As are connected to the corresponding connection terminals among the respective connection terminals of the terminals Ta1 to Ta12 of the connection section 101s. In addition, the connection section 201As and the connection section 101s are electrically connected.

The terminal Te2 is connected to the terminal Ta2 of the camera body 100, and is supplied with the voltage of the power-system power supply PWR from the camera body 100. The voltage of the power-system power supply PWR supplied to the terminal Te2 is a voltage (a voltage corresponding to the voltage of the lens driving system power supply Vp supplied to the interchangeable lens 200) of the lens driving system power supply supplied to the optical system driving section 230A of the interchangeable lens 200A.

Further, the terminal Te3 is connected to the terminal Ta3 of the camera body 100, and is supplied with the voltage of the control system power supply Vcc from the camera body 100. The voltage of the control system power supply Vcc supplied to the terminal Te3 is a voltage (a voltage corresponding to the voltage of the lens control system power supply Vc supplied to the interchangeable lens 200) of the lens control system power supply supplied to the lens control section 210A of the interchangeable lens 200A.

The lens control section 210A includes an optical system control portion 211A, a first lens communication portion 212A, and a second lens communication portion 213A. The optical system control portion 211A controls the optical system driving section 230A and a diaphragm driving portion 233A of the diaphragm section 250A.

The first lens communication portion 212A and the first camera communication portion 112 performs communication of the first data communication system D1b through the signal lines for the four types of signals RDY, CLK1, DATAB, and DATAL. Further, the second lens communication portion 213A and the second camera communication portion 113 performs communication of the second data communication system D2b through signal lines for four types of signals HREQ, HANS, HCLK, and HDATA.

As described above, the interchangeable lens 200A is supplied with the voltage of the power-system power supply PWR as a voltage of the lens driving system power supply from the camera body 100, and is supplied with the voltage of the control system power supply Vcc as a voltage of the lens control system power supply. Further, the first lens communication portion 212A and the first camera communication portion 112 are based on the same communication standard, and perform command data communication. Further, the second lens communication portion 213A and the second camera communication portion 113 are based on the same communication standard, and perform hotline communication.

Thereby, the interchangeable lens 200A can be directly connected to the camera body 100 through the adapter 300, and the camera control section 110 is able to cause the interchangeable lens 200A to function by communicating with the lens control section 210A.

The interchangeable lens 200A is referred to as a standard compatible lens in the following description.

Description of State Shift

Next, processes of the present embodiment will be described.

First, referring to FIG. 8, a brief overview of the state shift according to the present embodiment will be described.

Figure 8:
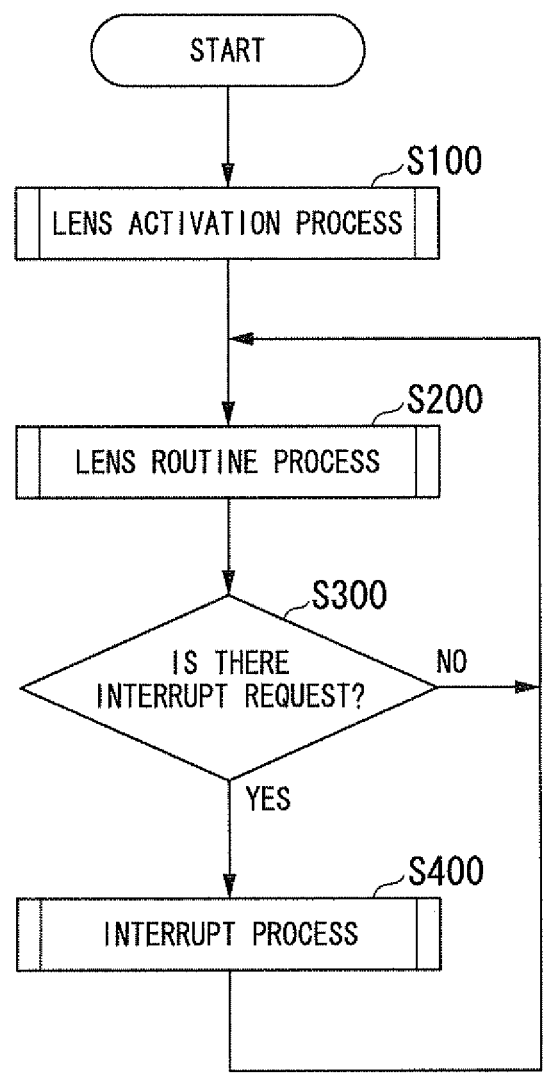
FIG. 8 is a flowchart illustrating a brief overview of a state shift between processes relating to an interchangeable lens according to the present embodiment.

FIG. 8 is a flowchart illustrating a brief overview of the state shift between the processes relating to the interchangeable lens according to the present embodiment.

First, in the camera body 100, when the main power supply of the camera body 100 is turned on, or when the adapter 300 is mounted in a state where the main power supply of the camera body 100 is turned on, the adapter 300 executes a "lens activation process" through the control of the camera body 100 (step S100).

Here, the "lens activation process" includes, for example, a process of determining detachment of the camera body-side mount 101 of the camera body 100, a process of initializing the adapter 300 and the interchangeable lens 200 mounted on the adapter 300, a process of controlling feeding a voltage to each power supply system, and the like. Further, for example, in the lens activation process, the camera body 100 acquires information on the specification (function) and the type of the interchangeable lens 200 which is mounted on the camera body 100 with the adapter 300 interposed therebetween. The lens activation process will be described in detail in the section of the "lens activation process" (FIG. 12) to be described later.

In step S100, if the lens activation process is complete, the adapter 300 shifts the process to a "lens routine process" through the control of the camera body 100 (step S200).

The "lens routine process" is, for example, a state where the photography process is possible after the lens activation process is complete. In the lens routine process, the camera body 100 performs, for example, "routine communication" by which detection of the mount state of the interchangeable lens 200 mounted thereon with the adapter 300 interposed therebetween and acquisition of the information of the optical system are performed with a predetermined period. The lens routine process will be described later with reference to FIGS. 9 and 10.

Next, the camera body 100 or the adapter 300 determines whether or not an interrupt request is issued in the lens routine process (step S300). In step S300, if it is determined that the interrupt request is absent, the adapter 300 continues the lens routine process through the control of the camera body 100. In contrast, in step S300, if it is determined that the interrupt request is present, the camera body 100 or the adapter 300 shifts the process to a requested interrupt process (step S400). Here, the interrupt process includes, for example, a process of starting photography through a release operation, a process at the time of temporary blackout of power supply, a process of advancing to a lower power consumption mode or cutting off a power supply by turning off the power supply, and the like. The processes will be described later.

In addition, in a case of directly mounting the standard compatible lens (for example, the interchangeable lens 200A) on the camera body 100 instead of mounting the adapter 300 thereon, the process state shift is as shown in FIG. 8.

Description of Command Data Communication in Lens Routine Process

Next, command data communication performed in the lens routine process (step S200 of FIG. 8) will be described.

Figure 9:
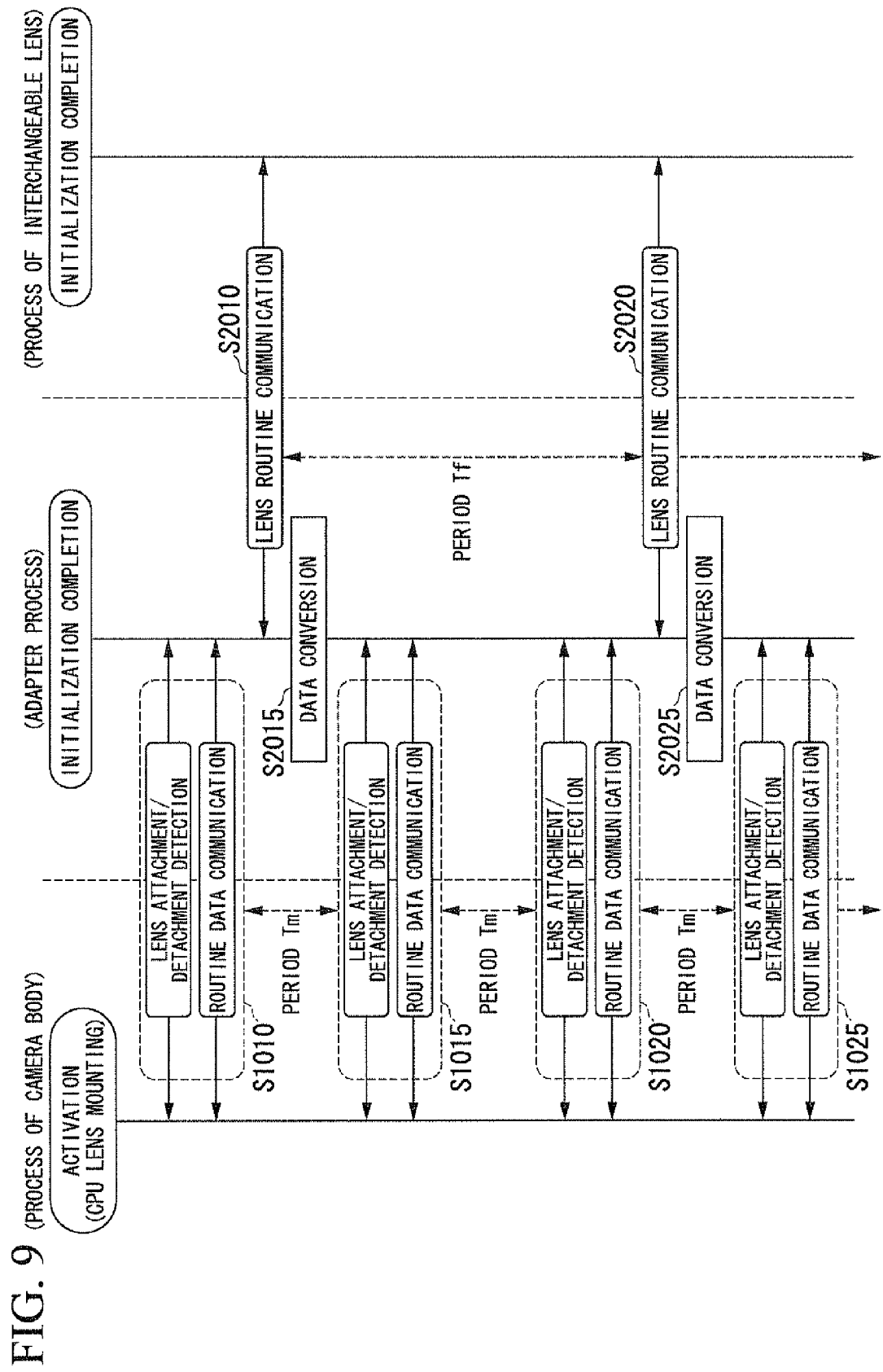
FIG. 9 is a diagram illustrating an example of a communication sequence of command data communication in a lens routine process.

FIG. 9 is a diagram illustrating an example of a communication sequence of the command data communication in the lens routine process.

The drawing shows an example of the command data communication using the exemplary camera system 1 in which the interchangeable lens 200 (CPU lens) and the camera body 100 are connected through the adapter 300. The adapter control section 310 is able to routinely perform periodic communication with the camera control section 110. By performing the periodic communication, in response to the request from the camera control section 110, the adapter control section transmits the lens information (the information of the optical system 220 and the like), which is acquired from the lens control section 210, to the camera control section 110.

For example, in the "lens routine process" shown in FIG. 9, the first adapter communication portion 312 asynchronously performs first regular communication to communicate with the lens control section 210 provided in the interchangeable lens 200 in a period Tf (first communication period), and second regular communication to communicate with the camera control section 110 provided in the camera body 100 in a period Tm (second communication period).

The first adapter communication portion 312 performs the communication of the first data communication system D1L (first regular communication) to communicate with the first lens communication portion 212 in the period Tf (for example, a period for each 64 msec) (steps S2010 and S2020).

Here, the communication of the first data communication system D1L (first regular communication) in the lens routine process is referred to as "lens routine communication". Through the lens routine communication, the first adapter communication portion 312 acquires lens information (information of the optical system 220 and the like (first information)) from the first lens communication portion 212.

Further, the first adapter communication portion 312 generates, lens information (information of the optical system 220 and the like (second information)) to be transmitted to the first camera communication portion 112 on the basis of the lens information acquired in step S2010 (step S2015). For example, the first adapter communication portion 312 performs data conversion on data of the lens information (information of the optical system 220 and the like) acquired in step S2010 so as to make it appropriate for the communication standard of the first data communication system D1b, and generates information to be transmitted to the first camera communication portion 112.

Likewise, the first adapter communication portion 312 generates information to be transmitted to the first camera communication portion 112 through data conversion on the basis of the lens information (information of the optical system 220 and the like) acquired in step S2020 (step S2025).

That is, the first adapter communication portion 312 generates the lens information (information of the optical system 220 and the like) to be transmitted to the first camera communication portion 112 in accordance with communication timing (communication timing of the period Tf) of the lens routine communication.

Regarding the above-mentioned communication of the first data communication system D1L, the first adapter communication portion 312 performs the communication of the first data communication system D1b (second regular communication) with the first camera communication portion 112 in the period Tm (for example, a period for each 16 msec) which is asynchronous to the communication (first regular communication) period Tf with the interchangeable lens 200 in the first data communication system D1L (steps S1010, S1015, S1020, and S1025). The communication period Tm is a communication period with a speed higher than that of the communication period Tf.

Here, the communication of the first data communication system D1b (second regular communication) in the lens routine process is referred to as "routine communication". The routine communication includes a lens attachment/detachment detection process (lens attachment/detachment detection) and a routine data communication process (hereinafter referred to as "routine data communication").

The lens attachment/detachment detection process of each step is a process in which the first adapter communication portion 312 responds with the detection result to the lens attachment/detachment detection instruction command issued from the first camera communication portion 112. The first adapter communication portion 312 detects the detachment of the interchangeable lens 200 on the basis of whether or not the response of the lens routine communication from the first lens communication portion 212 is present, and transmits the detection result to the first camera communication portion 112.

The routine data communication of each step is a communication process in which the first camera communication portion 112 acquires the lens information (information of the optical system 220 and the like) generated by the first adapter communication portion 312. That is, in the routine data communication, the first camera communication portion 112 transmits a request command for requesting transmission of the lens information (information of the optical system 220 and the like) to the first adapter communication portion 312, and executes a process of receiving (acquiring) the lens information (information of the optical system 220 and the like) from the interchangeable lens 200 through the adapter 300, in accordance with the response (the transmission from the adapter to the camera side) from the first adapter communication portion 312 which receives the command. Since the request command is periodically transmitted in the routine data communication, the first camera communication portion 112 repeatedly performs the acquisition (reception) operation of the lens information whenever the routine data communication is performed.

For example, the first camera communication portion 112 acquires, through the routine data communication of step S1010, the lens information (second information) which is generated on the basis of the lens information (information of the optical system 220 and the like; first information) acquired by the first adapter communication portion 312 before the lens routine communication of step S2010. Further, the first camera communication portion 112 acquires, through the routine data communication of steps S1015 and S1020, the lens information (second information) which is generated on the basis of the lens information (information of the optical system 220 and the like; first information) acquired by the first adapter communication portion 312 in the lens routine communication of step S2010. Further, the first camera communication portion 112 acquires, through the routine data communication of step S1025, the lens information (second information) which is generated on the basis of the lens information (information of the optical system 220 and the like) acquired by the first adapter communication portion 312 in the lens routine communication of step S2020.

That is, the first adapter communication portion 312 transmits (responds with) the lens information which is generated as described above, to the first camera communication portion 112 in the period Tm of the routine data communication.

As described above, in the command data communication, the adapter control section 310 generates the lens information (second information) to be transmitted to the camera control section 110, on the basis of the lens information (information of the optical system 220 and the like; first information) acquired from the interchangeable lens 200 by the lens routine communication of the period Tf. Further, the adapter control section 310 transmits the generated lens information (second information) to the camera control section 110 through the routine data communication of the period Tm.

Thereby, the adapter control section 310 is able to smoothly and reliably transmit, without delay, the lens information which is acquired and generated through the lens routine communication of the period Tf, to the camera control section 110 through the routine data communication of the period Tm which is asynchronous to the period Tf.

Accordingly, by communicating with the camera control section 110, the adapter control section 310 is able to transmit the lens information which is acquired from the lens control section 210, to the camera control section 110 without delay, in response to the request from the camera control section 110.

In addition, referring to FIG. 9, the description was given of the process in which the first adapter communication portion 312 generates the lens information (information of the optical system 220 and the like) to be transmitted to the first camera communication portion 112 in accordance with the communication timing (communication timing of the period Tf) of the lens routine communication, but the present invention is not limited to this. For example, the first adapter communication portion 312 may generate the lens information (information of the optical system 220 and the like) to be transmitted to the first camera communication portion 112, in accordance with the communication timing (communication timing of the period Tm) of the routine data communication.

Thereby, the adapter control section 310 generates the lens information to be transmitted to the camera control section 110 in accordance with the timing of the period Tm, which is asynchronous to the period Tf, from the lens information (information of the optical system 220 and the like) acquired through the lens routine communication of the period Tf, and is able to transmit the generated lens information to the camera control section 110 through the routine data communication.

Further, referring to FIG. 9, the description was given of the process in which the period Tf of the communication between the first adapter communication portion 312 and the lens control section 210 is asynchronous to the period Tm of the communication between the first adapter communication portion 312 and the camera control section 110, but in the process, the period Tf and the period Tm may be synchronous to each other.

Description of Lens Routine Communication

Specifically, in the "lens routine communication" which is communication with the period Tf, the communication is divided into a plurality of communications (for example, eight communications; the time necessary for a single communication is about 8 ms), and the communications are performed in a single period (for example, a period of 64 ms). The plurality of communications includes: a communication which is performed in order for the first adapter communication portion 312 to acquire information from the lens control section 210; and a communication through which information (setting instruction) is output from the first adapter communication portion 312 to the lens control section 210.

The first adapter communication portion 312 communicates with the first lens communication portion 212 a plurality of times in the lens routine communication, thereby acquiring the (information of the optical system 220, information of the diaphragm section 250, and the like; first information) from the first lens communication portion 212 for each time. Further, the first adapter communication portion 312 generates lens information to be transmitted to the first camera communication portion 112 through the routine data communication, on the basis of a plurality of lens informations, which are acquired through communications different from one another, among the lens informations which are acquired through the plurality of communications. Then, the first adapter communication portion 312 transmits the generated lens information (second information) to the first camera communication portion 112, in response to the request from the first camera communication portion 112.

Figure 10:
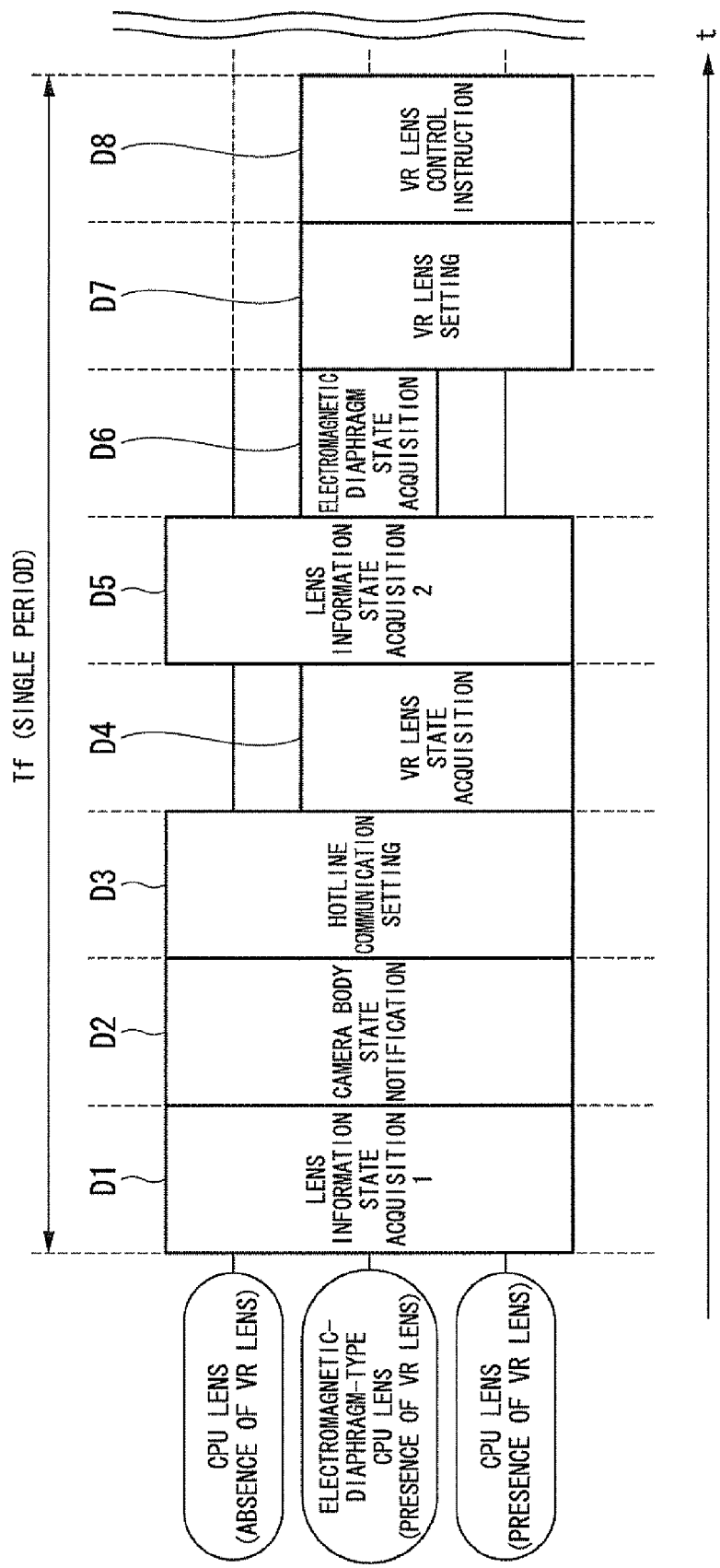
FIG. 10 is a diagram illustrating an example of communication commands which are divisionally communicated through a plurality of communications in a single period of lens routine communication.

FIG. 10 is a diagram illustrating an example of communication commands which are divisionally communicated through the plurality of communications in a single period of the lens routine communication.

As shown in the drawing, in the lens routine communication, for example, communication commands D1 to D8 to transmit and receive the communication data are provided, and are sequentially communicated during a time period of the single period of the lens routine communication. In the example shown in the drawing, during the time period of the single period, by sequentially communicating the communication commands D1 to D8 of the lens routine communication, the eight communications are performed.

In addition, in the communication commands D1 to D8 to transmit or receive the communication data in the lens routine communication, the following commands are present: a command to cause the adapter 300 side to acquire the lens information on the interchangeable lens 200 from the interchangeable lens 200 side; and a command to send information or instruction (setting instruction) from the adapter 300 side to the interchangeable lens 200 side. As the command to acquire the information on the interchangeable lens 200, for example, there are provided: the communication commands D1, D4, and D5 to communicate the information of the optical system 220 and the information indicating the driving status; and the communication command D6 to acquire the information on the electromagnetic diaphragm.

Further, as the command to send information or instruction (setting instruction) from the adapter 300 side to the interchangeable lens 200 side, there are provided: the communication command D2 to communicate the information (for example, information indicating whether or not the release button is pressed halfway) which indicates the operation state of the camera body 100; the communication command D3 to communicate the setting information (setting instruction) of the hotline communication; and the communication commands D7 and D8 to communicate the instructions (setting instruction) for vibration-proof control (control of the VR lens 223). In addition, the respective functions of the interchangeable lenses are different in accordance with respective specifications of the interchangeable lenses (the interchangeable lens 200 or other interchangeable lenses). Hence, the communication command, which is selected among the communication commands D1 to D8 in accordance with the specification (function) of the interchangeable lens (in accordance with the class or the type of the interchangeable lens), is communicated.

For example, by checking the specification (function) of the interchangeable lens such as presence or absence of the VR lens 223 (presence or absence of the vibration-proof function) or presence or absence of the electromagnetic diaphragm function, an unnecessary communication command is not communicated.

That is, the first adapter communication portion 312 acquires the information of the optical system 220 by dividing the information into a plurality of informations through the plurality of communications, and generates the information of the optical system 220 as unified information corresponding to the plurality of informations divisionally acquired.

The information which corresponds to the plurality of informations is information into which the plurality of informations is data-converted in accordance with the communication standard and the like.

The first adapter communication portion 312 sequentially communicates the eight types of the communication commands D1 to D8 in the single period of the lens routine communication (as described above, among them, the four types of communication commands D2, D3, D7, and D8 are commands to communicate information and instructions to the interchangeable lens 200 side, and the remaining four types of the communication commands D1, D4, D5, and D6 are commands to acquire the information from the interchangeable lens 200). Thereby, the communication portion acquires (receives) the information on the optical system 220, the information on the diaphragm section 250, and the various kinds of the other lens information by dividing them into the four types of informations (by divisionally communicating them in four times), and divisionally transmits four types of information instructions to the interchangeable lens 200.

Further, the first adapter communication portion 312 generates the information of the optical system 220 to be transmitted to the first camera communication portion 112, on the basis of the information which is divisionally acquired for each of the four communications in the single period. Here, regarding the information of the lens (for example, the optical system 220) generated by the first adapter communication portion 312 in the single period (in other words, the information to be transmitted to the first camera communication portion 112), each information divisionally acquired is not generated for each reception of the communications and transmitted to the camera body 100. Instead, on the basis of all the informations divisionally received in the single period (in the present embodiment, all the lens informations divisionally received in four times), the lens information to be transmitted is generated, and the generated lens information is transmitted to the camera body 100. That is, the lens information to be transmitted to the camera body 100 is not only the respective informations, which are divisionally acquired, but also the information in which all the four types of the informations received (four times) are collected (unified in order to be transmitted to the camera body 100) (in other words, the adapter 300 does not divisionally transmit the respective lens informations, which are divisionally received four times in the interchangeable lens 200, to the camera body 100 through the respective four communications, but transmits them to the camera body 100 once). With such a configuration, it is possible to suppress the frequency of communications between the adapter 300 and the camera body 100. Thus, it is possible to reduce the processing load to both control sections (the adapter control section 310 and the camera control section 110).

In addition, the first adapter communication portion 312 generates, in a prescribed format, the lens information (information of the optical system 220), which is to be transmitted to the first camera communication portion 112 through the "routine data communication" (refer to FIG. 9), on the basis of the lens information (for example, the information of the optical system 220) which is acquired through the "lens routine communication" (refer to FIG. 9).

Here, the prescribed format is a format which is prescribed by the communication standard of the command data communication of the first data communication system D1b between the first adapter communication portion 312 and the first camera communication portion 112, and is also a format in which the data configuration to transmit the information of the optical system 220 and the like are prescribed. For example, the data configuration of information indicating the type of the optical system 220, information indicating the driving status of the focus lens 222, information indicating the driving status of the VR lens 223, and the like, as the information of the optical system 220, is prescribed.

As described above, the first adapter communication portion 312 converts the lens information (information of the optical system 220), which is acquired as the plurality of informations divided through the plurality of communications in the "lens routine communication", into the (singly unified) information in which they are unified in the prescribed format, and transmits the information through the single communication in the "routine data communication". That is, the first adapter communication portion 312 converts communication data, which is transmitted and received in the communication format of the "lens routine communication", into communication data which is transmitted and received in the communication format of the "routine data communication".

Accordingly, the adapter 300 is provided between the camera body 100 and the interchangeable lens 200 having mutually different communication standard, and is thereby able to acquire the information of the optical system 220 of the interchangeable lens 200 and transmit the information to the camera body 100.

The embodiment described an example in which all the lens informations, which are divisionally acquired a plurality of times, are unified, and the unified information is transmitted to the camera body 100, but not all of them may be used.

For example, by selecting some (for example, two or three) of the informations which are received a plurality of times (in the above description, four times), the selected informations may be unified and transmitted.

Further, the adapter 300 is configured to transmit the lens information which is acquired from the lens 200, in combination with the contents to be transmitted (so as to be appropriate for the request from the camera body 100) not only in accordance with the communication format of the "routine data communication" but also in response to the request command from the camera body 100 (on the basis of the analysis of the request command). Therefore, the adapter is compatible with various request commands from the camera body 100.

Communication Process of Detecting Driving Status of Driving Element (or Optical System Driving Section) of Interchangeable Lens Next, the communication process of the driving status of the driving element (the optical system 220 or the diaphragm section 250) or the optical system driving section 230 of the interchangeable lens 200 will be described.

The adapter control section 310 receives the control command output from the camera control section 110 (for example, the first reception section of the first adapter communication portion 312 performs the reception), and transmits a lens control command, depending on the contents (the contents received by the first reception section) of the received control command, for controlling the driving of the optical system driving section 230 (in other words, the driving element such as the optical system 220 or the diaphragm section 250 in the interchangeable lens 200), to the lens control section 210 (for example, the first transmission section of the first adapter communication portion 312 performs the transmission). Further, after transmitting the corresponding lens control command, the adapter control section 310 receives status information which indicates the driving status of the optical system driving section 230, from the lens control section 210 (for example, the second reception section of the first adapter communication portion 312 performs the reception), and on the basis of the received contents (the contents received by the second reception section), transmits the status information which indicates the driving status of the driving element, to the camera control section 110 (for example, the second transmission section of the first adapter communication portion 312 performs the transmission).

That is, after transmitting the lens control command for the optical system driving section 230 to the lens control section 210, the adapter control section 310 receives the status information which indicates the driving status of the optical system driving section 230, from the lens control section 210, and then transmits the status information to the camera control section 110.

However, when transmitting a lens control command (first lens control command) for an instruction to start driving the driving element to the lens control section 210 (for example, when performing the transmission from the first transmission section), the adapter control section 310 transmits, regardless of the reception of the second reception section, the status information which indicates that the driving of the driving element is in progress, to the camera control section 110 (performs the transmission from the second transmission section).

For example, when receiving the lens control command to start the driving from the adapter control section 310, the lens control section 210 drives the optical system driving section 230 in response to the instruction of the corresponding control command. Further, the lens control section 210 transmits, in response to the driving start of the optical system driving section 230, status information which indicates that "the driving of the driving element in the interchangeable lens 200 is in progress", to the adapter control section 310.

Here, the adapter control section 310 may be configured to wait for the reception of the status information from the lens through the lens routine communication, and then transmit the received status information to the camera control section 110 through the routine data communication. In such a configuration, regarding timing at which the driving of the optical system driving section 230 is started (that is, the driving is in progress), sometimes it may take time until the status information indicating that the driving is in progress is transmitted to the camera control section 110 (the timing of the reception by the camera control section 110 may be delayed).

The reason is that the lens routine communication and the routine data communication are asynchronous to each other and the communications are performed in mutually different periods. Further, another reason is that, in order for the adapter control section 310 to relay communication between the lens routine communication and the routine data communication as communication standards different from each other, a data conversion process is necessary.

As described above, in the adapter control section 310, there is a time lag between the timing of the driving start of the optical system driving section 230 and the timing of the reception of the status information which indicates that "the driving is in progress", by the camera control section 110. That is, in the camera control section 110, even though the driving of the optical system driving section 230 is already in progress, there is a time period in which it is difficult to receive the status information which indicates that "the driving is in progress".

In order to reduce the above-mentioned time lag, the adapter control section 310 transmits the lens control command (first lens control command) to start the driving of the optical system driving section 230 to the lens control section 210 (for example, performs the transmission from the first transmission section), and then (immediately thereafter) transmits the status information (the status information which indicates the "driving-in-progress" status), which indicates that the driving is already in progress, to the camera control section 110 without waiting for the response (the response of the status information which indicates the driving status of the driving element) from the lens control section 210 (for example, without waiting for the reception by the second reception section).

In addition, the adapter control section 310 according to the present embodiment is configured to transmit the lens control command, which indicates the above-mentioned driving start, to the lens control section 210, and then transmit the status information which indicates that "the driving is in progress", to the camera control section 110. Regarding this sequence, for example, the operation sequence of the adapter control section 310 may be improved such that the above-mentioned lens control command is transmitted to the lens control section 210 and the "driving-in-progress" status information is transmitted to the camera control section 110.

On the other hand, when the driving of the optical system driving section 230 is stopped, the adapter control section 310 acquires the response (status information), which indicates that the optical system driving section 230 is in a stopped state, from the lens control section 210, and then transmits the status information which indicates the "driving stop status", to the camera control section 110. That is, when stopping the driving of the optical system driving section 230, the adapter control section 310 checks the actual stopped state (receives the response, which indicates the intent thereof, from the lens control section 210), and then responds with the intent to the camera control section 110.

Figure 11:
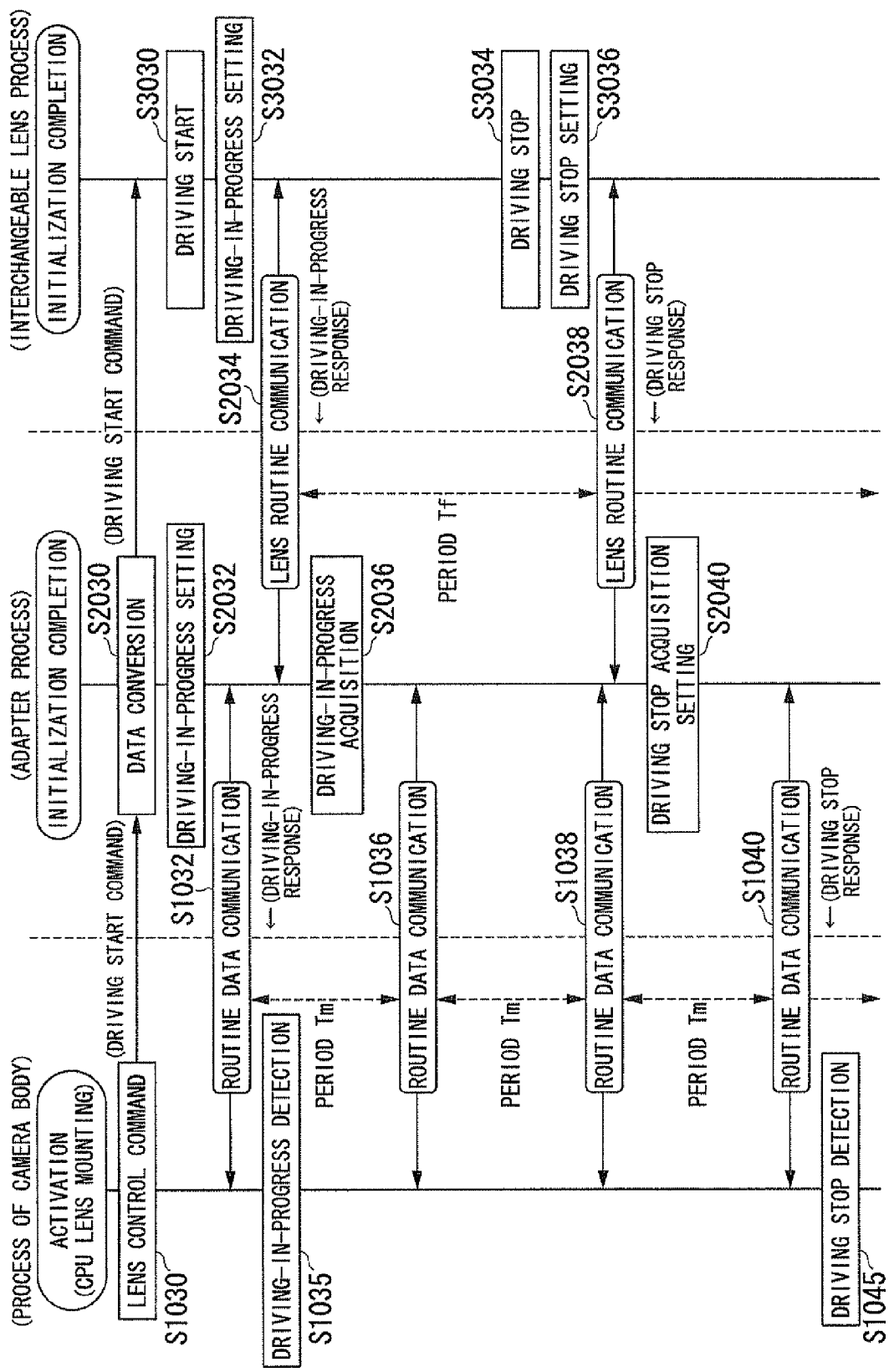
FIG. 11 is a diagram illustrating an example of a communication sequence for detecting a driving status of an optical system driving section.

FIG. 11 is a diagram illustrating an example of the communication sequence for detecting the driving status of the optical system driving section 230 (or the above-mentioned driving element).

Referring to the drawing, a description will be given of a process in which the adapter control section 310 communicates the driving status of the optical system driving section 230 (or the above-mentioned driving element).

In addition, the first camera communication portion 112 performs the routine data communication with the first adapter communication portion 312 in the period Tm (steps S1032, S1036, S1038, and S1040). Further, the first adapter communication portion 312 performs the lens routine communication with the first lens communication portion 212 in the period Tf (steps S2034 and S2038).

First, when the camera control section 110 controls the optical system driving section 230 provided in the interchangeable lens 200, the first camera communication portion 112 transmits a lens control command to control the optical system driving section 230 to the first adapter communication portion 312 (step S1030). For example, the first camera communication portion 112 transmits a lens control command (driving start command) to move the position of the focus lens 222 to a target position.

Next, the first adapter communication portion 312 converts the received lens control command (driving start command) into a lens control command (driving start command) to be transmitted to the first lens communication portion 212, and transmits the converted lens control command (driving start command) to the first lens communication portion 212 (step S2030). Further, after transmitting the lens control command to the first lens communication portion 212, the first adapter communication portion 312 sets the driving status to "driving in progress" without detecting the driving status of the optical system driving section 230 (step S2032). For example, in response to the lens control command to the position of the focus lens 222 to the target position, the first adapter communication portion 312 sets the status information which indicates the driving status of the focus lens 222, to "driving in progress".

The first adapter communication portion 312 responds with the status information which is set to "driving in progress", to the first camera communication portion 112 through the routine data communication (step S1032). The first camera communication portion 112 detects that the status information is "driving in progress" through the routine data communication of step S1032 (step S1035).

Further, the first lens communication portion 212 receives the lens control command which is transmitted from the first adapter communication portion 312 in step S2030. The optical system control portion 211 of the lens control section 210 controls the optical system driving section 230 such that it starts the driving thereof on the basis of the lens control command (driving start command) (step S3030). For example, in response to the lens control command to the position of the focus lens 222 to the target position, the optical system control portion 211 controls the optical system driving section 230 such that it starts driving the focus lens 222.

Furthermore, in response to the driving start of the focus lens 222 through the control of the optical system driving section 230, the optical system control portion 211 sets the status information provided in the interchangeable lens 200 to "driving in progress" which indicates that the driving status of the focus lens 222 is driving in progress (step S3032).

Next, the first lens communication portion 212 responds with the "driving-in-progress" status information which is set by the optical system control portion 211 in step S3032 through the lens routine communication (step S2034). Then, the first adapter communication portion 312 acquires the "driving-in-progress" status information which is the response transmitted through the lens routine communication (step S2036). In addition, in step S2036, the first adapter communication portion 312 acquires only the "driving-in-progress" status information, and does not perform transmission to the first camera communication portion 112.

Subsequently, when shift of the focus lens 222 to the target position is complete, the optical system control portion 211 controls the optical system driving section 230 such that it stops driving the focus lens 222 (step S3034). Further, in response to the stopping of the driving, the optical system control portion 211 sets the status information which is provided in the interchangeable lens 200, to "driving stop" which indicates that the driving status of the focus lens 222 is a driving stop status (step S3036).

Next, the first lens communication portion 212 responds with the "driving stop" status information which is set by the optical system control portion 211 in step S3036, through the lens routine communication (step S2038). Then, the first adapter communication portion 312 acquires the "driving stop" status information which is the response transmitted through the lens routine communication (step S2040).

The first adapter communication portion 312 responds with the status information which is set to "driving stop", to the first camera communication portion 112 through the routine data communication (step S1040). The first camera communication portion 112 detects that the status information is "driving stop" through the routine data communication of step S1040 (step S1045).

As described above, the first adapter communication portion 312 transmits a control command to start driving the optical system driving section 230 to the first lens communication portion 212, then does not wait for the response from the first lens communication portion 212, and transmits the status information (status information which indicates that the driving is in progress), which indicates the driving status, to the first camera communication portion 112.

Further, when the driving of the optical system driving section 230 is stopped, the first adapter communication portion 312 acquires the response, which indicates that the optical system driving section 230 is in the stopped state, from the first lens communication portion 212, and transmits the status information which indicates the driving status, to the first camera communication portion 112.

Thereby, the first adapter communication portion 312 is able to reduce the time lag between the timing of the driving start of the optical system driving section 230 and the timing of the reception of the status information which indicates that the driving is in progress, by the first camera communication portion 112.

Accordingly, in the first camera communication portion 112, even though the driving of the optical system driving section 230 is in progress, it is possible to eliminate the time period in which it is difficult to receive the status information indicating that the driving is in progress. Further, when the driving of the optical system driving section 230 is stopped, the first adapter communication portion 312 detects that the driving is in the stopped state, and is then able to transmit the status information to the first camera communication portion 112.

Lens Activation Process

Next, a lens activation process (the process of step S100 in FIG. 8) will be described.

First, a brief overview of the lens activation process will be given.

When the supply of the voltage of the control system power supply Vcc1 from the camera body 100 is started (after the power feeding from the control system power supply Vcc1 to the adapter control section 310 is started), the adapter control section 310 transmits a power-system power supply PWR request signal, which is for requesting the supply start of the voltage of the power-system power supply PWR, to the camera body 100. That is, the adapter control section 310 is supplied with the voltage of the control system power supply Vcc1 from the camera body 100, and then transmits the power-system power supply PWR request signal, which is for requesting start of the power feeding from the power-system power supply PWR, to the camera body 100.

Further, the adapter control section 310 causes the adapter power supply section 320 to generate the voltage of the lens control system power supply Vc and the voltage of the lens driving system power supply Vp for supplying a voltage to the interchangeable lens 200 from the voltage of the power-system power supply PWR which is supplied from the camera body 100 in response to the power-system power supply PWR request signal. In addition, after the power feeding from the power-system power supply PWR is started, the adapter control section 310 causes the adapter power supply section 320 to generate the voltage of the lens driving system power supply Vp and the voltage of the lens control system power supply Vc, and supplies them to the interchangeable lens 200.

For example, after the power feeding to the adapter power supply section 320 from the power-system power supply PWR is started, the adapter control section 310 supplies the voltage of the lens control system power supply Vc from the adapter power supply section 320 to the interchangeable lens 200 (starts the power feeding from the lens control system power supply Vc). Subsequently, after the voltage of the lens control system power supply Vc is supplied from the adapter power supply section 320 to the interchangeable lens 200, the adapter control section 310 supplies the voltage of the lens driving system power supply Vp to the interchangeable lens 200.

Specifically, in response to the supply of the voltage of the lens control system power supply Vc to the interchangeable lens 200, when receiving the lens driving system power supply Vp request signal which indicates the request to start the supply of the voltage of the lens driving system power supply Vp from the interchangeable lens 200, the adapter control section 310 supplies the voltage of the lens driving system power supply Vp from the adapter power supply section 320 to the interchangeable lens 200.

Further, after the supply of the voltage of the control system power supply Vcc1 from the camera body 100 is started, the adapter control section 310 executes an initialization process in response to the control instruction from the camera control section 110. For example, the adapter control section 310 executes the process of initializing the status of the interchangeable lens 200 as the initialization process (makes a request for the interchangeable lens 200). That is, after the power feeding to the interchangeable lens 200 is performed (the power of the lens system power supply system is supplied to the interchangeable lens 200), the adapter control section 310 executes the process of initializing the status of the interchangeable lens 200 (makes a request for the interchangeable lens 200).

Further, the process of initializing the status of the interchangeable lens 200 includes a lens control section initialization process of initializing the lens control section 210.

For example, by feeding a voltage to the interchangeable lens 200 through the initialization process, the adapter control section 310 detects whether or not the interchangeable lens 200 is mounted on the adapter 300. Then, after detecting whether or not the interchangeable lens 200 is mounted on the adapter 300, the adapter control section 310 executes the lens control section initialization process of initializing the lens control section 210.

Next, details of the lens activation process of the camera system 1 will be described.

FIG. 12 is a diagram illustrating an example of a process sequence of the lens activation process. The drawing shows an example of the lens activation process in a case where the main power supply of the camera body 100 is turned on.

The lens activation process is performed in the order of attachment/detachment determination (step S110), information exchange between the camera body 100 and the adapter 300 (step S120), initialization (step S130), lens information acquisition (step S160), and lens function start (step S170). Further, in the initialization (step S130), as processes which are performed on the interchangeable lens 200 by the adapter 300, a mounting determination process (step S140) and a lens initialization process (step S150) are sequentially executed.

In addition, in the activation process, communication, which is performed between the camera body 100 and the interchangeable lens 200 through the adapter 300, is the command data communication.

First, the attachment/detachment determination (step S110) is a process in which the camera body 100 starts feeding a voltage of the control system power supply Vcc1 to the adapter 300 and determines whether the adapter 300 (or the interchangeable lens 200A) is mounted.

When the main power supply of the camera body 100 is turned on, the camera control section 110 controls the camera power supply section 120 such that it supplies (feeds) the voltage of the control system power supply Vcc1 to the adapter 300 (step S1110). Thereby, the adapter control section 310 is supplied with the voltage of the control system power supply Vcc1. The adapter control section 310 performs the adapter activation process in response to the supply of the voltage of the control system power supply Vcc1, and notifies whether or not to perform communication to the first camera communication portion 112 from the first adapter communication portion 312 (step S2110). For example, in response to the supply of the voltage of the control system power supply Vcc1, the first adapter communication portion 312 controls the signal RDY such that it is set to the H (high) level, and controls the signal RDY such that it is set to the L (low) level through the adapter activation process. Then, the first camera communication portion 112 detects the falling edge of the signal level of the signal RDY, thereby acquiring mount information (step S1112).

Thereby, the camera control section 110 performs attachment/detachment determination as to whether or not the adapter 300 is mounted, on the basis of the mount information acquired by the first camera communication portion 112 (step S1114). For example, the camera control section 110 performs the attachment/detachment determination, on the basis of the mount information which indicates whether or not the falling edge of the signal level of the signal RDY is detected.

In step S1114, if it is determined that the adapter 300 is mounted on the camera body 100, the camera control section 110 advances the process to the information exchange (step S120) between the camera body 100 and the adapter 300.

In addition, if the standard compatible lens (for example, the interchangeable lens 200A) is directly mounted on the camera body 100 without the adapter 300, the camera control section 110 advances the process to step S120 similarly to the above. In this case, the process of step S120 is a process of exchanging information between the camera body 100 and the interchangeable lens 200A.

Further, if it is determined that the lens is not mounted in step S1114, the camera control section 110 determines that the current state is an unmounted state where either one of the adapter 300 or the interchangeable lens 200A is not mounted on the camera body 100.

In the information exchange between the camera body 100 and the adapter 300 in step S120, the following process is performed.

The first camera communication portion 112 establishes communication (command data communication) with the first adapter communication portion 312. Then, the first camera communication portion 112 and the first adapter communication portion 312 intercommunicate and acquire information such as identification IDs, names, and firmware versions of the camera body 100 and the adapter 300. Further, the first adapter communication portion 312 transmits the power-system power supply PWR request signal, which is for requesting the supply start of the voltage of the power-system power supply PWR, to the first camera communication portion 112 (steps S1120 and S2120).

Subsequently, the process of initialization (step S130) is performed. The process of initialization is a process of initializing the adapter 300 and the interchangeable lens 200 by supplying the voltage of the power-system power supply PWR from the camera body 100.

First, when the first camera communication portion 112 receives the power-system power supply PWR request signal, the camera control section 110 controls a switch 125 such that it is in a conducting state, thereby supplying (feeding) the voltage of the power-system power supply PWR from the battery 190 to the adapter 300 (step S1130).

Next, the first camera communication portion 112 transmits an initialization execution command as an initialization request to the first adapter communication portion 312 (step S1140).

When the first adapter communication portion 312 receives the initialization execution command, the adapter control section 310 executes the mounting determination process (step S140) and the lens initialization process (step S150).

The mounting determination process (step S140) is a process of determining whether the interchangeable lens is mounted on the adapter 300.

The adapter control section 310 causes the adapter power supply section 320 to generate the voltage of the lens control system power supply Vc and supply (feed) the voltage to the interchangeable lens 200. Next, the first adapter communication portion 312 executes the lens mounting determination process through the communication with the first lens communication portion 212, thereby determining whether or not the interchangeable lens is mounted. If the interchangeable lens 200 is mounted, the first lens communication portion 212 transmits the lens driving system power supply Vp request signal to the first adapter communication portion 312 (steps S2140 and S3140). Then, the adapter control section 310 advances the process to the lens initialization process (step S150).

The lens initialization process (step S150) is a process of initializing the adapter 300 and the interchangeable lens 200.

When the first adapter communication portion 312 receives the lens driving system power supply Vp request signal, the adapter control section 310 causes the adapter power supply section 320 to generate the voltage of the lens driving system power supply Vp and supply (feed) the voltage to the interchangeable lens 200. Next, the first adapter communication portion 312 executes the lens initialization process through the communication with the first lens communication portion 212 (steps S2150 and S3150). Here, the reason why the lens driving system power supply Vp is not supplied from the adapter 300 side to the interchangeable lens 200 side is as follows. In some interchangeable lenses, it may not be necessary to supply power to the lenses (for example, manual focus lenses). When such an interchangeable lens is mounted, it is an unnecessary task for the adapter 300 to generate the lens driving system power supply Vp and perform the power supply operation. Therefore, in the present embodiment, in order for the adapter 300 not to perform the unnecessary task, the power feeding sequence of the power supply is determined.

Next, when the adapter 300 and the interchangeable lens 200 are completely initialized, as a result of the response to an initialization confirmation command, the first camera communication portion 112 receives "initialization completion" as information which indicates that the initialization is complete, from the first adapter communication portion 312. Thereby, the camera control section 110 acquires the initialization completion information (step S1150).

When the initialization is complete, the camera control section 110 determines whether or not the adapter 300 is mounted, on the basis of the information acquired through the information exchange between the camera body 100 and the adapter 300 of step S1120 (step S1155). In step S1155, if it is determined that the adapter 300 is not mounted, the camera control section 110 determines that the standard compatible lens (for example, the interchangeable lens 200A) is directly mounted on the camera body 100 without the adapter 300. In contrast, in step S1155, if it is determined that the adapter 300 is mounted, the camera control section 110 advances the process to the process of the lens information acquisition (step S160).

The process of the lens information acquisition (step S160) includes the process of determining whether the interchangeable lens is mounted on the adapter 300 and a process of acquiring information of the interchangeable lens 200 mounted on the adapter 300. The information of the interchangeable lens 200 includes, for example, the type of the lens, presence or absence of the hotline communication function, presence or absence of the vibration-proof function, presence or absence of the electromagnetic diaphragm, the full-aperture F value, focal length information, and the like.

The first camera communication portion 112 transmits a lens information acquisition command to the first adapter communication portion 312, and receives the response of the lens information from the first adapter communication portion 312, thereby acquiring the information of the interchangeable lens 200 (steps S1160 and S2160).

Next, the camera control section 110 determines the type (class) of the interchangeable lens 200 on the basis of the lens information which is acquired in the lens information acquisition (step S160) (step S1165). For example, the camera control section 110 determines whether or not a CPU lens is mounted on the adapter 300 on the basis of the determination result of the mounting determination process (step S140).

If it is determined that the CPU lens is not mounted in step S1165, it is determined that a non-CPU lens is mounted, activation is performed, and the process ends.

In contrast, if it is determined that the CPU lens is mounted in step S1165, the process advances to the lens function start (step S170).

Further, the camera control section 110 determines, on the basis of the acquired lens information, whether or not the lens is, for example, a lens having an AF control (processing) function, a lens having a function (vibration-proof control function) of control (processing) of the VR lens 223, or an electromagnetic-diaphragm-type lens.

The process of the lens function start (step S170) is a process of starting respective functions thereof in accordance with the type (function) of the interchangeable lens on the basis of the lens information which is acquired in the process of the lens information acquisition (step S160). The first camera communication portion 112 communicates with the first lens communication portion 212 through the first adapter communication portion 312, thereby performing, for example, processes of acquiring a table for lens control, setting permission of the hotline communication, setting the vibration-proof control start, and the like (steps S1170, S2170, and S3170).

Then, the camera control section 110 determines that the CPU lens is mounted, performs activation, and ends the process.

As described above, the adapter control section 310 performs activation in response to the supply of the voltage of the control system power supply Vcc1 from the camera body 100, and requests the camera body 100 to start supplying the voltage of the power-system power supply PWR. Further, the adapter control section 310 generates the voltage of the lens control system power supply Vc to be supplied to the interchangeable lens 200 from the power-system power supply PWR, in response to the supply of the voltage of the power-system power supply PWR from the camera body 100. Furthermore, the adapter control section 310 supplies the voltage of the lens control system power supply Vc to the interchangeable lens 200. Thereby, when the request to supply the voltage of the lens driving system power supply Vp is issued from the interchangeable lens 200, the adapter control section generates the voltage of the lens driving system power supply Vp from the power-system power supply PWR, and supplies it to the interchangeable lens 200.

Thereby, the adapter control section 310 is able to generate a voltage to be supplied to the interchangeable lens 200 on the basis of the voltage supplied from the camera body 100, and appropriately control the supply start timing of the voltage of each power supply system.

Further, the adapter control section 310 determines the specification of the interchangeable lens 200 in the lens activation process, and is thereby able to supply a voltage to the interchangeable lens 200 on the basis of the determined specification. Further, the adapter control section 310 is able to stop the supply of the voltage to the interchangeable lens in the case where it is not necessary to supply a voltage to the interchangeable lens, on the basis of the determined specification of the interchangeable lens.

Details of Initialization Process in Lens Activation Process

Next, the process of initialization (step S130) in the lens activation process described with reference to FIG. 12 will be described in detail with reference to FIG. 13.

FIG. 13 is a diagram illustrating an example of the process sequence of the initialization process in the lens activation process. In FIG. 13, the processes corresponding to the respective processes of FIG. 12 will be represented by the same reference numerals and signs, and description thereof will be omitted.

The first camera communication portion 112 supplies the voltage of the power-system power supply PWR (step S1130), and subsequently transmits an initialization execution command as an initialization request to the first adapter communication portion 312 (step S1140). Thereafter, the first camera communication portion 112 repeatedly transmits an initialization completion confirmation command (steps S1145a, S1145b, S1145c, ...), which is to detect completion of the process of initialization performed by the adapter 300, to the first adapter communication portion 312, and waits for the response of "initialization completion" from the first adapter communication portion 312 (step S1145).

For example, the first camera communication portion 112 repeatedly transmits the initialization completion confirmation command to the first adapter communication portion 312 in the period Ts during a period of time until the response of "initialization completion" is acquired (or a predetermined period of time to perform time-out process). The period Ts of the communication of the initialization completion confirmation command is a time interval which is shorter than that of the period Tm of the routine data communication described with reference to FIG. 9. That is, the first adapter communication portion 312 executes a process of transmitting information (a process of responding to the initialization completion confirmation command), which indicates whether or not the initialization process is complete, on the camera control section 110 with a time interval shorter than that of the period Tm of the routine data communication. That is, the detection as to whether or not the initialization process is complete is performed with the time interval, which is shorter than that of the period Tm of the routine data communication, by the camera control section 110. As described above, by shortening the interval (period) for detecting completion of the initialization, as a result, it is possible to start the process which is performed after completion of the initialization at an early stage. Thus, it is possible to shorten the time necessary for the rising edge of the apparatus and system.

The first adapter communication portion 312 responds with an initialization state of "initialization in progress" as information which indicates the state where the initialization is not complete, to the initialization completion confirmation command which is repeatedly transmitted from the first camera communication portion 112 until the initialization is complete.

In addition, in the drawing, the first camera communication portion 112 acquires the response of "initialization completion" on the basis of the result of the response to the initialization completion confirmation command of step S1145n.

Thereby, the first camera communication portion 112 is able to detect whether or not the initialization process of the adapter 300 is complete in a period with the time interval shorter than that of the period of the routine data communication.

When the first adapter communication portion 312 receives the initialization execution command, the adapter control section 310 executes a process of initializing the respective sections provided in the adapter 300 (step S2130). The process includes, for example, a process of resetting a memory in the adapter control section 310 of the adapter 300. Next, the adapter control section 310 controls the diaphragm interlocking lever driving section 330 such that it moves the diaphragm interlocking lever 350 to the retractable position (step S2135).

Subsequently, the adapter control section 310 advances the process to the lens mounting determination process (step S140). In the lens mounting determination process, the adapter control section 310 firstly causes the adapter power supply section 320 to generate the voltage of the lens control system power supply Vc and supply (feed) the voltage to the interchangeable lens 200 (step S2142). Next, in response to the supply (power feeding) of the voltage of the lens control system power supply Vc to the interchangeable lens 200, the first adapter communication portion 312 performs mounting determination by detecting whether or not the interchangeable lens 200 is mounted, on the basis of whether or not there is a response from the first lens communication portion 212 of the interchangeable lens 200 (steps S2144 and S3144).

For example, if there is no response from the first lens communication portion 212, it is determined that the interchangeable lens 200 is not mounted on the adapter 300 (lens unmounted state).

In contrast, if there is a response from the first lens communication portion 212, the first adapter communication portion 312 determines that the interchangeable lens 200 is mounted on the adapter 300, and performs communication for information exchange between the adapter 300 and the interchangeable lens 200 (steps S2146 and S3146).

In the communication for information exchange between the adapter 300 and the interchangeable lens 200, for example, the first adapter communication portion 312 and the first lens communication portion 212 identify each other by communicating identification commands with each other, and check whether or not it is possible to perform communication normally. Further, the first adapter communication portion 312 acquires lens information which is for identifying the type of the interchangeable lens 200, information which indicates a state of the lens switch (for example, a switch for switching between AF and MF (Manual Focus)) provided in the interchangeable lens 200, and the like.

Further, the first lens communication portion 212 transmits the lens driving system power supply Vp request signal to the first adapter communication portion 312. Then, the adapter control section 310 advances the process to the lens initialization process (step S150).

In the lens initialization process (step S150), first, when the first adapter communication portion 312 receives the lens driving system power supply Vp request signal, the adapter control section 310 causes the adapter power supply section 320 to generate the voltage of the lens driving system power supply Vp and supply (feed) the voltage to the interchangeable lens 200 (step S2152). Next, the first adapter communication portion 312 transmits the lens initialization execution command, which is to request execution of the lens initialization process, to the first lens communication portion 212 (step S2154). When the first lens communication portion 212 receives the lens initialization execution command, the lens control section 210 executes the lens initialization process in response to the lens initialization execution command from the first adapter communication portion 312 (step S3154).

The lens initialization process includes processes of initializing the lens control section 210, the AF control (control of the focus lens 222), the vibration-proof control (control of the VR lens 223), and the like. In addition, in the case of the electromagnetic-diaphragm-type CPU lens, in the lens initialization process, the process of initialization of the electromagnetic diaphragm control is also executed.

In addition, after the lens initialization process is complete, the first adapter communication portion 312 starts the lens routine communication with the first lens communication portion 212 (step S2156).

Next, the adapter control section 310 performs initialization driving of the diaphragm interlocking lever 350 (step S2158). For example, the adapter control section 310 controls the diaphragm interlocking lever driving section 330, thereby executing the process of moving the position of the diaphragm interlocking lever 350 to the prescribed position which is determined in advance. In addition, the adapter control section 310 moves, in accordance with the control condition, the position of the diaphragm interlocking lever 350 to, for example, a retractable position, an open position, or a position stored in a storage portion.

Subsequently, in response to completion of execution of the initialization driving of the diaphragm interlocking lever 350 in step S2158, the first adapter communication portion 312 responds with "initialization completion" as the initialization state to the initialization completion confirmation command (step S1145n) issued from the first camera communication portion 112 (step S2159). The first camera communication portion 112 acquires the response to "initialization completion" on the basis of the result of the response to the initialization completion confirmation command of step S1145n (step S1150), and ends the initialization.

As described above, in response to the initialization execution command from the first camera communication portion 112, the adapter control section 310 is able to initialize the respective sections provided in the adapter 300, determine whether the lens is mounted on the adapter 300, and initialize the state of the interchangeable lens 200 mounted on the adapter 300. Further, the first camera communication portion 112 is able to detect whether or not the initialization process of the adapter 300 is complete in the period (for example 10 msec) with the time interval shorter than that of the period (the period Tm; for example, 16 msec) of the routine data communication. Accordingly, the camera control section 110 is able to appropriately and promptly detect whether or not the initialization process is complete.

Example of Initialization Completion Response Data

In addition, as described with reference to FIG. 13, the adapter control section 310 requests the interchangeable lens 200 to execute the process of initializing the status of the interchangeable lens 200, and thereafter performs the initialization driving (initialization process) of the diaphragm interlocking lever 350. Further, after the lens initialization process of initializing the status of the interchangeable lens 200 is complete, the adapter control section 310 completes the process of initialization which is performed in response to the initialization execution command transmitted by the first camera communication portion 112. That is, before the adapter control section 310 completes the process of initialization (the process including shift of the diaphragm interlocking lever 350 to the retractable position), the lens initialization process is complete.

Thereby, after the lens initialization process is complete, the adapter control section 310 is able to respond with the initialization completion to the first camera communication portion 112.

Figure 14A:
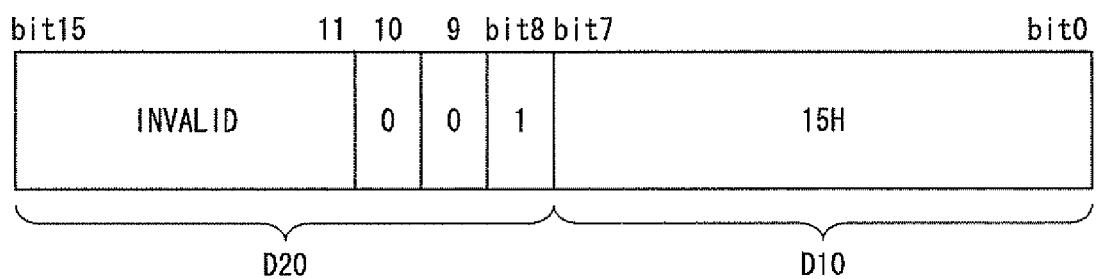
FIG. 14A is a diagram illustrating an example of a data structure of initialization information obtained through the command data communication.
Figure 14B:
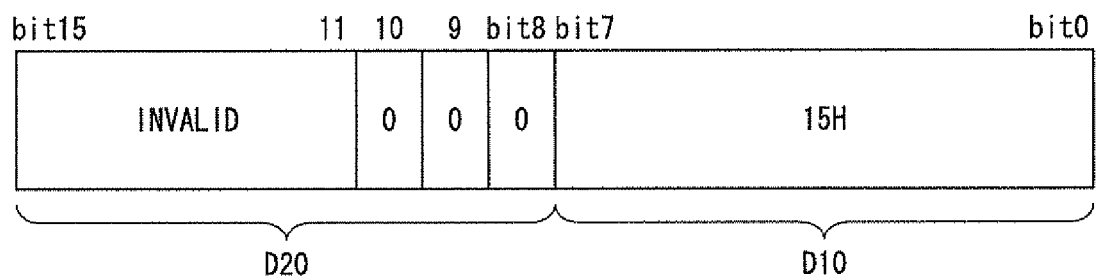
FIG. 14B is a diagram illustrating an example of a data structure of initialization information obtained through the command data communication.

FIGS. 14A and 14B are a diagram illustrating an example of a data structure of the initialization state as a response to the initialization completion confirmation command in the command data communication.

For example, in the command data communication, the initialization state data as a response to the initialization completion confirmation command is two-byte data. In addition, among the two-byte data, the lower one byte D10 (bits 0 to 7) is command data which indicates the data as a response to the initialization completion confirmation command. For example, as shown in the drawing, there is provided an example in which the data of "15H" (15H in hexadecimal) as the command data for identifying the data as a response to the initialization completion confirmation command is set as the lower one byte D10. Further, the upper one byte D20 (bits 8 to 15) is initialization state data as a response. In bit 8 of the upper one byte D20, a flag (diaphragm interlocking lever initialization completion information), which indicates whether or not the initialization process of the diaphragm interlocking lever 350 in the adapter 300 is complete, is set. Further, in bit 9, a flag (lens initialization completion information), which indicates whether or not the initialization process of the focus lens 222 in the interchangeable lens 200 is complete, is set. Furthermore, in bit 10, a flag (lens initialization completion information), which indicates whether or not the initialization process of the VR lens 223 in the interchangeable lens 200 is complete, is set. In addition, bits 11 to 15 are undefined, and correspond to an invalid data area.

FIG. 14A shows initialization state data as a response to the initialization completion confirmation command which is set in the first adapter communication portion 312, as the first camera communication portion 112 transmits the initialization execution command as the initialization request to the first adapter communication portion 312 (data set in step S2130 of FIG. 13). That is, the first adapter communication portion 312 responds with data, which is shown in FIG. 14A, as data, which indicates the initialization state where "the initialization is in progress", to the initialization completion confirmation command.

In addition, with the timing (step S2130 of FIG. 13), all initialization processes of the initialization process of the focus lens 222, the initialization process of the VR lens 223, and the initialization process of the diaphragm interlocking lever 350 are not complete (the process of initializing the status of the interchangeable lens 200 is not complete). However, the first adapter communication portion 312 sets the flag "0", which indicates that the initialization process is complete, in bits 9 and 10 which indicates the initialization state of the interchangeable lens 200 side. On the other hand, in bit 8 which indicates data of the initialization state of the diaphragm interlocking lever 350, the flag "1", which indicates that the initialization process is not complete, is set. That is, regardless of the initialization process state (the progress state of the initialization process) of the interchangeable lens 200 side, the adapter 300 invariably sets the completion flag "0", which indicates the state where the initialization ends, in bits 9 and 10. As described above, by setting the initialization flags within the adapter 300, even when an interchangeable lens which is a type incapable of outputting the flag indicating the initialization completion to the adapter 300 is mounted on the camera body 100 with the adapter 300 interposed therebetween, there is an advantage in that it is possible to extending the types of compatible interchangeable lenses without stopping an operation (camera system) at the stage of the initialization process sequence mentioned above.

At the time point the lens initialization process (step S150 of FIG. 13) is complete, the initialization process of the diaphragm interlocking lever 350 on the adapter 300 side is not yet complete.

FIG. 14B shows initialization state data as a response to the initialization completion confirmation command which is set when the initialization process of the initialization driving (step S2158 of FIG. 13) of the diaphragm interlocking lever 350 is complete. At this time point (step S2158 of FIG. 13), normally, the lens-side initialization process (step S150 of FIG. 13) is complete.

When the initialization process of the diaphragm interlocking lever 350 is complete, the first adapter communication portion 312 sets the flag "0", which indicates that the initialization process is complete, in bit 8 of the initialization state data. Thereby, the flag "0", which indicates that the initialization process is complete, is set in each of all the bits 8 to 10 of the initialization state data. That is, the first adapter communication portion 312 responds with data shown in FIG. 14B as the initialization state data, which indicates "initialization completion", to the initialization completion confirmation command.

That is, the initialization completion information which indicates whether or not the initialization process is complete, includes: the lens initialization completion information (bits 9 and 10 in FIGS. 14A and 14B) which invariably indicates whether or not the lens initialization process (the process of initializing the status of the interchangeable lens 200) is complete; and the information (diaphragm interlocking lever initialization completion information) (bit 8 of FIGS. 14A and 14B) which indicates whether or not the initialization process (diaphragm interlocking lever initialization process) of the diaphragm interlocking lever 350 is complete.

Then, the first adapter communication portion 312 instructs the interchangeable lens 200 to perform initialization, and sets the value of the lens initialization completion information to a value indicating that initialization is complete, and in response to completion of the diaphragm interlocking lever initialization process, the values of the diaphragm interlocking lever initialization completion information is set to a value indicating that initialization is complete.

That is, the adapter control section 310 sets the value of the lens initialization completion information to the value indicating that initialization is complete, regardless of the progress state of the process of initializing the status of the interchangeable lens 200. Further, in response to completion of the diaphragm interlocking lever initialization process, the adapter control section 310 sets the value of the diaphragm interlocking lever initialization completion information to the value indicating that initialization is complete, and transmits the initialization completion information to the camera control section 110.

In addition, in accordance with the timing (detection timing of the initialization process) of the initialization completion confirmation command of the camera control section 110, the adapter control section 310 responds with (transmits) the initialization completion information to the camera control section 110.

As described above, the adapter control section 310 updates the information (flag), which indicates whether or not the initialization is complete, at the completion timing of the initialization process of the diaphragm interlocking lever 350, and responds with the information to the camera control section 110.

Accordingly, at the timing at which the initialization process of the diaphragm interlocking lever 350 is complete, the adapter control section 310 responds with the initialization completion state, which indicates that entire initialization including the initialization of the interchangeable lens 200 side is complete, to the camera control section 110.

Initialization Performed when Standard Compatible Lens is Mounted

In addition, the embodiment described the initialization process in the case where the adapter 300 is connected to the camera body 100, but the present invention is not limited to this. For example, in the initialization process in a case where an accessory other than the adapter 300 is connected to the camera body 100, the camera body 100 may detect whether or not the initialization process of the accessory is complete, in the same manner as described above. For example, in the accessory detachably attached to the camera body 100, an accessory control section provided in the accessory may be controlled by periodic communication (routine periodic communication) with the camera control section 110 provided in the camera body 100. In this case, in the initialization process, by executing the initialization process in response to the control instruction from the camera control section 110, the accessory control section may execute a process in which whether or not the initialization process is complete is detected by the camera control section 110 with a time interval shorter than the period of the periodic communication.

As an example, a case where the accessory detachably attached to the camera body 100 is a standard compatible lens will be described below.

The standard compatible lens (for example, the interchangeable lens 200A) may be directly connected to the camera body 100 without the adapter 300. In this case, in the lens routine process, for example, the first lens communication portion 212A (the first lens communication portion 212A is provided in the lens control section 210A corresponding to the above-mentioned accessory control section) performs the routine data communication with the first camera communication portion 112 in the period Tm (performs the routine data communication in the period Tm which is the same as that of the routine data communication between the first adapter communication portion 312 and the first camera communication portion 112 shown in FIG. 9).

Further, in the lens activation process, the first camera communication portion 112 transmits the initialization execution command to the first lens communication portion 212A similarly to the initialization request process of step S1140 shown in FIG. 13. That is, the first camera communication portion 112 transmits the initialization execution command to the first lens communication portion 212A instead of the first adapter communication portion 312. Thereafter, similarly to the initialization completion confirmation process of step S1145, the first camera communication portion 112 repeatedly transmits the initialization completion confirmation command to the first lens communication portion 212A in the period Ts, and waits for the response of "initialization completion" from the first lens communication portion 212A.

Further, when the first lens communication portion 212A receives the initialization execution command, the lens control section 210A executes the lens initialization process of the interchangeable lens 200A. Then, as the lens initialization process is complete by the lens control section 210A, the first lens communication portion 212A responds with "initialization completion".

As described above, the process from the initialization request to the initialization completion confirmation in the camera control section 110 is performed in the same manner in both cases where the interchangeable lens 200 is connected to the camera body 100 through the adapter 300 and the interchangeable lens 200A is directly connected thereto.

That is, the first lens communication portion 212A executes a process of transmitting information (a process of responding to the initialization completion confirmation command), which indicates whether or not the initialization process is complete, on the camera control section 110 with a time interval shorter than that of the period Tm of the routine data communication. That is, even when the interchangeable lens 200A is directly connected to the camera body 100, the detection as to whether or not the initialization process is complete is performed with the time interval, which is shorter than that of the period Tm of the routine data communication, by the camera control section 110.

Thereby, the first camera communication portion 112 is able to detect whether or not the initialization process of the interchangeable lens 200A is complete in the period with the time interval shorter than that of the period of the routine data communication. Thereby, the camera control section 110 is able to appropriately and promptly detect whether or not the initialization process is complete.

Power Cut-Off Process and Low Power Consumption Process

Next, a power cut-off process and a low power consumption process will be described.

Here, the low power consumption process is a process of shifting an operation state (operation mode) of the camera body 100 to an operation mode (second operation mode/low power consumption mode/sleep mode) for reducing power consumption and incapable of performing the photography process, as compared with an operation mode (first operation mode) capable of performing the photography process.

Here, in the following technique, the low power consumption process is referred to as a sleep process, and the operation state (operation mode), which is switched by the sleep process, is referred to as a sleep mode.

For example, in response to the interrupt request issued by power off of the camera body 100, a power cut-off process is executed. Further, for example in a case where no operation continues during a predetermined time or more, the sleep process is executed.

Further, the power cut-off process and the sleep process include a lens shutdown process of stopping (shutting down) functions of the adapter 300 and the interchangeable lens 200 and stopping (cutting off) the supply of the voltage of the power-system power supply PWR from the camera body 100. That is, the power cut-off process and the sleep process are processes of stopping supplying a voltage to the interchangeable lens 200 and stopping (cutting off) the supply of the voltage of the power-system power supply PWR.

Further, in the case where the operation mode of the camera body 100 is shifted to the sleep mode, the supply of the voltage of the power-system power supply PWR from the camera body 100 is stopped, and the supply of the voltage of the control system power supply Vcc1 is continued. For example, when the operation mode of the camera body 100 is shifted to the sleep mode, the camera body 100 continues the supply of the voltage of the control system power supply Vcc1 during a predetermined time period. Here, the predetermined time period is, for example, a time period which depends on the time to return to the operation mode capable of performing the photography process by detecting the operation of the camera body 100, a time period which depends on the time to advance to the power cut-off process of the camera body 100 when the non-operation state is further continued, or the like.

Further, the operation mode of the camera body 100 may be shifted to the sleep mode. In this case, the instruction signal (shutdown execution command), which indicates the instruction to shift to the power cut-off state or the sleep mode, is transmitted from the camera control section 110 to the adapter control section 310. Then, in response to receiving the corresponding signal, the adapter control section 310 executes the lens shutdown process of stopping the power feeding to the interchangeable lens 200.

Next, when the lens shutdown process ends, the adapter control section 310 transmits a permission signal (a response of shutdown readiness), which indicates a permission to shift to the power cut-off state or the sleep mode, to the camera body 100. Subsequently, in response to the permission signal transmitted from the adapter control section 310, the supply of the voltage of the power-system power supply PWR from the camera body 100 is stopped.

Figure 15:
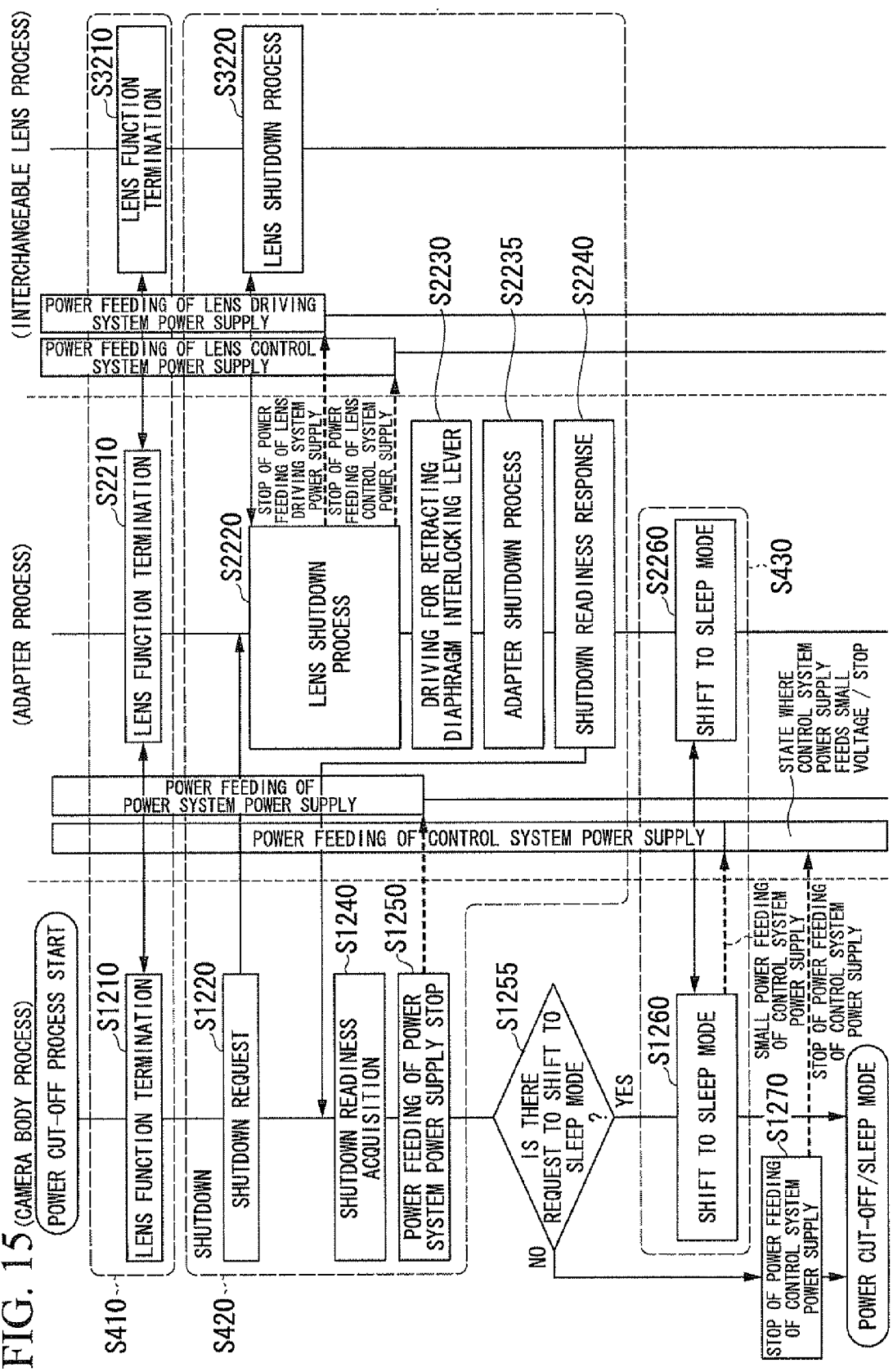
FIG. 15 is a diagram illustrating an example of a process sequence of a power cut-off process and a sleep process.

FIG. 15 is a diagram illustrating an example of a process sequence of the power cut-off process and the sleep process.

Referring to the drawing, the power cut-off process and the sleep process of the camera system 1 will be described.

The power cut-off process and the sleep process are performed in the order of lens function termination (step S410), shutdown (step S420), and shift to the sleep mode (step S430). In addition, in the power cut-off process and the sleep process, the communication, which is performed between the camera body 100 and the interchangeable lens 200 through the adapter 300, is the command data communication.

When the power cut-off process or the sleep process is started, first, the process of the lens function termination (step S410) is performed.

The first camera communication portion 112 communicates with the first lens communication portion 212 through the first adapter communication portion 312, thereby stopping the function operation of the interchangeable lens 200 (steps S1210, S2210, and S3210). Thereby, the lens control section 210 stops the function operation of the interchangeable lens 200. For example, through the process of the lens function termination, the process of termination of the vibration-proof control of the interchangeable lens 200, inhibition of the hotline communication, or the like.

Next, the process of shutdown (step S420) is performed.

The first camera communication portion 112 transmits the shutdown execution command as a shutdown request to the first adapter communication portion 312 (step S1220). Thereafter, the first camera communication portion 112 repeatedly transmits the shutdown completion confirmation command, and waits for the response of the shutdown readiness from the first adapter communication portion 312.

When the first adapter communication portion 312 receives the shutdown execution command, the adapter control section 310 starts the lens shutdown process. First, the first adapter communication portion 312 transmits a command, which is to give an instruction not to permit feeling the voltage of the lens driving system power supply Vp, to the first lens communication portion 212. As the first lens communication portion 212 receives the command, the lens control section 210 stops supplying (feeding) the voltage of the lens driving system power supply Vp in the interchangeable lens 200 (step S3220). Next, the first adapter communication portion 312 stops the lens routine communication with the first lens communication portion 212. Then, the adapter control section 310 stops the supply of the voltage of the lens driving system power supply Vp from the adapter power supply section 320, and subsequently stops the supply of the lens control system power supply Vc (step S2220).

Next, the adapter control section 310 moves the diaphragm interlocking lever 350 to the retractable position (step S2230), and executes the process of shutting down the respective sections provided in the adapter 300 (step S2235). Subsequently, when the shutdown process is complete, in response to the shutdown completion confirmation command received from the first camera communication portion 112, the first adapter communication portion 312 responds with "shutdown readiness" as information which indicates that the shutdown process of the adapter 300 (the adapter 300 and the interchangeable lens 200) is complete, to the first camera communication portion 112. Further, the first adapter communication portion 312 responds with presence or absence of the sleep process request to the first camera communication portion 112 (step S2240).

As a result of the response to the shutdown completion confirmation command, the first camera communication portion 112 acquires the response of "shutdown readiness" from the first adapter communication portion 312 (step S1240).

When the first adapter communication portion 312 acquires the response of shutdown readiness, the camera control section 110 controls the switch 125 such that it attains the cut-off state, thereby stopping the supply of the voltage of the power-system power supply PWR (step S1250).

Next, the camera control section 110 determines whether or not the request to shift to the sleep mode is present on the basis of the result of the response to the shutdown completion confirmation command (step S1255). In step S1255, if it is determined that the request to shift to the sleep mode is absent, the camera control section 110 controls the camera power supply section 120 such that it stops the supply of the voltage of the control system power supply Vcc1 (step S1270).

In contrast, in step S1255, if it is determined that the request to shift to the sleep mode is present, the process of shifting to the sleep mode (step S430) is performed. First, the first camera communication portion 112 transmits an instruction to shift to the sleep mode to the first adapter communication portion 312. Thereby, the adapter control section 310 shifts to the sleep mode. For example, the first adapter communication portion 312 controls the signal RDY such that it is set to the H (high) level before the start of the process of shifting to the sleep mode, and controls the signal RDY such that it is set to the L (low) level after the process of shifting to the sleep mode is complete. The first camera communication portion 112 detects that the process of shifting to the sleep mode of the adapter 300 is complete by detecting the falling edge of the signal level of the signal RDY, and changes the state of the supply of the voltage of the control system power supply Vcc1 to a state for feeding a small voltage (steps S1260 and S2260).

Thereby, the shift to the power cut-off state or the sleep mode is performed.

As described above, when the camera body 100 is shifted to the sleep mode, the camera control section 110 stops supplying the voltage of the power-system power supply PWR to the adapter 300, and continues supplying the voltage of the control system power supply Vcc1. That is, when the adapter 300 is shifted to the sleep mode, the supply of the voltage of the power-system power supply PWR from the camera body 100 is stopped, and the supply of the voltage of the control system power supply Vcc1 is continued.

Thereby, in the sleep mode, it is possible to reduce power consumption. Further, the supply of the voltage of the control system power supply Vcc1 is continued, and thus the process of the adapter control section 310 is not completely stopped (the adapter control section 310 is operated with the minimum electric power necessary for the return process). Hence, when returning (performing activation) from the sleep mode to a stationary state, the adapter control section 310 is able to promptly performs the return (activation) as compared with the case where the process is completely stopped.

Process at Temporary Blackout of Power Supply

For the power-system power supply PWR, the lens driving system power supply Vp, and the lens control system power supply Vc, predetermined voltage ranges are prescribed respectively.

The Vc-voltage detection portion 325, Vp-voltage detection portion 326, and PWR voltage detection portion 327 detect the voltages of the power-system power supply PWR, the lens driving system power supply Vp, and the lens control system power supply Vc, and supply the detection results to the adapter control section 310. When any of the detected voltages of the power-system power supply PWR, the lens driving system power supply Vp, and the lens control system power supply Vc are lower than the predetermined voltage ranges respectively determined for them, the adapter control section 310 supplies (notifies) the detection result to the camera body 100.

For example, the adapter control section 310 executes the lens initialization process in order to initialize the interchangeable lens 200 (state) when any voltage (voltage value) of the voltage (voltage value) of the power-system power supply PWR fed from the camera body 100, the voltage (voltage value) of the lens driving system power supply Vp fed from the adapter power supply section 320 to the interchangeable lens 200, and the voltage (voltage value) of the lens control system power supply Vc fed from the adapter power supply section 320 to the interchangeable lens 200 are lower than the predetermined voltage ranges which are respectively determined for them.

Specifically, the initialization request signal, which instructs the camera control section 110 provided in the camera body 100 of the adapter control section 310 to execute the initialization process including the lens initialization process, is transmitted from the first adapter communication portion 312 to the first camera communication portion 112, and is supplied (notified) to the camera body 100. Further, when any of the detected voltages of the power-system power supply PWR, the lens driving system power supply Vp, and the lens control system power supply Vc are lower than the predetermined voltage ranges respectively determined for them, the adapter control section 310 stops supplying the voltages of the lens driving system power supply Vp and the lens control system power supply Vc, and transmits the initialization request signal to the camera body 100.

The initialization process is a process of stopping the supply of the voltage of the power-system power supply PWR once in response to the initialization request signal and then restarting the supply thereof. Further, the initialization process is a process of stopping the supply of the voltage of the control system power supply Vcc1 once in response to the initialization request signal and then restarting the supply thereof.

In addition, the adapter control section 310 starts supplying the voltages of the lens driving system power supply Vp and the lens control system power supply Vc in response to the initialization process performed by the camera body 100. That is, the adapter control section 310 initializes the lens control section 210 in response to the initialization process performed by the camera body 100.

That is, when detecting a decrease in the power supply voltage, first, the adapter control section 310 stops supplying a voltage to the interchangeable lens 200. Next, the adapter control section 310 transmits the initialization request signal to the camera control section 110, and executes the process of stopping the supply of the voltage of the power supply from the camera body 100 once and thereafter restarting the supply thereof. Thereby, by executing the lens activation process again, the process of initialization is performed, and thus the adapter control section 310 supplies a voltage to the interchangeable lens 200.

Accordingly, when any of the detected voltages of the power-system power supply PWR, the lens driving system power supply Vp, and the lens control system power supply Vc are lower than the predetermined voltage ranges respectively determined for them, the adapter control section 310 is able to initialize the adapter 300 and the interchangeable lens 200. Hence, it is possible to prevent a problem that the operation of the interchangeable lens 200 side is continued with a voltage fed unstably.

In the determination, relative merits (degrees of importance, priorities) may be given to the voltage values of the power-system power supply PWR, the lens driving system power supply Vp, and the lens control system power supply Vc. From the viewpoint of maintenance of stable power feeding, first it is highly necessary for a value of the voltage, which is fed (fed to the adapter power supply section 320) in order to generate a supply voltage, to be within a predetermined range. Otherwise, there is a concern about fluctuation even in the voltage values subsequently generated. Accordingly, first it is determined whether or not there is an abnormality in the voltage value of the power-system power supply PWR is correct. The second important thing is that, in order for the interchangeable lens 200 side to perform correct control, it is necessary for the lens control section 210 to perform stable driving. Hence, it is determined whether or not there is an abnormality in the lens control system power supply Vc which feeds a voltage to the lens control section 210. That is, in priority order of the power-system power supply PWR, the lens control system power supply Vc, and the lens driving system power supply Vp, determination as to whether or not there is an abnormality in each voltage value thereof may be performed. As described above, by using relative merits in the determination, for example, even when there is an abnormality in the voltage value of the lens driving system power supply Vp, if the voltage value of the lens control system power supply Vc is normal and the lens control section 210 is normally operated (may normally communicate with the adapter control section 310), without performing the reset process (initialization process) on the interchangeable lens 200 side, it may be possible to recover the voltage value through another error processing (re-driving/retry operation of the lens-side driving element). Thereby, it is possible to prevent the hasty (unnecessary) initialization process from being performed.

Next, referring to FIG. 16, as an example of a process which is performed when there is a decrease in the power supply voltage, the process at the time of temporary blackout of power supply will be described.

Figure 16:
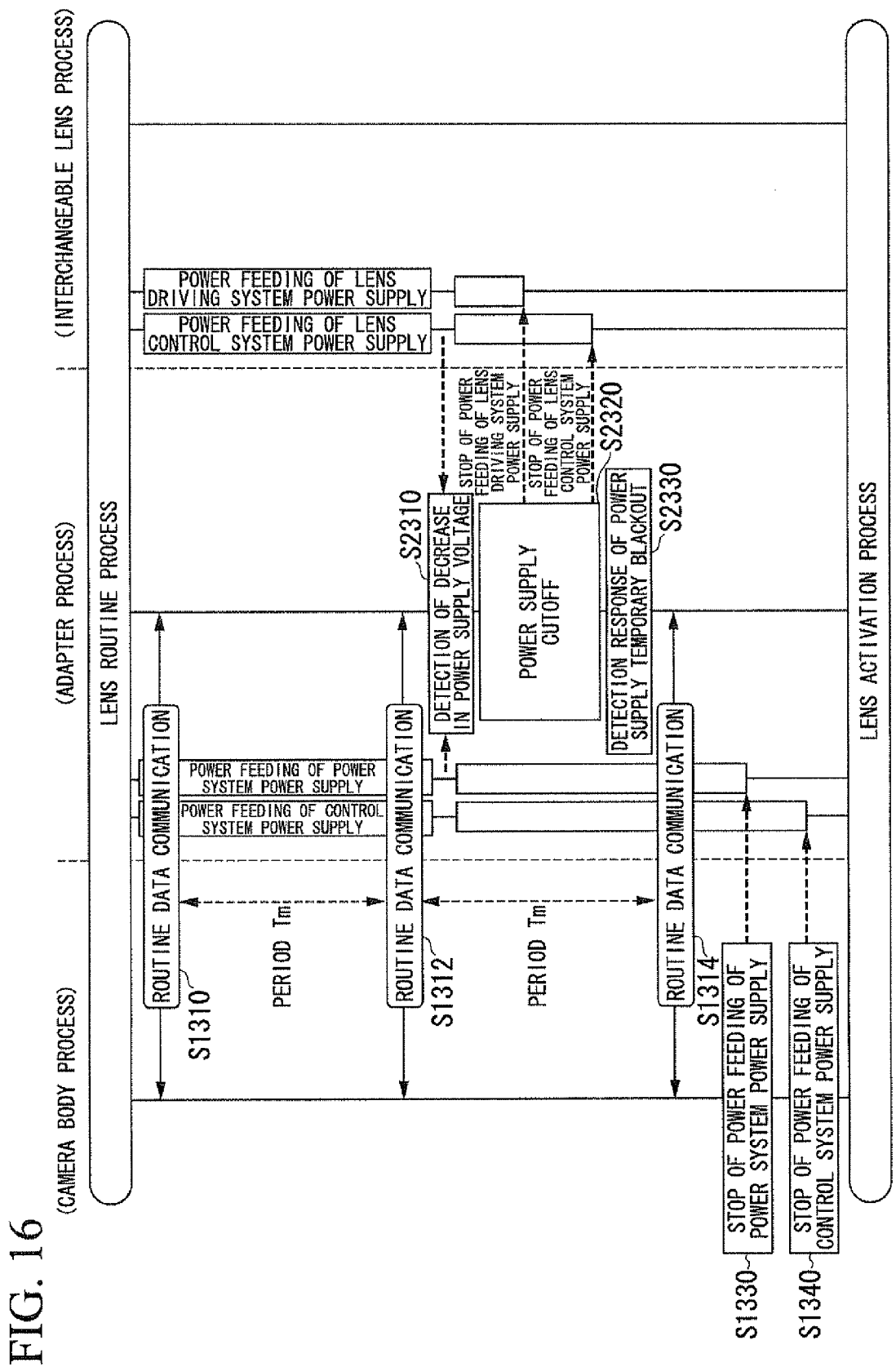
FIG. 16 is a diagram illustrating an example of a process sequence at the time of temporary blackout of power supply.

FIG. 16 is a diagram illustrating an example of a process sequence at the time of temporary blackout of power supply.

In the lens suspension state, the first camera communication portion 112 and the first adapter communication portion 312 perform the routine data communication in the period Tm (step S1310, S1312, S1314). The adapter power control portion 311 of the adapter control section 310 detects a state where there are temporary decreases in the voltages of the lens control system power supply Vc, the lens driving system power supply Vp, and the power-system power supply PWR, on the basis of the detection results of the Vc-voltage detection portion 325, the Vp-voltage detection portion 326, and the PWR voltage detection portion 327 (step S2310). FIG. 16 shows an exemplary case where the voltages of the lens control system power supply Vc, the lens driving system power supply Vp, and the power-system power supply PWR are temporarily decreased and then recovered (a case where there is a temporary blackout of the power supply). The adapter power control portion 311 executes a process of cutting off the power supply which supplies a voltage to the interchangeable lens 200, in response to detecting the state where the voltage is temporarily decreased (the state where there is a temporary blackout of the power supply). For example, the adapter power control portion 311 causes the adapter power supply section 320 to perform control, which is to stop supplying voltages in order of the lens driving system power supply Vp and the lens control system power supply Vc, as the power cut-off process (step S2320).

Next, after the adapter power supply section 320 stops the supply of the voltages of the lens driving system power supply Vp and the lens control system power supply Vc, the first adapter communication portion 312 responds with information which indicates that the temporary blackout of the power supply is detected, through the routine data communication (step S1314) to the first camera communication portion 112 (step S2330). For example, the first adapter communication portion 312 transmits "an initialization request signal in detection of the temporary blackout of the power supply" (initialization request signal) as a signal, which indicates that the temporary blackout of the power supply is detected, to the first camera communication portion 112.

Subsequently, as the first camera communication portion 112 receives "the initialization request signal in the detection of the temporary blackout of the power supply", the camera control section 110 controls the switch 125 such that it is set in the cut-off state, thereby stopping the supply of the voltage of the power-system power supply PWR (step S1330). Further, after stopping the supply of the voltage of the power-system power supply PWR, the camera control section 110 controls the camera power supply section 120 such that it stops the supply of the voltage of the control system power supply Vcc1 (step S1340).

Subsequently, the camera control section 110 executes the lens activation process (step S100 of FIG. 8) so as to thereby feed a voltage and execute the process of initialization.

As described above, when there is a temporary blackout in the power supply supplied to the interchangeable lens 200, the adapter control section 310 detects that the temporary blackout occurs, stops the voltage supplied to the interchangeable lens and the voltage supplied from the camera body 100 once so as to thereby attain the power cut-off state, and thereafter performs activation again so as to thereby execute the initialization process. Thereby, even when the temporary blackout of the power supply occurs, the adapter control section 310 initializes the adapter 300 and the interchangeable lens 200, whereby it is possible to shift them to the normal operation state.

In the embodiment, the adapter power control portion 311 detects the state where there is a temporary decrease in the voltages of the lens control system power supply Vc, the lens driving system power supply Vp, and the power-system power supply PWR, on the basis of the detection results of the Vc-voltage detection portion 325, the Vp-voltage detection portion 326, and the PWR voltage detection portion 327. In this case, the control portion cuts off the power supply which supplies a voltage to the interchangeable lens 200, and thereby executes the initialization process. However, if it is determined that the voltage is decreased only in the detection result of the Vp-voltage detection portion 326 (if it is not determined that the voltage is decreased in the detection results of the Vc-voltage detection portion 325 and the PWR voltage detection portion 327), it can be inferred that the communication itself between the adapter control section 310 and the lens control section 210 is normally performed. Therefore, the initialization process may not be executed in the interchangeable lens 200.

The embodiment described in the example in which, as the detection result of the temporary blackout of the power supply is transmitted from the adapter control section 310 to the camera control section 110, the camera control section 110 initializes the interchangeable lens 200 (the example in which the initialization is executed in a way that the adapter control section 310 receives an instruction from the camera control section 110), but the present invention is not limited to this. For example, the adapter control section 310 may determine the necessity of the initialization execution by itself without receiving the instruction from the camera control section 110, and then initialize the interchangeable lens 200.

In addition, the present embodiment described the configuration in which all the above-mentioned three voltage detection portions 325 to 327 are provided. However, even with a configuration in which only one or two of the three voltage detection portions are provided, it is possible to obtain the same advantage as the present embodiment. In this case, the PWR voltage detection portion 327 is advantageous (prior) particularly as a portion which performs the voltage detection, and in order of priority in terms of the advantage, there are the Vc-voltage detection portion 325 and the Vp-voltage detection portion 326.

The advantages according to the configurations are as described above.

Information Exchange of Identification Information

Next, a process of exchanging identification information in the camera system 1 will be described.

The camera body 100, the interchangeable lens 200, and the adapter 300 respectively have identification informations (identification IDs (Identity Documents)) for identifying the respective individuals.

For example, the camera body 100 has camera body identification information (hereinafter referred to as a camera body ID) for identifying the individual of the camera body 100. Further, the interchangeable lens 200 has lens identification information (hereinafter referred to as a lens ID) for identifying the individual of the interchangeable lens 200. Furthermore, the adapter 300 has adapter identification information (hereinafter referred to as an adapter ID) for identifying the individual of the adapter 300.

Here, the identification ID is identification information which is represented by a unique number (for example, a production serial number) assigned to each individual, and is also identification information by which each individual can be identified. Accordingly, for example, it is possible to detect a product name, the type of the product, functions provided in the product, manufacturing-history information, and the like, which are associated with the identification ID, by acquiring the identification ID.

In addition, such identification IDs are received through the communication process of the command data communication, and are exchanged as informations between the interchangeable lens 200, the camera body 100, and the adapter 300.

The process of exchanging the information of the identification IDs in the camera system 1 is performed as follows.

First, the camera body 100 transmits the camera body ID to the adapter control section 310 of the adapter 300. The adapter control section 310 acquires the camera body ID transmitted from the camera body 100. Further, the adapter control section 310 transmits the adapter ID to the camera body 100. Next, the adapter control section 310 transmits the camera body ID, which is acquired from the camera body 100, to the interchangeable lens 200. Further, the adapter control section 310 transmits the adapter ID to the interchangeable lens 200. Subsequently, the adapter control section 310 acquires the lens ID transmitted from the interchangeable lens 200, and transmits the acquired lens ID to the camera body 100.

For example, the process of exchanging identification IDs is performed in the lens activation process (refer to step S100 of FIG. 8, and FIG. 12)

Specifically, the adapter control section 310 transmits the adapter ID to the camera body 100 as a voltage is fed from the camera body 100, and acquires the camera body ID transmitted from the camera body 100. Thereafter, during execution of the initialization process of initializing the state of the interchangeable lens 200 corresponding to the control command of the camera body 100, the camera body ID and the adapter ID are transmitted to the interchangeable lens 200. Subsequently, when the initialization process is complete, the adapter control section 310 transmits the lens ID to the camera body 100 in response to the request from the camera body 100.

Figure 17:
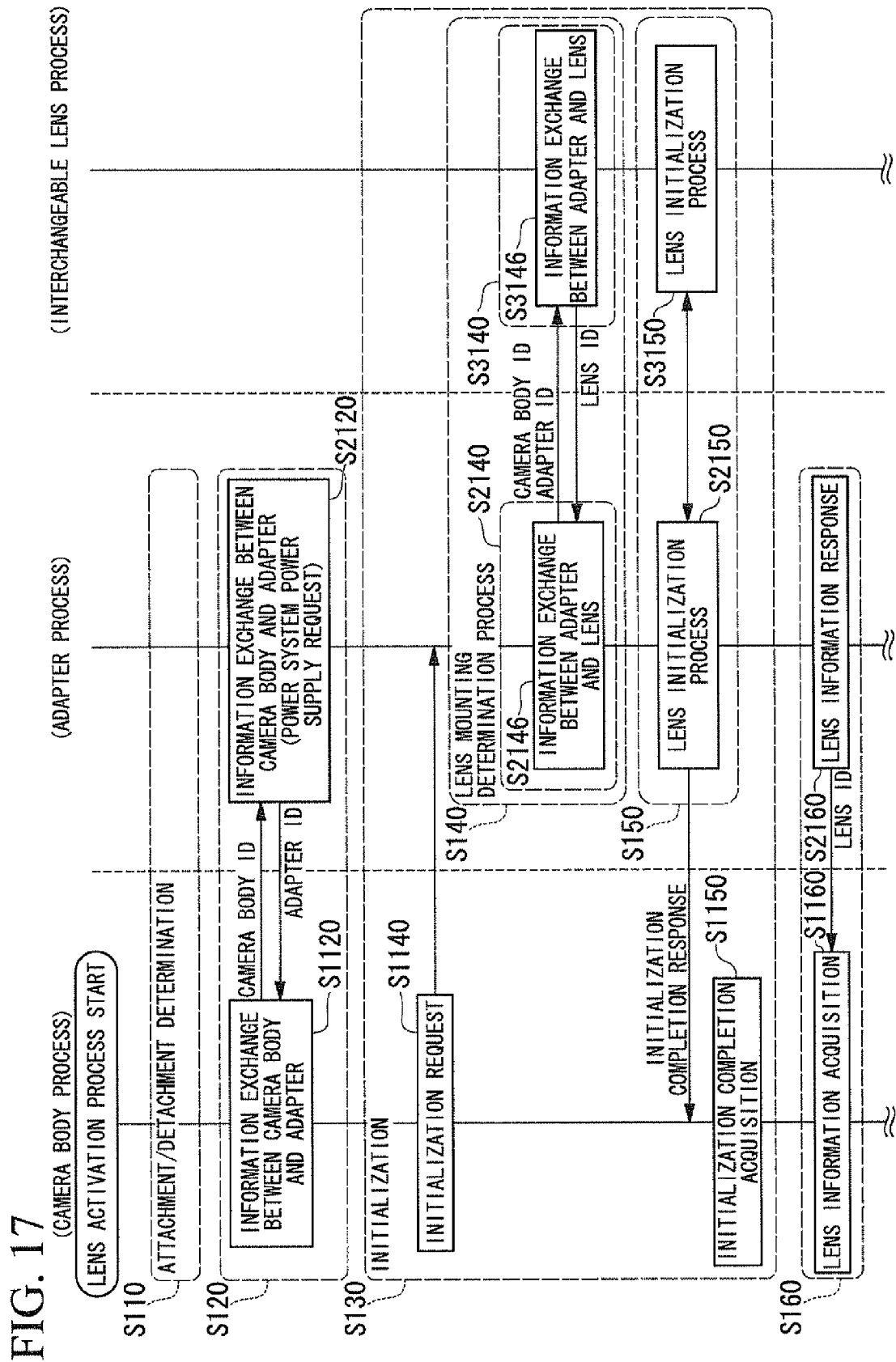
FIG. 17 is a diagram illustrating an example of a process sequence of a process of exchanging information of identification IDs.

FIG. 17 is a diagram illustrating an example of a process sequence of a process of exchanging information of identification IDs.

Referring to the drawing, details of the process of exchanging the information of the identification IDs in the lens activation process will be described.

In addition, FIG. 17 shows a process of performing the processes of exchanging the information of the identification IDs in the process sequence of the lens activation process shown in FIG. 12. In FIG. 17, the elements corresponding to the respective processes of FIG. 12 are represented by the same reference numerals and signs, and description thereof will be omitted.

As the electric power of the control system power supply Vcc1 is fed from the camera body 100, the adapter control section 310 performs the process of attachment/detachment determination (step S110), and advances to the process of the information exchange between the camera body 100 and the adapter 300 (step S120).

In the information exchange between the camera body 100 and the adapter 300 (step S120), as described with reference to FIG. 12, the first camera communication portion 112 establishes communication (command data communication) with the first adapter communication portion 312. Then, the first camera communication portion 112 and the first adapter communication portion 312 intercommunicate and acquire information such as identification IDs, names, and firmware versions of the camera body 100 and the adapter 300.

In the process, the first camera communication portion 112 transmits the camera body ID to the first adapter communication portion 312. Further, the first adapter communication portion 312 transmits the adapter ID to the first camera communication portion 112. Thereby, the first camera communication portion 112 acquires the adapter ID which is transmitted from the first adapter communication portion 312. Further, the first adapter communication portion 312 acquires the camera body ID which is transmitted from the first camera communication portion 112 (steps S1120 and S2120).

Next, in the process of initialization (step S130), the first camera communication portion 112 transmits an initialization execution command (control command) as an initialization request to the first adapter communication portion 312 (step S1140). In response to the initialization execution command, the process of initializing the state of the interchangeable lens 200 is performed.

In the process of the initialization of step S130, the first adapter communication portion 312 and the first lens communication portion 212 perform the process of exchanging information of the identification IDs. Specifically, in the process (steps S2146 and S3146) of communication of the information exchange between the adapter 300 and the interchangeable lens 200, the first adapter communication portion 312 transmits the camera body ID and the adapter ID to the first lens communication portion 212, and the first lens communication portion 212 transmits the lens ID to the first adapter communication portion 312.

Thereby, the first lens communication portion 212 acquires the camera body ID and the adapter ID which are transmitted from the first adapter communication portion 312. Further, the first adapter communication portion 312 transmits the lens ID transmitted from the first lens communication portion 212.

Subsequently, when the process of the initialization (step S130) is complete, in the process of lens information acquisition (step S160), the first camera communication portion 112 transmits the lens information acquisition command to the first adapter communication portion 312. Then, the first camera communication portion 112 receives the response of the lens information from the first adapter communication portion 312, and acquires the information of the interchangeable lens 200. In the process, the first camera communication portion 112 acquires the lens ID of the interchangeable lens 200, which is transmitted from the first lens communication portion 212, from the first adapter communication portion 312 (steps S1160 and S2160).

As described above, the adapter 300 transmits the adapter ID to the interchangeable lens 200, and transmits the camera body ID of the camera body 100. That is, the interchangeable lens 200 acquires not only the adapter ID but also the camera body ID.

Accordingly, the interchangeable lens 200 is able to specify the individual of the camera body 100 which is connected through the adapter 300.

Thereby, the interchangeable lens 200 is able to perform a process corresponding to each individual of the camera bodies 100, on the basis of the camera body IDs. For example, on the basis of the camera body ID, the interchangeable lens 200 is able to perform a process of changing contents of the process between itself and the camera body 100, a process of restricting a function thereof, a process of permission or non-permission of the connection operation, or the like, through the adapter 300. Further, when the interchangeable lens 200 is connected through the adapter 300 to the camera bodies 100 of which the communication standards are different from each other, the interchangeable lens 200 may transmit data which is converted in the data format corresponding to the detected type of the camera body 100 on the basis of the camera body ID. Furthermore, the interchangeable lens 200 may perform a prescribed process on only each individual of the camera bodies 100, which are manufactured in a predetermined time period, on the basis of the acquired camera body IDs (for example, when there is a process problem in the individuals which are manufactured in a predetermined time period, it may perform a process for solving the problem on only the individuals having the trouble).

Further, each of the camera body 100, the interchangeable lens 200, and the adapter 300 acquires each of identification IDs in the lens activation process. Hence, any of the camera body 100, the interchangeable lens 200, and the adapter 300 may perform the process based on each identification ID of the devices connected thereto. Thereby, for example, when the camera body, the interchangeable lens, or the adapter of which the communication standard is different from the existing devices is connected thereto, any of the camera body, the interchangeable lens, and the adapter, of which the communication standards are different from the existing devices thereof, can be configured to perform the processes corresponding to the existing devices.

Further, the interchangeable lens 200 is able to perform the process on the basis of combination between the acquired camera body ID and adapter ID. Likewise, the camera control section 100 is able to perform the process on the basis of combination between the acquired adapter ID and lens ID. Further, likewise, the adapter 300 is able to perform the process on the basis of combination between the acquired camera body ID and lens ID.

Accordingly, even in the case of the interchangeable lens 200 and the camera body 100 with mutually different communication standards, by connecting them through the adapter 300, it is possible to cause them to appropriately function.

Data Processing of Command Data Communication

Next, a description will be given of data processing which is performed by the first adapter communication portion 312 in order to obtain consistency between formats of the communication commands and the communication data in the command data communication in which the communication process is performed by using the first data communication system D1$b$ and the first data communication system D1L with mutually different communication standards.

Configuration of First Adapter Communication Portion 312

Figure 18:
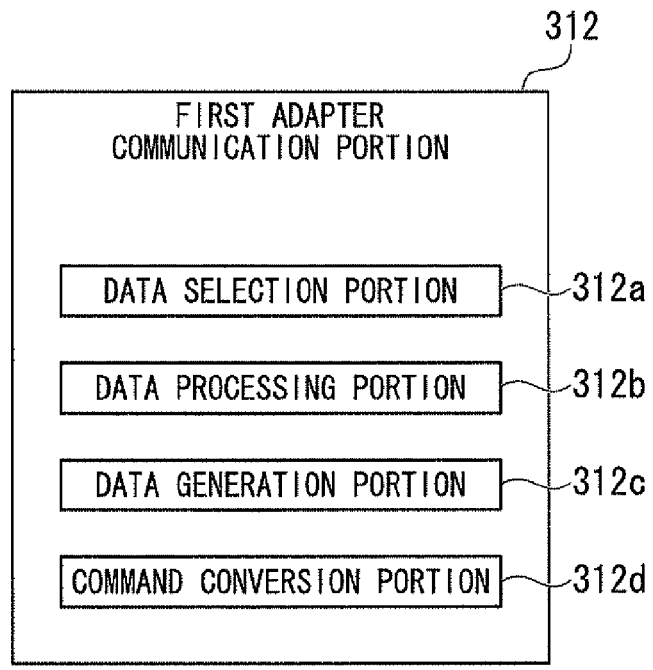
FIG. 18 is a schematic block diagram illustrating an example of a configuration of a first adapter communication portion.

FIG. 18 is a schematic block diagram illustrating an example of a configuration of the first adapter communication portion 312.

The first adapter communication portion 312 includes a data selection portion 312$a$, a data processing portion 312$b$, a data generation portion 312$c$, and a command conversion portion 312$d$.

The data selection portion 312$a$ selects prescribed communication data corresponding to the process from the communication data (which includes the lens information) which is received in the first data communication system D1$b$ or the first data communication system D1L, and supplies the information, which indicates the selected communication data, to the data processing portion 312$b$. For example, the data selection portion 312$a$ selects the lens information as a processing target, on the basis of the type of the lens information, from the lens information (first lens information), which is acquired from the interchangeable lens 200, included in the communication data, and supplies the selected lens information to the data processing portion 312$b$.

Here, a method of identifying the types of the lens information according to the present embodiment will be described.

When acquiring the lens information of the interchangeable lens 200, first, the camera body 100 outputs the lens information request command to request the lens information from the camera control section 110 to the adapter 300 (first adapter communication portion 312) by using the first data communication system D1$b$.

In the lens information request command, there is a plurality of types of request commands (hereinafter referred to as "first communication standard commands") based on the communication standard of the first data communication system D1$b$. In addition, the contents (a plurality of types of lens information sets) of the lens information desired for each request command are determined in advance in the communication standard of the first data communication system D1$b$. For example, the request command A is a command to request a set of three type lens informations of "the position of the aperture diaphragm, the position of the vibration-proof lens, and the aberration information A". In addition, the request command B is a command to request a set of three type lens informations of "the full-aperture F value, the aberration information B, and the ambient-light-amount (dimming) information".

On the other hand, also in the communication standard of the first data communication system D1L, there is a plurality of types of request commands (hereinafter referred to as "second communication standard commands") as a command to request the lens information from the interchangeable lens 200. In addition, the contents (sets) of the lens information desired for each request command are also determined in advance in the communication standard of the first data communication system D1L.

The adapter 300 (first adapter communication portion 312) stores, in advance, the lens information request commands (first communication standard commands) (and which also include data desired therefor), which are used in the first data communication system D1$b$, in the nonvolatile memory in the adapter control section 310, and also stores, in advance, the request commands (second communication standard commands) (and which also include data desired therefor), which are used in the first data communication system D1L, in the nonvolatile memory. That is, the adapter 300 is able to detect the type of the lens information, which is requested by the camera body 100, on the basis of the stored contents of the nonvolatile memory mentioned above and the request command (first communication standard command) received from the camera body 100.

In addition, the adapter 300 selects the second communication standard command, which is most appropriate for the command (the desired data set is similar thereto), in response to the first communication standard command received from the camera body 100, and transmits the selected request command to the interchangeable lens 200. Further, at this time, the adapter 300 is able to detect the type of the lens information, which should be received from the interchangeable lens 200, on the basis of the stored contents of the nonvolatile memory mentioned above and the request command (second communication standard command) transmitted to the interchangeable lens 200.

The adapter 300 transmits the request command (second communication standard command) to the interchangeable lens 200, and then receives the lens data (lens information set), which includes the plurality of types of the lens information, from the interchangeable lens 200 responding to the request command. The array of the lens data, which is received from the interchangeable lens 200, is determined in advance in the communication standard. Hence, the adapter 300 is able to detect which lens information is included in which bit of the received lens data, that is, the type of the lens information.

In such a manner, the adapter 300 (first adapter communication portion 312) is able to detect the type of the lens information, which is requested by the camera body 100, on the basis of the first communication standard command received from the camera body 100, and is able to detect the type of the lens information, which should be received from the interchangeable lens 200, on the basis of the second communication standard command transmitted to the interchangeable lens 200. Further, the adapter 300 is also able to detect the type of the received lens information from the lens data received from the interchangeable lens 200. Hence, the adapter 300 is able to detect whether or not the lens information received from the interchangeable lens 200 includes the requested lens information of the camera body 100, on the basis of the request command (first communication standard command) received from the camera body 100 and the request command (second communication standard command) transmitted to the interchangeable lens 200. Further, the adapter 300 is able to determine whether or not the lens information received from the interchangeable lens 200 includes the lens information which is not requested by the camera body 100.

In addition, in the adapter 300 (first adapter communication portion 312), a criterion (guide) for determination as to whether it is preferable to transmit the lens information received from the interchangeable lens 200 to the camera body 100 as it is, whether to perform the transmission by performing the conversion process thereon, whether to transmit the data stored in the adapter 300 in advance as the lens information, or the like is programmed in advance in the adapter control section 310. The determination process and detailed operation thereof will be described later.

The data selection portion 312a may select the lens information as a processing target on the basis of the type of the lens (this will be described later).

The data processing portion 312b performs data processing on the communication data which is selected by the data selection portion 312a. Here, examples of the data provision process executed in the data processing portion 312b include: a process of converting data by using a prescribed conversion expression and providing the data (the conversion process does not include a conversion process of the conversion coefficient 1, that is, a case of transferring a value as it is without changing the value); a process of converting the data into the prescribed data (a prescribed fixed value, or a prescribed value which indicates that the data is invalid) and providing the data; a process of newly generating the prescribed data; and the like.

For example, the data processing portion 312b executes a process associated with each type on the lens information which is selected by the data selection portion 312a on the basis of the type (class) of the lens information.

Further, the data processing portion 312b selects and generates the corresponding lens information from the lens information which is selected by the data selection portion 312a on the basis of the lens information (type).

The data processing portion 312b may execute the process associated with the lens information (type) on the lens information which is selected on the basis of the type of the interchangeable lens 200 (this will be described later).

In addition, the data processing portion 312b supplies the communication data, on which the data processing is executed, to the data generation portion 312c.

The data generation portion 312c generates the communication data, which is transmitted in the first data communication system D1b or the first data communication system D1L, on the basis of the communication data on which the data processing is performed by the data processing portion 312b. Further, the data generation portion 312c generates the communication data based on the format of the data transmitted in the first data communication system D1b or first data communication system D1L.

The command conversion portion 312d converts the communication command, which is received in the first data communication system D1b or the first data communication system D1L, into a communication command corresponding to the communication standard of the communication system (the first data communication system D1b or the first data communication system D1L) which performs the transmission. For example, the communication command, which is received from the camera body 100 in the first data communication system D1b, is converted into the communication command which is transmitted in the first data communication system D1L and corresponds to the communication standard of the interchangeable lens 200.

Data Processing of Communication Data (Lens Information)

Next, in the first adapter communication portion 312, the data processing (data conversion process) on the lens information will be described as an example of the data processing (data conversion process) for obtaining consistency between formats of the communication datas exchanged between the first data communication system D1b and the first data communication system D1L.

First, a description will be given of a brief overview of the data processing on the lens information (the data conversion process of converting the lens information, which is received from the interchangeable lens 200, or the lens information, which does not reside in the interchangeable lens 200, into transmission data for being transmitted to the camera body 100).

The first adapter communication portion 312 of the adapter control section 310 generates the information of the interchangeable lens 200 to be transmitted to the first camera communication portion 112 of the camera body 100, on the basis of the type of the information of the interchangeable lens 200. For example, the first adapter communication portion 312 generates (provides) the second lens information (body transmission lens information), which is the information of the interchangeable lens 200 to be transmitted to the first camera communication portion 112, by mutually different methods according to types of the lens information, on the basis of the lens information requested from the camera body 100 (in other words, the lens information which is requested from the camera body 100 as the lens information to be transmitted to the camera body 100 by the adapter 300), and the first lens information (reception lens information) as the information of the interchangeable lens 200 acquired from the interchangeable lens 200.

Here, examples of the information (first lens information) of the interchangeable lens 200 include: information that indicates optical characteristics of the interchangeable lens 200 (such as information indicating the exit pupil position, information indicating the full-aperture F value, information indicating the lateral chromatic aberration, information indicating the spectral transmittance, information indicating the ambient light amount (dimming), and information of the focal length); information that indicates functions (information of the vibration-proof function, and information of presence or absence of the operation switch and the like); information for control (such as information of correction parameters for correcting the amount of image plane shift, information indicating the relationship between the amount of coupling rotation and the amount of image plane shift, information of various correction values, and information of various driving limit values); and the like.

The information (first lens information) of the interchangeable lens 200 is roughly classified as follows.

Hereinafter, each classified type will be described.

First, as "the information of classification 1", there are informations (hereinafter referred to as "same definition information") which are used in both of the camera body 100 and the interchangeable lens 200 and of which the data definitions (the structures of the data configurations, and the formats thereof) are the same. Examples of the information of classification 1 include the above-mentioned exit pupil position information.

Next, as "the information of classification 2", there are informations (hereinafter referred to as "principal conversion information") which are used in both of the camera body 100 and the interchangeable lens 200 but of which the data definitions (mentioned above) are different from one another. Examples of the information of classification 2 include the above-mentioned full-aperture F value information and parameters for correcting the amount of image plane shift.

Next, as "the information of classification 3", there are informations (hereinafter referred to as "interchangeable-lens-non-use information") which are used in the camera body 100 but unused in the interchangeable lens 200 (not provided) and are used in the camera body 100 to combine it with the interchangeable lens 200. Examples of the information of classification 3 include the above-mentioned lateral chromatic aberration information and spectral transmittance information.

Next, as "the information of classification 4", there are informations (hereinafter referred to as "invalid information") which are used in the camera body 100 but unused in the interchangeable lens 200 (not provided) and are unused in the camera body 100 to combine it with the interchangeable lens 200.

Examples of the information of classification 4 include the above-mentioned ambient-light-amount (dimming) information.

Finally, as "the information of classification 5", there are informations (hereinafter referred to as "body-non-use information") which are used in the interchangeable lens 200 but unused in the camera body 100. Examples of the information of classification 5 include the above-mentioned information indicating the relationship between the amount of coupling rotation and the amount of image plane shift. Here, the coupling is a driving force transfer mechanism used in the type of interchangeable lens which has a coupling capable of coupling with the coupling provided in the camera body 100 and of which the focusing lens is driven by the rotation of the corresponding coupling. In addition, the information, which indicates the relationship between the amount of coupling rotation and the amount of image plane shift, is information which indicates how much amount the subject image is moved in the optical axis direction on the image forming surface of the imaging device by a single rotation of the coupling.

The order is determined in advance as to whether the lens informations (first lens information) divided into five classifications are respectively informations to be transmitted to the camera body 100 for each information (type), and which data the informations are converted into if the informations are the informations to be transmitted to the camera body 100 (specifically, the order is determined in advance for each information (type), and the order is stored in the nonvolatile memory in the adapter control section 310 as described above). The adapter control section 310 determines, in the prescribed order, presence or absence of the transmission to the camera body 100 and the method of converting the data to be transmitted, and executes the transmission process.

For example, each first lens information is set such that whether or not to transmit the information to the camera body 100 is associated with each information (class, type). Regarding the criterion for the determination, if the information is the information (type) requested from the camera body 100, it is determined that the information is information to be transmitted, and otherwise, it is determined that the information is information unnecessary to be transmitted. In addition, the first adapter communication portion 312 generates the second lens information (body transmission lens information) on the basis of the information (informations corresponding to the classifications 1 to 4), which is set to be transmitted to the camera body 100, in the first lens information.

Further, the first adapter communication portion 312 generates the second lens information (body transmission lens information) by performing the conversion process associated with the lens information (class) on the first lens information.

For example, when the first lens information is generated as the second lens information, in the information, whether or not to perform the conversion process (the order) is set to be associated with the lens information (type). In addition, the first adapter communication portion 312 generates the second lens information by performing the conversion process on the information which is set such that "the conversion process is performed" in the first lens information. Further, the first adapter communication portion 312 generates information, which is not subjected to the conversion process and is the first lens information as it is, as the second lens information, from the first lens informations, which are set such that "the conversion process is not performed (in other words, the conversion process of the conversion coefficient 1 is performed)", among the first lens informations. The determination criterion and the conversion process will be described later.

Further, the first adapter communication portion 312 generates information, which is provided in advance as the information to be transmitted instead of the corresponding information that cannot be acquired, as the second lens information (body transmission lens information) from the informations, which can not be acquired from the interchangeable lens 200, among the second lens informations.

Next, referring to FIGS. 19 and 20, details of the data processing on the lens information will be described.

Figure 19:
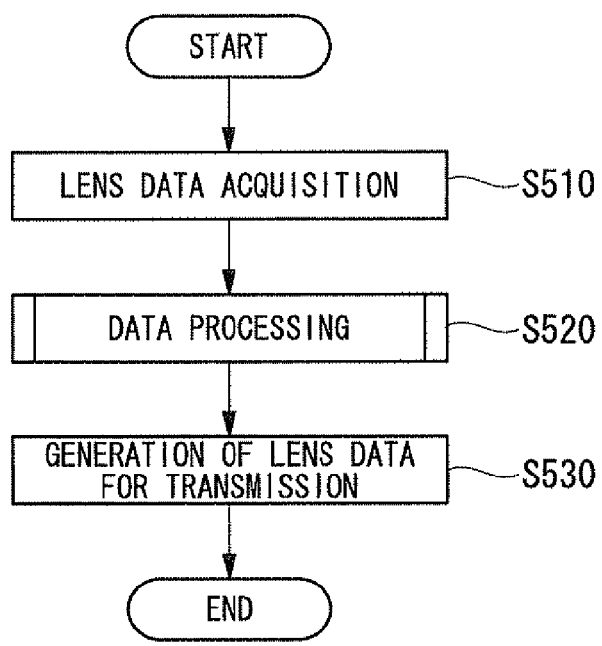
FIG. 19 is a flowchart illustrating an example of data processing performed on the acquired lens information.

FIG. 19 is a flowchart illustrating an example of the data processing performed on the acquired lens information.

First, the first adapter communication portion 312 acquires the first lens information from the first lens communication portion 212 of the interchangeable lens 200 (step S510).

For example, the data selection portion 312a selects the lens data as a processing target on the basis of the type of the first lens information from the lens data which is the first lens information acquired from the interchangeable lens 200, and supplies the selected lens data to the data processing portion 312b.

Next, the data processing portion 312b performs the data processing on the lens data which is selected by the data selection portion 312a (step S520).

Subsequently, the data generation portion 312c generates the lens data, which is transmitted to the first camera communication portion 112 of the camera body 100, from the lens data on which the data processing is executed by the data processing portion 312b (step S530). For example, the data generation portion 312c sets the lens data, on which the data processing is executed by the data processing portion 312b, as a data array according to the format of the lens data transmitted to the first camera communication portion 112, thereby generating the lens data (body transmission lens information) for transmission.

Figure 20:
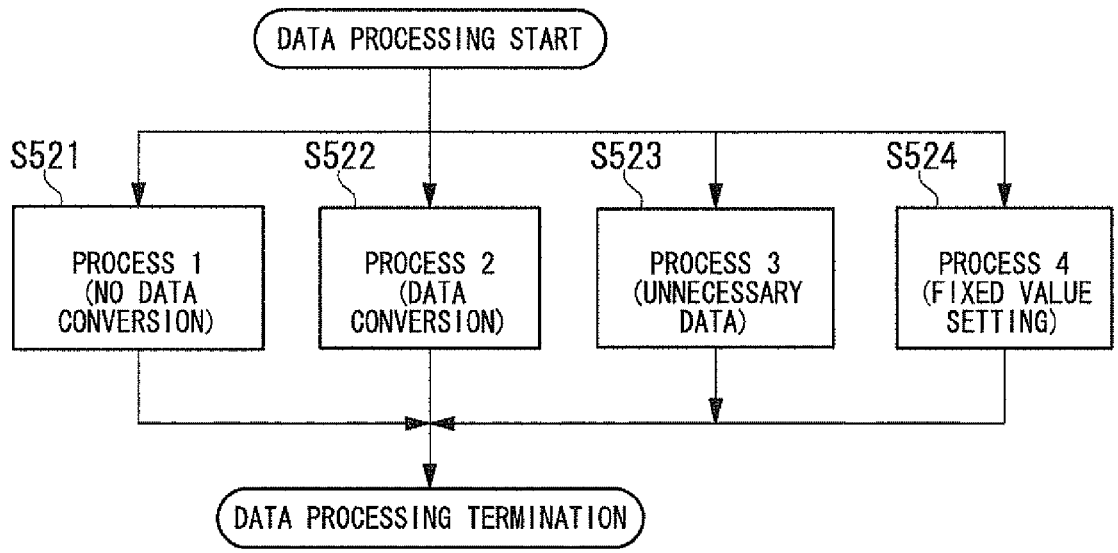
FIG. 20 is a flowchart illustrating a specific example of the data processing.

FIG. 20 is a flowchart illustrating a specific example of the data processing in step S520 of FIG. 19.

The data processing in step S520 has the process 1 (step S521), the process 2 (step S522), the process 3 (step S523), and the process 4 (step S524). The order (information of the criterion for determination), which indicates which process of the processes 1 to 4 is performed, is stored in advance in the nonvolatile memory in the adapter control section 310 for each lens information (type). The adapter control section 310 performs the later-described processes which are set in advance for each lens information (type) on the basis of the stored order (information).

The data selection portion 312a selects the lens information as a target of each process (process 1, 2, 3, or 4) mentioned above, on the basis of each lens information (type), from the lens data which is the first lens information acquired from the interchangeable lens 200. Next, the data selection portion 312a supplies each selected lens information to the data processing portion 312b. The data processing portion 312b executes the processes, which are set to be associated with the respective lens informations (types), on the respective lens informations which are selected by the data selection portion 312a.

The process 1 of step S521 is a process of not performing the conversion process and the like on the acquired lens data and leaving the acquired lens data as it is (in other words, a process of performing conversion of "conversion coefficient=1").

For example, the lens information processed in the process 1 is lens information, which is set in advance as the lens information unnecessary to be subjected to the data conversion, as the first lens information acquired from the interchangeable lens 200 and the second lens information transmitted to the camera body 100 have the same data formats.

The data processing portion 312b terminates the data processing on the lens information, which is associated as lens information unnecessary to be converted, as untouched data in the process 1. Examples of the lens information include lens information described as the above-mentioned classification 1. That is, the exit pupil position information which is defined in advance as the lens information unnecessary to be subjected to the conversion process in the adapter control section 310.

That is, when the lens information is information which is used in both of the camera body 100 and the interchangeable lens 200 and the data definitions thereof are the same between both of them, the adapter control section 310 provides the second lens information (body transmission lens information) by using the received first lens information as it is.

The process 2 of step S522 is a process of performing the prescribed process associated with the lens information (type) on the acquired lens data.

For example, the lens data processed in the process 2 is lens information, which is recognized as the lens data necessary to be subjected to the data conversion in advance by the adapter control section 310 (the intent thereof is stored in the nonvolatile memory), as the respective data formats of the first lens information acquired from the interchangeable lens 200 and the second lens information transmitted to the camera body 100 are different from each other. Examples of the lens information include lens information described as the above-mentioned classification 2. That is, the full-aperture F value information and the parameters for correcting the amount of image plane shift are defined in advance as lens informations necessary to be subjected to the data conversion process in the adapter control section 310.

In addition, the data conversion process in the process 2 is a process set to be associated with each lens information (class), and is also a process of converting the lens data of the first lens information into the lens data according to the data format of the second lens information. For example, the data conversion process in the process 2 is a process of converting the data format with one byte into a data format with two bytes, a process of performing conversion by executing the conversion calculation, which is represented by the conversion expression (function expression), on the data, or the like.

The data processing portion 312b terminates the data processing by executing the prescribed process 2 on the lens information which is defined as the lens information (type) necessary to be converted in the process 2.

That is, when the lens information is information which is used in both of the camera body 100 and the interchangeable lens 200 and the data definitions thereof are different between both of them, the adapter control section 310 performs the prescribed conversion process on the received first lens information, thereby providing the second lens information (body transmission lens information).

The process 3 of step S523 is a process of not transmitting the acquired lens data to the camera body 100.

As for the lens information on which the process 3 is executed, for example, the lens information acquired from the interchangeable lens 200 is not defined as the information necessary for the camera body 100 side (in other words, the information is set as a request target of the request command of the camera body 100 side, and the lens information is not included therein), and the acquired lens data is lens data unnecessary as the second lens information in the camera body 100.

The data processing portion 312b terminates the data processing, in the process 3, by executing a process of setting the lens information (type), which is defined as unnecessary lens data in the adapter control section 310, as unnecessary lens data as the second lens information (a process of making the lens data unused when generating the lens data for transmission in the data generation portion 312c). Examples of such lens data (first lens information) include the lens information described as the above-mentioned classification 5. Consequently, the information, which indicates the relationship between the amount of coupling rotation and the amount of image plane shift, is defined in advance as the lens information unnecessary to be transmitted to the camera body 100 in the adapter control section 310 (since the information is not requested from the camera body 100).

That is, when the lens information is information unused in the camera body 100, the adapter control section 310 does not provide the information corresponding to the lens information as the second lens information (body transmission lens information).

The process 4 of step S524 is a process of associating the informations (fixed value data), which are provided in advance in the adapter control section 310, with the lens datas, which cannot be acquired from the interchangeable lens 200, among the lens datas of the second lens information transmitted to the camera body 100. In other words, the process 4 is a process of applying prescribed fixed value data as the second lens information. The process 4 is further divided into processes of two methods in accordance with the data types. First, the first process will be described.

For example, the lens data processed in the process 4 is lens data of which the second lens information to be transmitted to the camera body 100 is not included in the first lens information acquired from the interchangeable lens 200.

For example, the camera body 100 has a function of performing a process of correcting defects in the image caused by the optical system in the interchangeable lens 200 through the image processing. Thus, the second lens information to be acquired includes the lens data for correcting the optical system used in the image processing. In contrast, the interchangeable lens 200 has no lens data for correcting the optical system. That is, the lens data for correcting the optical system is included in the second lens information (in other words, the lens information requested by the camera body 100) transmitted to the camera body 100 by the adapter 300, but the lens data is not included in the lens information (in other words, the lens information requested from the adapter 300 to the interchangeable lens 200) acquired from the interchangeable lens 200. In such a case, the data processing portion 312b performs a process of setting, for example, prescribed data for optical correction (prescribed data used for control in the camera body 100), which is provided in advance in the adapter 300 (stored in the nonvolatile memory of the adapter control section 310), as substitute data for response to the camera body 100, in the data conversion process of the process 4. The prescribed data for optical correction is common correction data by which the same value is transmitted to the camera body 100 side even when any type of the interchangeable lens is mounted thereon. Further, as for the prescribed data for optical correction, for example, data, which assists the camera body 100 to achieve a prescribed correction effect, may be set as the prescribed data for optical correction, or data, which is for making the correction effect become zero, may be set as the prescribed correction data.

As described above, examples of the lens information, which the prescribed correction data is subjected to the setting process as the process 4 in substitution for, include the lens information described as above-mentioned classification 3. That is, the lateral chromatic aberration information and the spectral transmittance information are defined in advance in the adapter control section 310 such that the prescribed data, which is stored in advance in the adapter 300, is lens information transmitted to the camera body 100 as data corresponding to the data.

That is, when the lens information is information unused in the interchangeable lens 200 and is also information used in the camera body 100 to combine it with the interchangeable lens 200, the adapter control section 310 provides prescribed control data, which is stored in the adapter control section 310 in advance, as the second lens information (body transmission lens information).

Next, the second process of the process 4 will be described. The data processing portion 312b performs a process of setting data, which is determined as invalid data in the camera body 100, as a setting process based on the lens information (type) in the data conversion process of the process 4. In the process 4 of the adapter control section 310, when the data indicating "invalid" is set as the fixed value data and the data is transmitted to the camera body 100 side, the camera body 100 side receiving the data performs the subsequent processes of the camera body 100 side since there is no data from the beginning. As described above, examples of the lens information, which is subjected to the process of setting the information defining "invalid" as the fixed value data as the process 4, include the lens information described as above-mentioned classification 4. That is, the ambient-light-amount (dimming) information is defined in the adapter control section 310 in advance such that the "fixed value data", which is stored in the adapter 300 in advance and indicates invalid, is lens information transmitted to the camera body 100 as data corresponding to the information. As described above, the data processing portion 312b terminates the data processing by executing the process of setting the corresponding fixed value data on the lens information (type) which cannot be acquired from the interchangeable lens 200 in the process 4.

That is, when the lens information is information unused in the interchangeable lens 200 and is also information unused in the camera body 100 to combine it with the interchangeable lens 200, the adapter control section 310 provides prescribed data, which indicates that the lens information is invalid, as the second lens information (body transmission lens information).

As described hitherto, the first adapter communication portion 312 generates the lens information (body transmission lens information) to be transmitted to the camera body 100 by performing processes respectively appropriate for the lens informations (types) on the basis of the lens information (first lens information) acquired from the interchangeable lens 200. For example, the first adapter communication portion 312 generates the lens information (body transmission lens information, second lens information) to be transmitted to the camera body 100 by performing, on the basis of the lens information (type) acquired from the interchangeable lens 200, any one of the process using information which is the acquired information as it is; the process of converting the acquired information; the process of setting the acquired information as information not to be transmitted; and a process of setting the fixed value data to the information, which cannot be acquired, so as to thereby generate information.

Thereby, the adapter 300 relays the communication between the interchangeable lens 200 and the camera body 100 with mutually different communication standards, and is thereby able to appropriately convert the information of the interchangeable lens 200 into the information to be transmitted to the camera body 100, on the basis of the above-mentioned lens information (type). That is, the adapter 300 is able to appropriately generate the lens information of the interchangeable lens 200 to be transmitted to the camera body 100, on the basis of the information (type) of the interchangeable lens 200 connected thereto. Accordingly, even in the interchangeable lens 200 and the camera body 100 with mutually different communication standards, it is possible to cause them to appropriately function by interconnecting them through the adapter 300.

The first adapter communication portion 312 may generate the second lens information (body transmission lens information) in accordance with the type of the interchangeable lens. That is, the first adapter communication portion 312 may generate the second lens information (body transmission lens information) through methods different from each other according to the type of the interchangeable lens.

For example, the first adapter communication portion 312 may select, in accordance with the type of the interchangeable lens, whether to generate (provide) the second lens information (body transmission lens information) by performing the prescribed conversion process on the received first lens information, or to generate (provide), as the second lens information, the prescribed control data (for example, information (fixed value data) which is set in association with the lens information (type)) stored in the adapter control section in advance.

Here, examples of the types of the interchangeable lenses include a CPU lens, non-CPU lens, and the like.

That is, the first adapter communication portion 312 may generate the second lens information on the basis of whether the CPU lens is connected to the adapter 300 or the non-CPU lens is connected thereto. For example, in a state where the non-CPU lens is connected thereto, the first adapter communication portion 312 is unable to acquire some informations among the first lens informations which can be acquired in a state where the CPU lens is connected. Hence, the first adapter communication portion 312 may select, on the basis of whether the CPU lens is connected thereto or the non-CPU lens is connected thereto, whether to generate the second lens information by performing the conversion process on the first lens information, or to generate the second lens information (body transmission lens information) by using the information (fixed value data) which is set in association with the lens information (type).

Here, the first adapter communication portion 312 determines whether the lens is a CPU lens or a non-CPU lens, on the basis of whether there is a response from the interchangeable lens 200, as a voltage is fed to the interchangeable lens 200. The first adapter communication portion 312 may determine whether the lens is a CPU lens or a non-CPU lens, on the basis of whether or not the first lens information is acquired from the interchangeable lens 200.

Further, the first adapter communication portion 312 may select, on the basis of whether the lens is a lens equipped with the vibration-proof mechanism or the electromagnetic-diaphragm-type lens, whether to generate the second lens information by performing the conversion process on the first lens information, or to generate the second lens information by using the information (fixed value data) which is set in association with the lens information (type).

In addition, the first adapter communication portion 312 determines whether or not the lens is a lens equipped with the vibration-proof mechanism, or whether or not the lens is an electromagnetic-diaphragm-type lens, on the basis of the first lens information acquired in the process of exchanging information between the adapter 300 and the interchangeable lens 200 in step S160 shown in FIG. 12.

Thereby, the adapter 300 is able to appropriately generate the lens information of the interchangeable lens 200 to be transmitted to the camera body 100, in accordance with the type of the interchangeable lens 200 mounted thereon. Further, by interconnecting the interchangeable lens (for example, the interchangeable lens 200A, 200B, 200C, or the like) and the camera body 100 with mutually different communication standards through the adapter 300, it is possible to cause various types of the optical systems 220 to appropriately function.

Process of Generating Communication Data (Lens Name Data)

Next, a description will be given of a process of generating lens name data in the adapter 300 when the interchangeable lens 200 has no information indicating the "lens name".

The first adapter communication portion 312 is able to generate information, which indicates the "name" of the interchangeable lens 200 mounted on the adapter 300, on the basis of the acquired information (first lens information) of the interchangeable lens 200. For example, the first adapter communication portion 312 generates the information, which indicates the "name" of the interchangeable lens 200 mounted on the adapter 300, on the basis of the information (specification information) which indicates of the characteristics of the interchangeable lens 200 included in the first lens information acquired from the interchangeable lens 200.

For example, the nonvolatile memory in the adapter 300 stores, in advance, the information as association information (hereinafter referred to as "first association information (first table information)") in which the name of the existing interchangeable lens is associated with the specification information (optical characteristic information and function information) indicating the characteristics of the interchangeable lens. Then, on the basis of the first table information and the specification information (the characteristic information such as the optical characteristic information and the function information) of the optical system 220 acquired from the interchangeable lens 200 actually mounted on the adapter 300, the first adapter communication portion 312 selects (estimates) the name of the lens, which has specification information closest to the actually acquired specification information, from the first table information as the name of the interchangeable lens 200 mounted on the adapter 300. Thereby, the first adapter communication portion 312 generates information, which indicates the "name" of the interchangeable lens 200, on the basis of the information which indicates the name of the lens selected from the first table information. This generation method will be described in detail below with reference to FIGS. 21 and 22.

Figure 21:
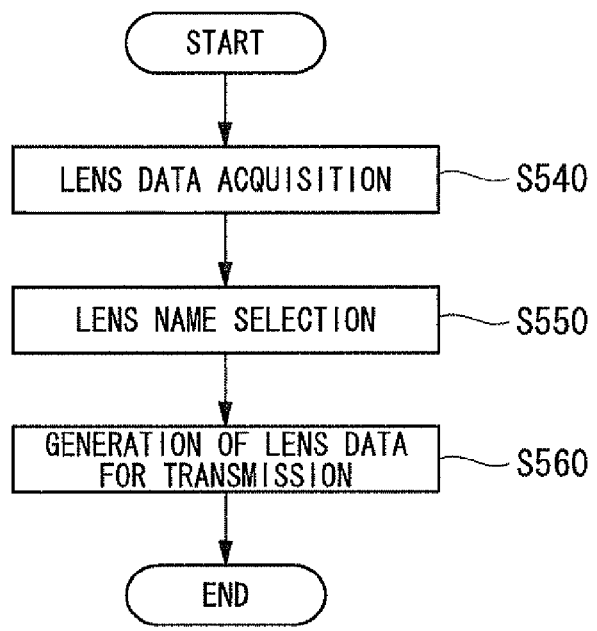
FIG. 21 is a flowchart illustrating an example of a process of generating lens name data.

FIG. 21 is a flowchart illustrating an example of the process of generating the lens name data.

First, the first adapter communication portion 312 acquires the information of the interchangeable lens 200 from the first lens communication portion 212 of the interchangeable lens 200 (step S540). In the current step S540, while the information of the interchangeable lens 200 is acquired, the information, which is used in generating the lens name data, among the acquired lens informations is also selected.

For example, the data selection portion 312a (FIG. 18) selects, on the basis of a prescribed selection criterion, the type (class) of the information which is necessary to select and generate the information indicating the name of the interchangeable lens 200 from the informations of the interchangeable lens 200 acquired from the interchangeable lens 200. The predetermined selection criterion is determined in the adapter control section 310 in advance. In the present embodiment, information on the principal "specification" (the optical characteristic information and the function information) of the interchangeable lens 200 mounted on the adapter 300 is selected. Examples of the "specification" include, as described later in FIG. 22, specification informations such as the focal length of the interchangeable lens 200, the full-aperture F value, presence or absence of the diaphragm operation ring, presence or absence of the absolute distance encoder, and presence or absence of the vibration-proof function (vibration-proof lens). Then, in step S540, the data selection portion 312a supplies the lens data of the information of the selected type to the data processing portion 312b (FIG. 18).

Next, the data processing portion 312b performs, on the basis of the lens data selected by the data selection portion 312a, the process of selecting the lens name data as the information which indicates the name of the interchangeable lens 200 (step S550). Here, as described later in FIG. 22, the information (the above-mentioned first table information), which is stored in the nonvolatile memory of the adapter control section 310 and indicates the relationship between the given lens names and the specification informations, is set as a comparison target, and the respective lens Batas (the specification information) acquired in step S540 are compared therewith. Then, in FIG. 22, the lens name, which has lens data having a smallest difference with (closest to) each acquired lens data, is selected as the lens name of the interchangeable lens 200 mounted on the adapter 300.

Subsequently, the data generation portion 312c generates the data of the lens name which is selected by the data processing portion 312b in step S550, and adds the generated lens name data as a part of the lens data of the interchangeable lens 200 mounted on the adapter 300, thereby generating the lens data to be transmitted to the first camera communication portion 112 of the camera body 100 (step S560).

As described above, the acquired information, which indicates the characteristics of the interchangeable lens 200, includes the information which indicates the type of the optical system 220 provided in the interchangeable lens 200. In addition, the information, which indicates the type of the optical system 220, includes either one of the information, which indicates the above-mentioned optical characteristics of the optical system 220, and the information which indicates the functions of the optical system 220 (any one of the informations which indicate the specification, the functions, the optical characteristics, and the like of the optical system 220).

Further, in the above-mentioned "first association (table) information", a combination of a plurality of informations indicating the types of the optical systems 220 and the information, which indicates the names of the interchangeable lenses 200 corresponding thereto are associated with each other as given information.

Figure 22:
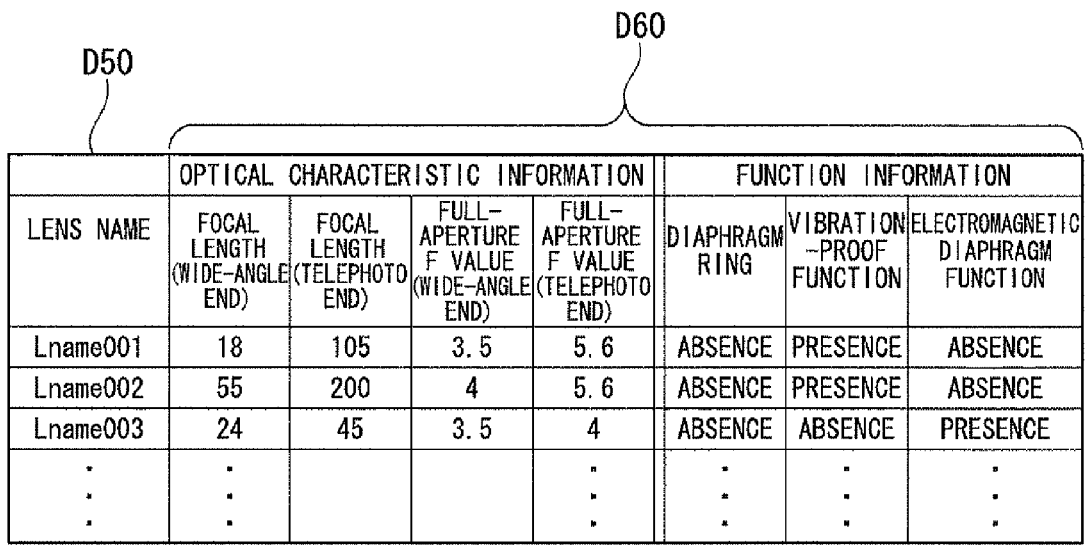
FIG. 22 is a diagram illustrating an example of first association information.

FIG. 22 is a diagram illustrating an example of the first association information.

FIG. 22 shows a state the combination (set) of a plurality of informations (characteristic informations) D60, which indicates the type (specification) of the optical system of the existing interchangeable lens (for example, the optical system 220 of the existing interchangeable lens 200), and the information D50, which indicates the given name of the existing interchangeable lens (for example, the existing interchangeable lens 200), are formed as a table for each of a plurality of interchangeable lenses (a plurality of lens names).

In FIG. 22, each information D60, which indicates the type of the optical system 220, includes: the information on the focal length and the full-aperture F value as information indicating the optical characteristics of the optical system 220; and information on presence or absence of the diaphragm operation ring, presence or absence of the vibration-proof function, and presence or absence of electromagnetic diaphragm function as the information indicating the functions of the optical system 220. That is, in the first association information shown in FIG. 22, the combination of the respective informations of the information D60, which indicates the type of the optical system 220, is associated with the information D50 which indicates the name of the interchangeable lens that should have the combination (in other words, the name of the interchangeable lens 200 to be estimated on the basis of the combination).

For example, the data processing portion 312b selects the information which indicates the name of the interchangeable lens 200 as described above, on the basis of the first association information (FIG. 22) and the lens data selected (the step S540) by the data selection portion 312a.

As described above, even when the connected interchangeable lens 200 does not have the information indicating the lens name, the adapter 300 is able to generate the information (lens name data) indicating the lens name, on the basis of the information of the optical system 220 acquired from the interchangeable lens 200.

The information which indicates the optical characteristics of the optical system 220 shown in the drawing, and the information which indicates the functions of the optical system 220 are just examples. Thus, the invention is not limited to this, and other information may be used.

In addition, it is conceivable to use table information different from the above-mentioned first table information. For example, the information, which indicates the characteristics of the interchangeable lens 200 acquired by the adapter 300, includes the lens ID for identifying the individual of the interchangeable lens 200. It can be said that the lens ID is one of the informations (characteristic informations) indicating the characteristics of the interchangeable lens 200. Hence, the nonvolatile memory in the adapter control section 310 stores the given lens ID and the given association information (hereinafter referred to as "second association information (second table information)") which indicates the association with the given name of the interchangeable lens 200 corresponding to the lens ID. Then, the first adapter communication portion 312 is able to select and generate the information, which indicates the name of the interchangeable lens 200, on the basis of the second table information and the lens information acquired from the interchangeable lens 200 mounted on the adapter 300 (in the same manner as the case of using the first table information).

Figure 23:
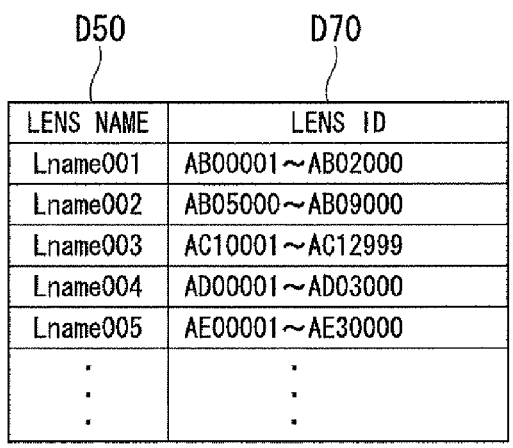
FIG. 23 is a diagram illustrating an example of second association information.

FIG. 23 is a diagram illustrating an example of second association information.

In FIG. 23, the information D70 of the given lens IDs is associated with the information D50 which indicates the names of the interchangeable lenses 200 corresponding to the lens IDs.

The data selection portion 312a selects the data on the lens IDs among the lens datas, which are acquired from the interchangeable lens 200, as comparison target data which is the second association information (FIG. 23). Then, the data processing portion 312b selects the name of the interchangeable lens 200, which includes the lens ID acquired from the interchangeable lens 200, on the basis of the data, which indicates the lens ID selected by the data selection portion 312a, and the second association information (FIG. 23) which is stored in the adapter control section 310 in advance. The subsequent process (the process of step S560 in FIG. 21) is as described above.

As described above, even when the connected interchangeable lens 200 does not have the information indicating the lens name, the adapter 300 is able to generate the information (lens name data) indicating the lens name, on the basis of the lens ID acquired from the interchangeable lens 200.

Further, the first adapter communication portion 312 acquires the information of the interchangeable lens 200, in the time period of the process of initializing the state of the interchangeable lens 200 in response to the control command from the camera body 100. Further, the first adapter communication portion 312 generates the information, which indicates the name of the interchangeable lens 200, on the basis of the acquired information of the interchangeable lens 200, in the time period of the process of initializing the state of the interchangeable lens 200 in response to the control command from the camera body 100.

For example, the first adapter communication portion 312 acquires the information of the interchangeable lens 200 in the time period of the process of the initialization of step S130 shown in FIG. 12, and generates the information, which indicates the name of the interchangeable lens 200, on the basis of the acquired information of the interchangeable lens 200.

Thereby, the first adapter communication portion 312 is able to generate the information which indicates the name of the interchangeable lens 200 in the initialization process of the lens activation process. That is, the first adapter communication portion 312 is able to generate the information, which indicates the name of the interchangeable lens 200, before the state where an image capturing process can be performed in the camera system 1.

Further, the first adapter communication portion 312 transmits the generated information, which indicates the name of the interchangeable lens 200, to the camera body 100. For example, the first adapter communication portion 312 transmits, in response to the request from the camera body 100, the generated information, which indicates the name of the interchangeable lens 200, to the camera body 100.

Specifically, the first adapter communication portion 312 transmits, in response to the request from the camera body 100, the generated information, which indicates the name of the interchangeable lens 200, to the camera body 100, through the process of acquiring the lens information (step S160 of FIG. 12) in the process sequence of the lens activation process.

Thereby, the camera body 100 is able to acquire the information, which is generated by the adapter 300 and indicates the name of the interchangeable lens 200, in the time period of the lens activation process. That is, the camera body 100 is able to acquire the information, which is generated by the adapter 300 and indicates the name of the interchangeable lens 200, before the state where an image capturing process can be performed in the camera system 1.

In addition, the first adapter communication portion 312 transmits the generated information, which indicates the name of the interchangeable lens 200, as the image capturing information, which is associated with the data of the image captured through the interchangeable lens 200, to the camera body 100.

Here, the image capturing information, which is associated with the image data, is recorded in association with the image data in conformity with the prescribed format. For example, the image capturing information is recorded in association with the image data in conformity with the format prescribed by EXIF (Exchangeable Image File Format).

As described above, even when the connected interchangeable lens 200 does not have the information indicating the lens name, the adapter 300 is able to add the information (lens name data) indicating the lens name, which is generated on the basis of the information of the interchangeable lens 200, to the image capturing information which is associated with the data of the image captured in the camera system 1.

That is, even in the interchangeable lens 200 which has no information indicating the lens name, by connecting the lens to the camera body 100 through the adapter 300, a user is able to know the name of the interchangeable lens 200, which is connected thereto when performing the image capturing process, from the captured image data. Accordingly, even in the interchangeable lens 200 and the camera body 100 with mutually different communication standards, it is possible to cause them to appropriately function by interconnecting them through the adapter 300.

In the embodiment, by using the table data shown in FIGS. 22 and 23, the lens name is estimated and created, but, for example, by directly using at least a part of the above-mentioned specification information (the optical characteristic information and the function information) obtained from the interchangeable lens 200, the lens name may be created. As an example, a description will be given of a case where the interchangeable lens 200 of the lens name "Lname001" shown in FIG. 22 is mounted on the adapter 300 and the lens name "Lnama001" is not clear. In this case, the adapter 300 acquires the optical characteristic information and the function information, shown in FIG. 22, as the specification information of the interchangeable lens 200 from the interchangeable lens 200 mounted on the adapter 300. That is, five-type informations are acquired, where the five-type informations are the focal lengths 18 to 105, the full-aperture F values 3.5 to 5.6, absence of the diaphragm ring ("absence" is set to "0"), presence of the vibration-proof function ("presence" is set to "1"), and absence of the electromagnetic diaphragm function (0). The adapter control section 310 may create data indicating the information of "18-105_3.5-5.6_010" by using the acquired lens informations, and may use the information as the lens name data as it is. Here, the lens name is created by using all the five-type informations, but the lens name may be created by using not all but a part thereof. The lens ID (for example, the single ID "AB0001" shown in FIG. 23) shown in FIG. 23 may be used as the lens name as it is.

Conversion Process of Communication Command (Control Command)

Next, a description will be given of a process of converting a vibration-proof control command as an example of the data processing for obtaining consistency of the communication commands, which are exchanged between the first data communication system D1b and the first data communication system D1L with mutually different communication standards, in the first adapter communication portion 312.

The first adapter communication portion 312 relays the command data communication between the first data communication system D1b and the first data communication system D1L.

For example, the first adapter communication portion 312 acquires the vibration-proof control command to control the VR driving portion 235 (vibration-proof driving section), which drives the VR lens 223 (vibration-proof optical system) provided in the interchangeable lens 200, from the camera body 100 through the communication process of the first data communication system D1b.

Then, the first adapter communication portion 312 converts the acquired vibration-proof control command so as to thereby make it consistent with the communication standard of the first data communication system D1L, and transmits the command to the interchangeable lens 200.

In addition, in the present embodiment, the camera body 100 transmits the "initialization execution command" (first control command) to the adapter 300 when initializing the vibration-proof control (initializing the VR lens 223), and transmits a "vibration-proof termination command" (second control command) as a command different from the initialization execution command when performing a vibration-proof termination process of terminating the control for driving the VR lens 223.

Here, the "initialization execution command" is a command to perform a process of centering the VR lens 223 in the communication standard of the first data communication system D1b. The "vibration-proof termination command" of one side is a command to cause the VR lens 223 to be on standby at a standby position different from the centering position in the communication standard of the first data communication system D1b. As described above, in the communication standard of the first data communication system D1b, contents of the processes for the interchangeable lens 200 are mutually different between the two commands (the "initialization execution command" and the "vibration-proof termination command"). However, in the communication standard of the first data communication system D1L, two commands respectively consistent with the two commands are absent.

In the communication standard of the first data communication system D1L, even in either case of the process of initialization of the vibration-proof control and the vibration-proof termination process, a single (common) centering command (third control command) to execute the process of centering the position of the VR lens 223 is set to be output to the interchangeable lens 200. In addition, the interchangeable lens 200 side executes the process of centering the position of the VR lens 223 and then locking the position in response to the centering command.

Therefore, in order to solve inconsistency of the vibration-proof control command in communication standards between the above-mentioned two communication systems (D1b and D1L), when intending to convert the commands (the initialization execution command and the vibration-proof termination command), which are used in the first data communication system D1b and have different types (control command contents), into commands used in the first data communication system D1L, the adapter 300 is configured to convert the commands into a single common command (centering command). As described above, by interposing the adapter 300 therebetween, it is possible to realize the communication and control between the camera body 100 and the interchangeable lens 200 having different communication systems of which the communication standards are different from each other.

As described above, the first adapter communication portion 312 converts and relays the communication commands, which are communicated by the first data communication system D1b and the first data communication system D1L with mutually different communication standards, in the process of the vibration-proof control.

That is, the first adapter communication portion 312 converts the control commands (hereinafter referred to as a first control command and a second control command) which are received from the camera body 100 and of which the command contents are different from each other, into a single common control command (hereinafter referred to as a third control command) to be transmitted to the interchangeable lens 200. Here, the first adapter communication portion 312 transmits, as the third control command, the control command, which is a control command to control the VR driving portion 235 driving the VR lens 223 provided in the interchangeable lens 200, to the interchangeable lens 200.

For example, the first adapter communication portion 312 receives the "initialization execution command", which is to execute the initialization process including the process of initializing the state of the interchangeable lens 200, as the first control command from the camera body 100. Next, the first adapter communication portion 312 transmits a vibration-proof control initialization (initialization of the VR lens 223) execution command, which includes the "centering command" to center the position of the VR lens 223 (to move it to a prescribed position) in response to the initialization execution command from the camera body 100, as the third control command to the interchangeable lens 200.

That is, in response to receiving the initialization execution command from the camera body 100, the first adapter communication portion 312 converts the command into the vibration-proof control initialization execution command which include the centering command, and transmits the command to the interchangeable lens 200.

Further, the first adapter communication portion 312 receives the "vibration-proof termination command", which is to terminate the control of the VR driving portion 235, as a second control command from the camera body 100. Next, the first adapter communication portion 312 transmits, in response to the vibration-proof termination command from the camera body 100, the "centering command" (the command, into which the "initialization execution command" is converted, and the common command), which is to center the position of the VR lens 223 (to move it to the prescribed position), as the third control command to the interchangeable lens 200.

That is, in response to receiving the vibration-proof termination command from the camera body 100, the first adapter communication portion 312 converts the command into the centering command, and transmits the command to the interchangeable lens 200.

The above-mentioned centering of the position is movement to the prescribed position.

The prescribed position is a position capable of securing a predetermined amplitude in a case of shaking the VR lens 223 in the movable range of the VR lens 223. For example, the prescribed position is a center position in the movable range of the VR lens 223.

As described above, the adapter 300 converts the vibration-proof control command, which is received from the camera body 100, into the vibration-proof control command, which is compatible with the communication standard, to be transmitted to the interchangeable lens 200, and is thereby able to transmit the command.

When the control command received from the camera body 100 is a control command which does not correspond to the control command to be transmitted to the interchangeable lens 200, the first adapter communication portion 312 may perform control not to transmit the control command, which does not correspond thereto, to the interchangeable lens 200.

For example, in the vibration-proof control standby state (the state where the vibration-proof control is temporarily stopped), there are a lens (for example, the interchangeable lens 200) with a configuration in which the VR lens 223 is mechanically stopped, a lens (for example, the interchangeable lens 200A) with a configuration in which the VR lens 223A is electrically driven to be stopped, a lens with a different configuration.

In the case where the camera body 100 and the interchangeable lens 200A are connected to each other, when controlling the VR lens 223A such that it attains vibration-proof control standby state, the first camera communication portion 112 transmits the control command of the vibration-proof control standby, which is for electrically driving and stopping the lens, to the interchangeable lens 200A.

On the other hand, in the case where the interchangeable lens 200 is connected to the camera body 100 through the adapter 300, when controlling the VR lens 223 such that it attains the vibration-proof control standby state, the first camera communication portion 112 transmits the control command of the vibration-proof control standby as common control to the first adapter communication portion 312.

Here, when controlled to be in the vibration-proof control standby state in the interchangeable lens 200, the VR lens 223 is mechanically stopped, and thus the control command of the above-mentioned vibration-proof control standby is not necessary.

Hence, the first adapter communication portion 312 performs control so as not to transmit the acquired control command of the vibration-proof control standby from the first camera communication portion 112 to the interchangeable lens 200.

As described above, the adapter 300 is able to perform control so as not to transmit a command, which is unnecessary to be transmitted to the interchangeable lens 200, among the commands received from the camera body 100. Accordingly, the adapter 300 is able to transmit commands, which do not include the command unnecessary for the interchangeable lens 200, to the interchangeable lens 200.

Next, referring to FIG. 24, the process sequence of the initialization process of the vibration-proof control will be described.

Figure 24:
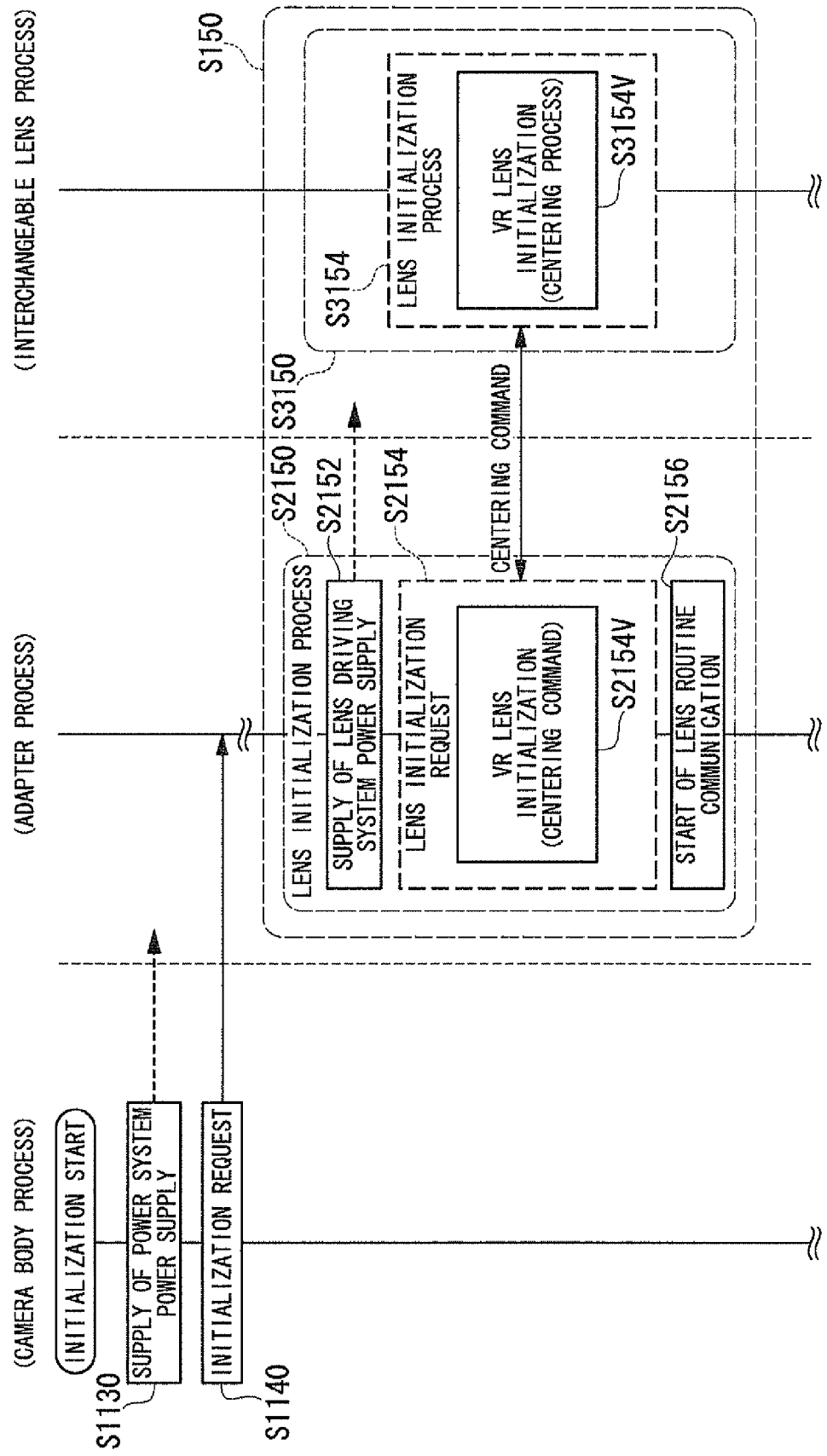
FIG. 24 is a diagram illustrating an example of a process sequence of an initialization process of vibration-proof control.

FIG. 24 is a diagram illustrating an example of the process sequence of the initialization process of the vibration-proof control.

The initialization process of the vibration-proof control is performed in the process of the lens initialization process (step S150) in the initialization process shown in FIG. 13. In FIG. 24, the processes corresponding to the respective processes of FIG. 13 are represented by the same reference numerals and signs, and description thereof will be omitted.

As shown in FIG. 24, in step S1140, the initialization execution command as the control command of the initialization request is transmitted to the first adapter communication portion 312 from the first camera communication portion 112.

The first adapter communication portion 312 starts the initialization process in response to the initialization execution command. Then, in the lens initialization request included in the lens initialization process (step S150), the first adapter communication portion 312 transmits the centering command (centering command) as the control command of the initialization (initialization of the VR lens 223) request of the vibration-proof control to the first lens communication portion 212 (step S2154V). Further, as the first lens communication portion 212 receives the centering command, the optical system control portion 211 of the interchangeable lens 200 executes the initialization (initialization of the VR lens 223) process of the vibration-proof control, thereby performing control to center the position of the VR lens 223 (step S3154V).

In addition, in the initialization process of the vibration-proof control (steps S2154V and S3154V), specifically, the first adapter communication portion 312 executes the communication processes such as acquisition of the vibration-proof state information, a command to set the vibration-proof rotation position, and acquisition of the vibration-proof image position, and a centering command, through the process of communication with the first lens communication portion 212.

Next, referring to FIG. 25, a description will be given of the process sequence of the process of switching on (control-in-progress state) and off (non-control state) the vibration-proof control.

Figure 25:
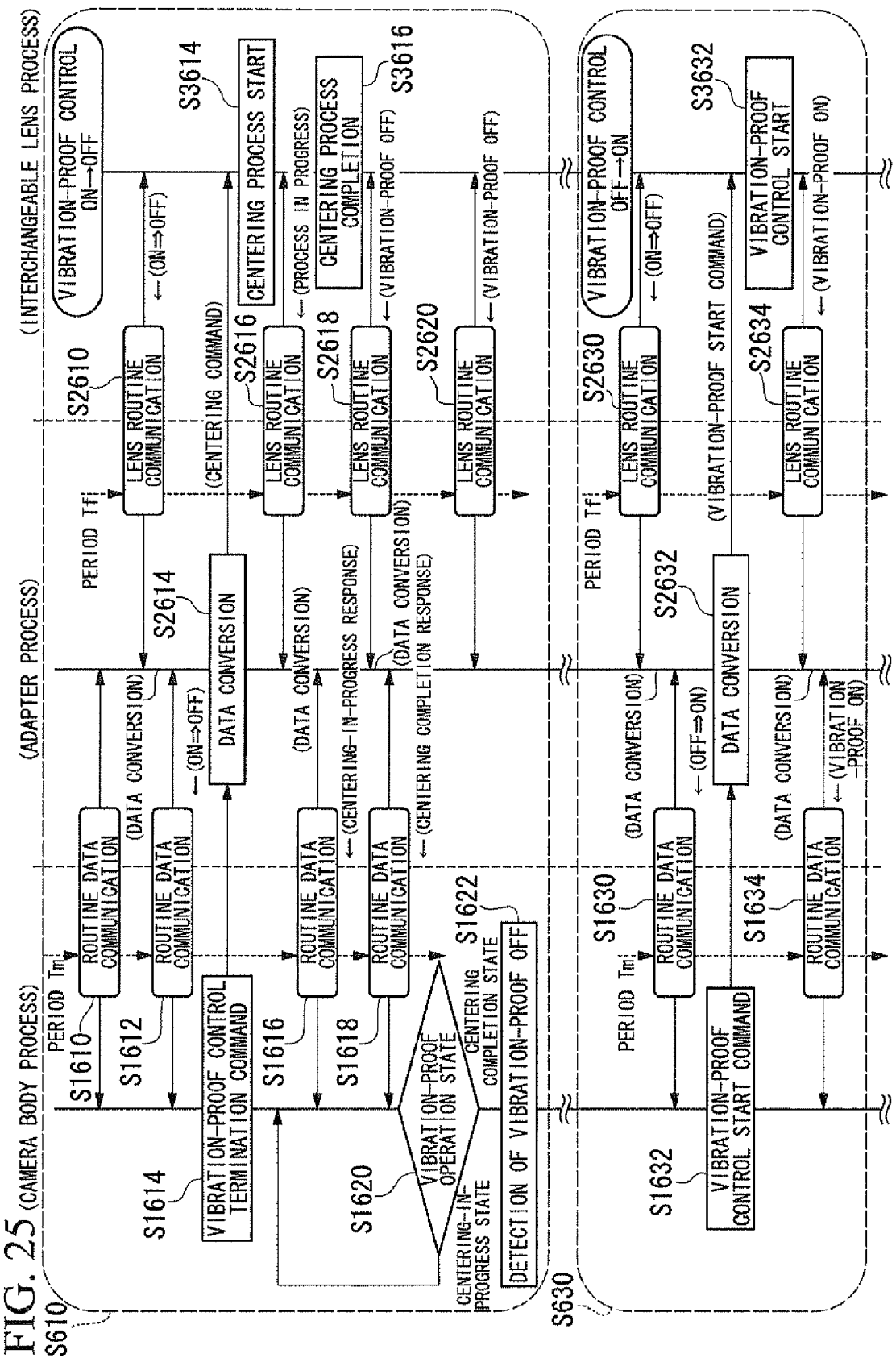
FIG. 25 is a diagram illustrating an example of a process sequence of a process of switching on and off the vibration-proof control.

FIG. 25 is a diagram illustrating an example of a process sequence of the process of switching on and off the vibration-proof control.

In addition, the interchangeable lens 200 has a "vibration-proof ON/OFF" switch (not shown in the drawing) which is a switch (operation section) capable of switching on and off the control state of the vibration-proof control operated by a user.

Further, the first camera communication portion 112 performs the routine data communication with the first adapter communication portion 312 in the period Tm (steps S1610, S1612, S1616, S1618, S1630, and S1640). Further, the first adapter communication portion 312 performs the lens routine communication with the first lens communication portion 212 in the period Tf (steps S2610, S2616, S2618, S2620, S2630, and S2634).

First, a description will be given of the process sequence in the case where the "vibration-proof ON/OFF" switch is switched from an ON state to an OFF state, in the interchangeable lens 200.

The first adapter communication portion 312 acquires information, which indicates that the "vibration-proof ON/OFF" switch is switched from the ON state to the OFF state, in the lens routine communication of step S2610. Next, in the routine data communication of step S1612, the first adapter communication portion 312 responds with the information, which indicates that the "vibration-proof ON/OFF" switch is switched from the ON state to the OFF state, to the first camera communication portion 112. In addition, if there is no consistency in information between the above-mentioned communication standards, the information on the ON/OFF state of the "vibration-proof ON/OFF" switch is converted into information which has consistency in the first adapter communication portion 312, is then transmitted to the camera body 100, and is transmitted as it is if there is consistency.

Subsequently, in response to acquiring the information which indicates that the "vibration-proof ON/OFF" switch is switched from the ON state to the OFF state, the first camera communication portion 112 transmits the above-mentioned "vibration-proof termination command" as a control command, which is to terminate the driving of the VR driving portion 235 (terminate the vibration-proof control), to the first adapter communication portion 312 (step S1614). In response to receiving the vibration-proof termination command from the first camera communication portion 112, the first adapter communication portion 312 converts the received vibration-proof termination command into the above-mentioned "centering command", thereby transmitting the converted centering command to the first lens communication portion 212 (step S2614). When the first lens communication portion 212 receives the centering command, the optical system control portion 211 of the interchangeable lens 200 starts the process of centering the position of the VR lens 223 (step S3614).

Until the process of centering the position of the VR lens 223 is complete, the first lens communication portion 212 responds with information, which indicates "process in progress", to the first adapter communication portion 312 through the lens routine communication (step S2616). The first camera communication portion 112 acquires information, which indicates "centering in progress" as the "vibration-proof operation state", from the first adapter communication portion 312 through the routine data communication (step S1616).

Then, the first camera communication portion 112 determines the vibration-proof operation state on the basis of the information indicating the acquired vibration-proof operation state (step S1620). In step S1620, when the acquired vibration-proof operation state is the "centering in progress" state, the first camera communication portion 112 repeats the process of acquiring and determining the vibration-proof operation state in the routine data communication, during the time period until the information indicating "centering completion" is acquired.

When the process of centering the position of the VR lens 223 is complete, the optical system control portion 211 notifies the first lens communication portion 212 that the centering process is complete (step S3616). Then, in response to the notification that the centering process is complete, the first lens communication portion 212 responds with information, which indicates "vibration-proof off", to the first adapter communication portion 312 in the lens routine communication (step S2618). In response to this, the first camera communication portion 112 acquires information, which indicates "centering completion", as the vibration-proof operation state from the first adapter communication portion 312 in the routine data communication (step S1618) on the basis of the confirmation command of the vibration-proof operation state.

Then, the first camera communication portion 112 determines the vibration-proof operation state on the basis of the information indicating the acquired vibration-proof operation state (step S1620), and detects that the vibration-proof control is turned off if the vibration-proof operation state is the "centering completion" state, thereby shifting to the vibration-proof-off state (step S1622).

Regarding the information of the above-mentioned "vibration-proof operation state", if there is no consistency in information between the above-mentioned communication standards, the information is converted into information which has consistency in the first adapter communication portion 312, is then transmitted to the camera body 100, and is transmitted as it is if there is consistency.

Next, a description will be given of the process sequence in the case where the "vibration-proof ON/OFF" switch is switched from the OFF state to the ON state, in the interchangeable lens 200.

The first adapter communication portion 312 acquires information, which indicates that the "vibration-proof ON/OFF" switch is switched from the OFF state to the ON state, in the lens routine communication of step S2630. Next, in the routine data communication of step S1630, the first adapter communication portion 312 responds with the information, which indicates that the "vibration-proof ON/OFF" switch is switched from the OFF state to the ON state, to the first camera communication portion 112. The process of consistency in information between the communication standards is as described above.

Subsequently, in response to acquiring the information which indicates that the "vibration-proof ON/OFF" switch is switched from the OFF state to the ON state, the first camera communication portion 112 transmits the above-mentioned "vibration-proof start command" as a control command, which is to start the driving of the VR driving portion 235 (start the vibration-proof control), to the first adapter communication portion 312 (step S1632). In response to receiving the vibration-proof start command from the first camera communication portion 112, the first adapter communication portion 312 performs a conversion process on the received vibration-proof start command, thereby transmitting the converted vibration-proof start command to the first lens communication portion 212 (step S2614). When the first lens communication portion 212 receives the vibration-proof start command, the optical system control portion 211 of the interchangeable lens 200 starts the vibration-proof control (step S3632).

For example, the first adapter communication portion 312 receives a moving-image vibration-proof start command, which is to perform the vibration-proof control in the process of capturing a moving image, as the vibration-proof start command from the first camera communication portion 112, and converts the received moving-image vibration-proof start command into a half-press vibration-proof start command to start the vibration-proof control in a release-half-press operation. Then, the first adapter communication portion 312 transmits the converted half-press vibration-proof start command as the vibration-proof start command to the first lens communication portion 212.

When the process of starting the vibration-proof control is complete, the optical system control portion 211 notifies the first lens communication portion 212 that the vibration-proof control is started (step S3632). Then, in response to the notification that the vibration-proof control is started, the first lens communication portion 212 responds with information, which indicates "vibration-proof on", to the first adapter communication portion 312 in the lens routine communication (step S2634). In response to this, the first camera communication portion 112 acquires information, which indicates "vibration-proof on", as the vibration-proof operation state from the first adapter communication portion 312.

As described above, the adapter 300 performs the process of converting the communication command received from the camera body 100 into the communication command to be transmitted to the interchangeable lens 200. Thereby, the adapter 300 is able to obtain consistency of the communication commands which are exchanged in the communication systems with mutually different communication standards between the first data communication system D1b, which performs the communication process on the camera body 100, and the first data communication system D1L which performs the communication process on the interchangeable lens 200.

For example, the adapter 300 converts the vibration-proof control command, which is received from the camera body 100, into the vibration-proof control command, which is compatible with the communication standard, to be transmitted to the interchangeable lens 200, and is thereby able to transmit the command. Further, the adapter 300 is able to transmit state information, such as the ON/OFF state of the switch received from the interchangeable lens 200 and the vibration-proof operation state, to the camera body 100 (in some cases, after performing the conversion process so as to make the information compatible with the communication standard of the communication destination).

Accordingly, by interconnecting the camera body 100 and the interchangeable lens 200 with the different communication standards through the adapter 300, it is possible to appropriately control them.

Selection of Vibration-Proof Control Mode

Next, the process of selecting the vibration-proof control mode for the interchangeable lens 200 will be described.

The adapter control section 310 selects the vibration-proof control mode, which is set in the camera body 100 in the case of controlling the VR driving portion 235, from a plurality of prescribed vibration-proof control modes, on the basis of the information of the interchangeable lens 200 acquired by the first adapter communication portion 312, and transmits information, which indicates the selected vibration-proof control mode, to the camera body 100.

Here, the plurality of vibration-proof control modes includes: a first vibration-proof control mode in which the control command from the camera body 100 is prior to the control command from the interchangeable lens 200; and a second vibration-proof control mode in which the control command from the interchangeable lens 200 is prior to the control command from the camera body 100.

Then, on the basis of the information of the interchangeable lens 200 acquired by the first adapter communication portion 312, the adapter control section 310 selects either one of the first vibration-proof control mode and the second vibration-proof control mode, and transmits information, which indicates the selected vibration-proof control mode, to the camera body 100.

In the present embodiment, on the basis of the acquired information of the interchangeable lens 200, when detecting that the interchangeable lens 200 has the VR driving portion 235, the adapter control section 310 selects the second vibration-proof control mode.

In addition, the above-mentioned plurality of vibration-proof control modes further includes a third vibration-proof control mode in which the control command from the camera body 100 is prior only in the control for switching on and off of the vibration-proof control and the control command from the interchangeable lens 200 is prior to the control command from the camera body 100 in the other control.

In this case, in the present embodiment, on the basis of the acquired information of the interchangeable lens 200, when detecting that the interchangeable lens 200 has the VR driving portion 235 and the "vibration-proof ON/OFF" switch, the adapter control section 310 selects the second vibration-proof control mode. Further, on the basis of the acquired information of the interchangeable lens 200, when detecting that the interchangeable lens 200 has the VR driving portion 235 but does not have "vibration-proof ON/OFF" switch, the adapter control section 310 selects the third vibration-proof control mode.

As described above, the adapter 300 selects the vibration-proof control mode for controlling the VR driving portion 235 from the plurality of prescribed vibration-proof control modes on the basis of the information of the interchangeable lens 200 acquired by the first adapter communication portion 312, and transmits the information, which indicates the selected vibration-proof control mode, to the camera body 100.

Thereby, the adapter 300 is able to select the appropriate vibration-proof control mode on the basis of the type of the interchangeable lens 200. Accordingly, the camera body 100 can be set in the appropriate vibration-proof control mode, which is selected by the adapter 300, in accordance with the type of the interchangeable lens 200 connected thereto through the adapter 300.

Update Process of Firmware

Next, the process performed when the firmware in the adapter control section 310 is updated in the adapter 300 will be described.

The adapter control section 310 has, for example, a nonvolatile memory (nonvolatile storage section) and a CPU not shown in the drawing. In addition, the memory stores software programs as firmware for controlling the respective sections provided in the adapter 300.

For example, the adapter control section 310 controls the adapter power supply section 320 in accordance with the software programs stored in the nonvolatile memory, and performs power feeding control to feed electric power to the interchangeable lens 200.

The process of updating the software programs stored in the nonvolatile memory provided in the adapter control section 310 in the above-mentioned configuration will be described.

The adapter control section 310 causes the adapter power supply section 320 to stop the power feeding to the interchangeable lens 200 when performing the update of the software programs in response to the control command from the camera body 100. That is, the adapter control section 310 causes the adapter power supply section 320 to stop the power feeding to the interchangeable lens 200 when the software programs are updated in response to the control command from the camera body 100. For example, when the software programs are updated in response to the control command from the camera body 100, the adapter control section 310 causes the adapter power supply section 320 to stop the power feeding (the power feeding of the lens driving system power supply Vp and the lens control system power supply Vc) of the lens system power supply system to the interchangeable lens 200. In other words, when updating the software programs provided in the adapter 300, the camera control section 110 stops the power feeding (the power feeding of the lens driving system power supply Vp and the lens control system power supply Vc) of the lens system power supply system from the adapter 300 to the interchangeable lens 200.

When the software programs are updated in response to the control command from the camera body 100, the adapter control section 310 may stop the power feeding of the power system power supply PWR from the camera body 100. In other words, when updating the software programs provided in the adapter 300, the camera control section 110 may perform control to stop supplying the electric power of the power system power supply PWR to the adapter 300.

Further, when the update of the software programs is complete, the adapter control section 310 stops supplying the electric power of the control system power supply Vcc1 from the camera body 100. That is, when the adapter 300 completely updates the software programs, the camera control section 110 stops the power feeding of the control system power supply Vcc1 to the adapter 300.

Figure 26:
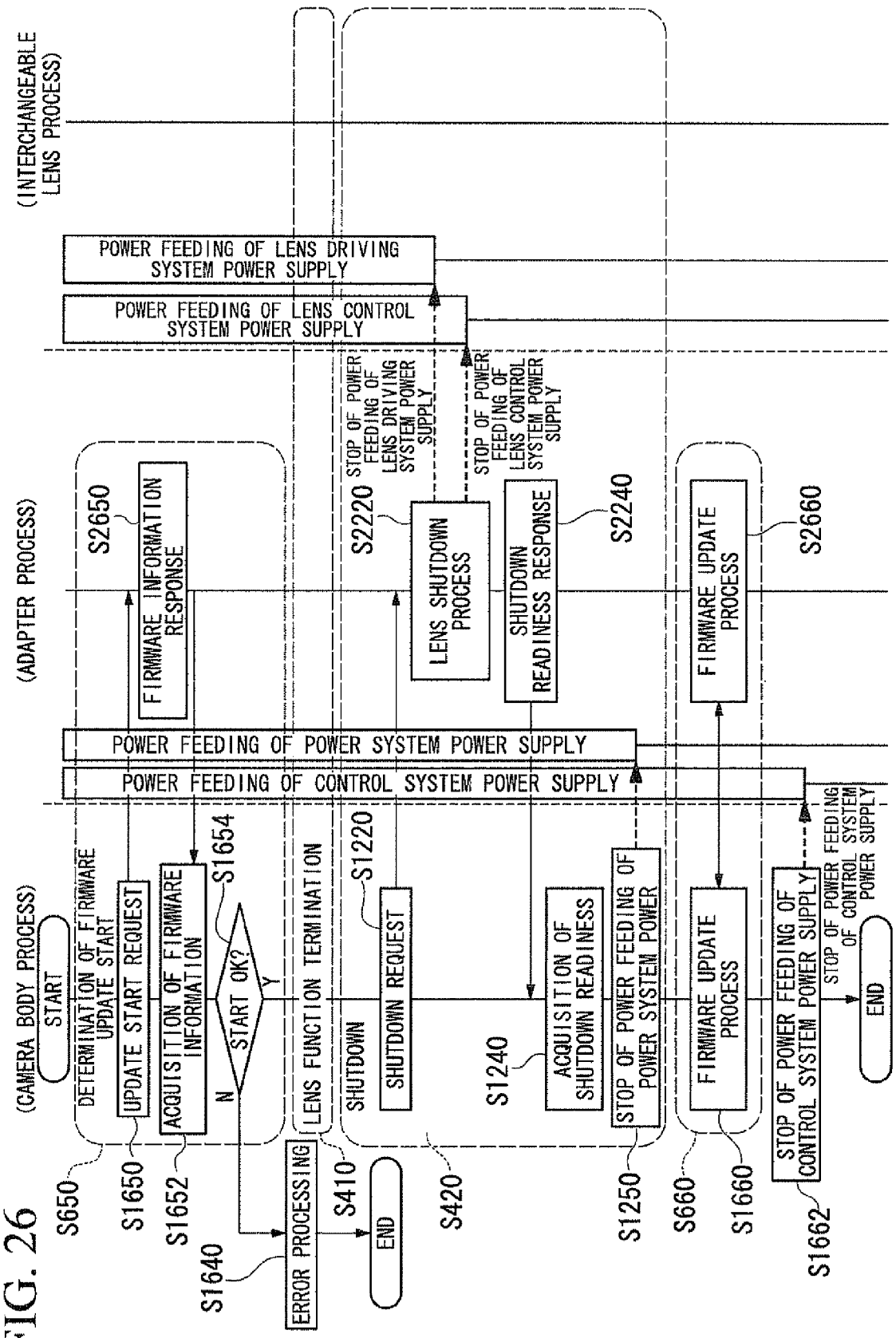
FIG. 26 is a diagram illustrating an example of a process sequence of a firmware update process.

FIG. 26 is a diagram illustrating an example of a process sequence of the firmware update process.

Referring to the drawing, the process, in which the adapter 300 updates software programs provided as firmware, will be described.

The process of updating the firmware is performed in order of firmware update start determination (step S650), lens function termination (step S410), shutdown (step S420), and a firmware update process (step S660).

Here, the respective processes of the lens function termination (step S410) and the shutdown (step S420) shown in FIG. 26 are the same as the respective processes of the lens function termination (step S410) and the shutdown (step S420) shown in FIG. 15, and detailed description thereof will be omitted.

First, the camera body 100 detects, for example, an operation for giving an instruction to start the update of the firmware from a user, thereby performing the process of determining firmware update start (step S650).

In the process of determining firmware update start (step S650), the first camera communication portion 112 transmits the update start request command, which is a control command to request the update start of the firmware, to the first adapter communication portion 312 (step S1650). In response to receiving the update start request command, the first adapter communication portion 312 responds with the information of the firmware, which is stored in the adapter 300, to the first camera communication portion 112. Here, the information of the firmware is information which indicates the file type of the firmware, the ID of the firmware, the version of the firmware, and the like.

The first camera communication portion 112 acquires the information of the firmware as a response from the first adapter communication portion 312 (step S1652).

Next, the camera control section 110 determines the start of the process of updating the firmware on the basis of information of the firmware acquired by the first camera communication portion 112 and information of the firmware for update (information of the software programs for update) (step S1654). For example, the camera control section 110 determines whether or not the update process can be started on the basis of the information which indicates the file type of the firmware, the ID of the thin-ware, the version of the firmware, and the like.

In step S1654, if it is determined that the update process cannot be started, the camera control section 110 terminates the process by executing the error processing (step S1640). Here, the error processing is, for example, processing of notifying an update error to a user through a sound or a display indicating that the update is impossible.

In contrast, in step S1654, if it is determined that the update process can be started, the camera control section 110 advances the process to step S410.

In step S410, the first camera communication portion 112 communicates with the first lens communication portion 212 through the first adapter communication portion 312, thereby stopping the function operation of the interchangeable lens 200.

Next, in the process of the shutdown of step S420, the first camera communication portion 112 transmits the shutdown execution command as a shutdown request to the first adapter communication portion 312 (step S1220). In response to receiving the shutdown execution command, the first adapter communication portion 312 stops the power feeding of the lens driving system power supply Vp from the adapter power supply section 320, and subsequently stops the power feeding of the lens control system power supply Vc (step S2220).

As a result of the response to the shutdown completion confirmation command, the first camera communication portion 112 acquires the response of the "shutdown readiness" from the first adapter communication portion 312 (step S1240). When the response of the shutdown readiness is acquired by the first adapter communication portion 312, the camera control section 110 controls the switch 125 such that it attains the cut-off state, thereby stopping the power feeding of the power system power supply PWR (step S1250).

Next, the camera control section 110 advances the process to the firmware update process (step S660). In the firmware update process (step S660), the first camera communication portion 112 transmits the software program for update to the first adapter communication portion 312. When the transmission of the software program for update is complete, the first camera communication portion 112 acquires the response which indicates that the process of updating the firmware is complete (steps S1660 and S2660).

When the firmware update process (step S660) is complete, the camera control section 110 controls the camera power supply section 120 such that it stops the power feeding of the control system power supply Vcc1 to the adapter 300, thereby terminating the process (step S1662).

As described above, in response to the control command from the camera body 100, when the firmware (software program) is updated, the adapter 300 stops the power feeding to the interchangeable lens 200 before the start of the update process. Thereby, when the firmware is updated, the adapter 300 is able to prevent unnecessary current from being unintentionally consumed in or prevent unnecessary signals from being supplied to the interchangeable lens 200 during the time period of the update process. Accordingly, the adapter 300 is able to perform control to protect hardware of the interchangeable lens 200 during the time period of the process of updating the firmware. Further, when the firmware provided in the adapter 300 is updated, the camera body 100 is able to prevent unnecessary current from being unintentionally consumed in or prevent unnecessary signals from being supplied to the interchangeable lens 200 from the adapter 300 during the time period of the update process. Accordingly, it is possible to appropriately update the firmware of the adapter 300 connected between the interchangeable lens 200 and the camera body 100 with the mutually different communication standards.

The above-mentioned process of updating the firmware is not limited to the process of updating the software programs stored in the memory provided in the adapter control section 310.

For example, the process of updating the firmware may be a process of updating information such as data used as a reference in the processing of the software program.

As described above, according to the present embodiment, in the interchangeable-lens camera system, it is possible to cause various kinds of optical systems to appropriately function.

The present invention is not limited to the configuration shown in FIGS. 3, 5, and 6 in which the interchangeable lens 200 and the camera body 100 are connected to each other only through the adapter 300.

For example, it may be possible to adopt a configuration in which the interchangeable lens 200 and the camera body 100 is connected to the interchangeable lens 200 through a conversion adapter (such as teleconverter) other than the adapter 300.

Further, the adapter 300 of the embodiment is configured to not include an optical system, but may be configured to include an optical system.

The camera control section 110, the lens control section 210, or the adapter control section 310 in FIG. 1 may be implemented by hardware dedicated to each. Further, with a configuration using a memory and a CPU (Central Processing Unit), the respective functions of the above-mentioned camera control section 110, lens control section 210, and adapter control section 310 may be implemented by loading and executing programs for implementing the functions in the memory.

Further, programs for implementing the respective functions of the camera control section 110, the lens control section 210, and the adapter control section 310 mentioned above are recorded in a computer-readable recording medium, and the programs recorded in the recording medium are read out and executed by a computer system, whereby the above-mentioned processes of the respective section may be performed. In addition, the "computer system" described herein is defined to include OS and hardware such as peripherals.

Further, in a case of using the WWW system, the "computer system" is also defined to include the homepage provision environment (or display environment).

Further, the "computer-readable recording medium" means a portable medium such as a flexible disk, a magneto-optical disc, a ROM, or a CD-ROM or a storage device such as a hard disk built into the computer system. Furthermore, the "computer-readable recording medium" is defined to include: dynamically retaining a program during a short period of time like the communication line in the case of transmitting the program through the network such as the Internet and the communication line such as the telephone line; and retaining a program during a predetermined time like a volatile memory inside the computer system serving as a server or client in that case. Further, the program may be to implement some of the functions mentioned above, and may be implemented in combination with the program in which the above-mentioned functions are recorded in advance in the computer system.

Although the embodiments of the present invention have been described hitherto in detail with reference to the drawings, the detailed configuration is not limited to the embodiments, and may include changes in design and the like made without departing from the technical scope of the present invention.

What is claimed is:

1. An adapter comprising:
a first mount section that is detachably attached to a camera body;
a second mount section that is provided separately from the first mount section and is detachably attached to an interchangeable lens; and
an adapter control section that is capable of communicating between the camera body mounted on the first mount section and the interchangeable lens mounted on the second mount section, wherein the adapter control section provides body transmission lens information for transmission to the camera body, on the basis of lens information requested from the camera body and lens information received from the interchangeable lens, through mutually different methods according to types of the lens information and types of the interchangeable lens.

2. The adapter according to claim 1, wherein when the lens information is information used in both of the camera body and the interchangeable lens and data definitions are different between both of them, the adapter control section provides the body transmission lens information by performing a prescribed conversion process to the received lens information.

3. The adapter according to claim 1, wherein when the lens information is information used in both of the camera body and the interchangeable lens and data definitions are the same between both of them,
the adapter control section provides the body transmission lens information by using the received lens information as it is.

4. The adapter according to claim 1, wherein
when the lens information is information unused in the interchangeable lens and is also information used in the camera body to combine the camera body with the interchangeable lens,
the adapter control section provides prescribed control data, which is stored in the adapter control section in advance, as the body transmission lens information.

5. The adapter according to claim 1, wherein
when the lens information is information unused in the interchangeable lens and is also information unused in the camera body to combine the camera body with the interchangeable lens,
the adapter control section provides prescribed data, which indicates that the lens information is invalid, as the body transmission lens information.

6. The adapter according to claim 1, wherein
when the lens information is information unused in the camera body,
the adapter control section does not provide information, which corresponds to the information, as the body transmission lens information.

7. The adapter according to claim 4, wherein the adapter control section selects whether to provide the body transmission lens information by performing the prescribed conversion process on the received lens information or to provide the prescribed control data, which is stored in the adapter control section in advance, as the body transmission lens information, in accordance with types of the interchangeable lenses.

8. The adapter according to claim 1, wherein the adapter control section determines the type of the interchangeable lens on the basis of whether or not the lens information is acquired from the interchangeable lens.

9. The adapter according to claim 1,
wherein the adapter control section performs first regular communication with a lens control section in the interchangeable lens mounted on the second mount section in a first communication period, and performs second regular communication with a camera control section in the camera body mounted on the first mount section in a second communication period, and
wherein the adapter control section communicates with the lens control section a plurality of times in the first regular communication, acquires first information from the lens control section for each time, and generates second information to be transmitted to the camera control section through the second regular communication, on the basis of a plurality of the first information, which are acquired through communications different from one another, among the first information which are acquired through the plurality of communications.

10. The adapter according to claim 9, wherein the adapter control section transmits the second information to the camera control section, in response to a request from the camera control section.

11. The adapter according to claim 9, wherein the adapter control section generates the second information into which the plurality of the first information divisionally acquired the plurality of times is unified.

12. The adapter according to claim 9, wherein the adapter control section generates the second information from the plurality of the first information, on the basis of a prescribed format.

13. The adapter according to claim 9, wherein the adapter control section asynchronously performs the first regular communication and the second regular communication.

14. The adapter according to claim 13, wherein the adapter control section generates the second information, in accordance with communication timing of the first regular communication.

15. The adapter according to claim 13, wherein the adapter control section generates the second information, in accordance with communication timing of the second regular communication.

16. A camera system comprising:
the adapter according to claim 1;
the camera body mounted on the first mount section; and
the interchangeable lens mounted on the second mount section.

17. A non-transitory computer-readable storage medium storing an adapter control program for controlling operations of an adapter control section installed in an adapter including a first mount section that is detachably attached to a camera body and a second mount section that is provided separately from the first mount section and is detachably attached to an interchangeable lens, the adapter control program comprising an instruction for:
providing body transmission lens information for transmission to the camera body, on the basis of lens information requested from the camera body and lens information received from the interchangeable lens, through mutually different methods according to types of the lens information and types of the interchangeable lens.

18. A non-transitory computer-readable storage medium storing an adapter control program for controlling operations of an adapter control section installed in an adapter including a first mount section that is detachably attached to a camera body and a second mount section that is provided separately from the first mount section and is detachably attached to an interchangeable lens, the adapter control program comprising an instruction for:

a first step of performing first regular communication with a lens control section in the interchangeable lens mounted on the second mount section in a first communication period;

a second step of performing second regular communication with a camera control section in the camera body mounted on the first mount section in a second communication period;

a third step of communicating with the lens control section a plurality of times in the first regular communication, and acquiring first information from the lens control section for each time; and a fourth step of generating second information to be transmitted to the camera control section through the second regular communication, on the basis of a plurality of the first information, which are acquired through communications different from one another, among the first information which are acquired through the plurality of communications.

\* \* \* \* \*